United States Patent
Lee et al.

(10) Patent No.: US 12,498,800 B2
(45) Date of Patent: Dec. 16, 2025

(54) ELECTRONIC DEVICE HAVING FLEXIBLE DISPLAY AND METHOD FOR PROVIDING CONTROL OBJECT BASED ON GRIPPING STATE THEREOF

(71) Applicant: Samsung Electronics Co., Ltd., Suwon-si (KR)

(72) Inventors: Younsun Lee, Suwon-si (KR); Sangheon Kim, Suwon-si (KR); Juyoung Kim, Suwon-si (KR); Changhwan Kim, Suwon-si (KR); Hyunjung Moon, Suwon-si (KR); Sungchan Bae, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 18/488,464

(22) Filed: Oct. 17, 2023

(65) Prior Publication Data
US 2024/0077956 A1    Mar. 7, 2024

Related U.S. Application Data

(63) Continuation of application No. PCT/KR2023/013229, filed on Sep. 5, 2023.

(30) Foreign Application Priority Data

Sep. 5, 2022   (KR) .................. 10-2022-0112182
Oct. 18, 2022  (KR) .................. 10-2022-0133910

(51) Int. Cl.
*G06F 3/033*    (2013.01)

(52) U.S. Cl.
CPC .................... *G06F 3/033* (2013.01)

(58) Field of Classification Search
CPC ...... G06F 3/033; G06F 1/1641; G06F 3/0482; G06F 2203/04803; G06F 1/1652;
(Continued)

(56) References Cited

U.S. PATENT DOCUMENTS 9,600,145 B2   3/2017 Jeon et al.
9,959,030 B2   5/2018 Sang et al.
(Continued)

FOREIGN PATENT DOCUMENTS

CN   104220963 A  * 12/2014  ........... G06F 1/1652
CN   104685448 A  *  6/2015  ............ G01B 11/24
(Continued)

OTHER PUBLICATIONS

International Search Report with Written Opinion dated Dec. 6, 2023; International Appln. No. PCT/KR2023/013229.

*Primary Examiner* — Ricardo Osorio
(74) *Attorney, Agent, or Firm* — Jefferson IP Law, LLP

(57) ABSTRACT

An electronic device having a flexible display and a method for providing a control object, based on a user's gripping state of an electronic device are provided. The electronic device includes a display, a memory, and a processor. The processor may control the display such that an execution screen of an application is displayed in a designated state of the electronic device. The processor may detect a control object from the execution screen. The processor may determine a user's gripping state. The processor may identify at least one target control object from the control object, based on the designated state and the gripping state. The processor may provide a duplicate control object corresponding to a control object identified as the target control object to an optimization region corresponding to the gripping state.

18 Claims, 43 Drawing Sheets

(58) Field of Classification Search
CPC .. G06F 1/1677; G06F 1/1694; G06F 3/04817; G06F 3/04883; G06F 3/04886; G06F 3/017
See application file for complete search history.

(56) References Cited

U.S. PATENT DOCUMENTS

| | | | |
|---|---|---|---|
| 10,079,972 B2 | 9/2018 | Liao | |
| 10,209,878 B2 | 2/2019 | Sang et al. | |
| 10,860,191 B2 * | 12/2020 | Han | G06F 3/04845 |
| 11,137,894 B1 * | 10/2021 | Chen | G06F 3/04855 |
| 11,823,481 B2 * | 11/2023 | Dhindhsa | G06F 3/04817 |
| 11,990,107 B2 * | 5/2024 | Tokuchi | G09G 5/14 |
| 2016/0147384 A1 | 5/2016 | Hong et al. | |
| 2017/0300205 A1 | 10/2017 | Villa et al. | |
| 2020/0004297 A1 * | 1/2020 | Rekapalli | G06F 1/1618 |
| 2020/0125144 A1 * | 4/2020 | Chung | H04M 1/0216 |
| 2020/0126519 A1 | 4/2020 | Heo et al. | |
| 2022/0244846 A1 | 8/2022 | Zhao et al. | |

FOREIGN PATENT DOCUMENTS

| | | | | |
|---|---|---|---|---|
| CN | 111443773 A | * | 7/2020 | G06F 1/1616 |
| CN | 105452983 B | * | 10/2020 | G06F 1/1616 |
| CN | 115469776 A | * | 12/2022 | |
| JP | 2016038622 A | * | 3/2016 | |
| KR | 10-2010-0121183 A | | 11/2010 | |
| KR | 10-2012-0024299 A | | 3/2012 | |
| KR | 20120024299 A | * | 3/2012 | |
| KR | 10-2013-0111087 A | | 10/2013 | |
| KR | 10-2016-0062414 A | | 6/2016 | |
| KR | 10-2016-0108705 A | | 9/2016 | |
| KR | 10-2020-0045660 A | | 5/2020 | |
| KR | 10-2020-0045746 A | | 5/2020 | |
| KR | 10-2204151 B1 | | 1/2021 | |
| KR | 20230047184 A | * | 4/2023 | |
| WO | 2021/078032 A1 | | 4/2021 | |

* cited by examiner

FIG. 5
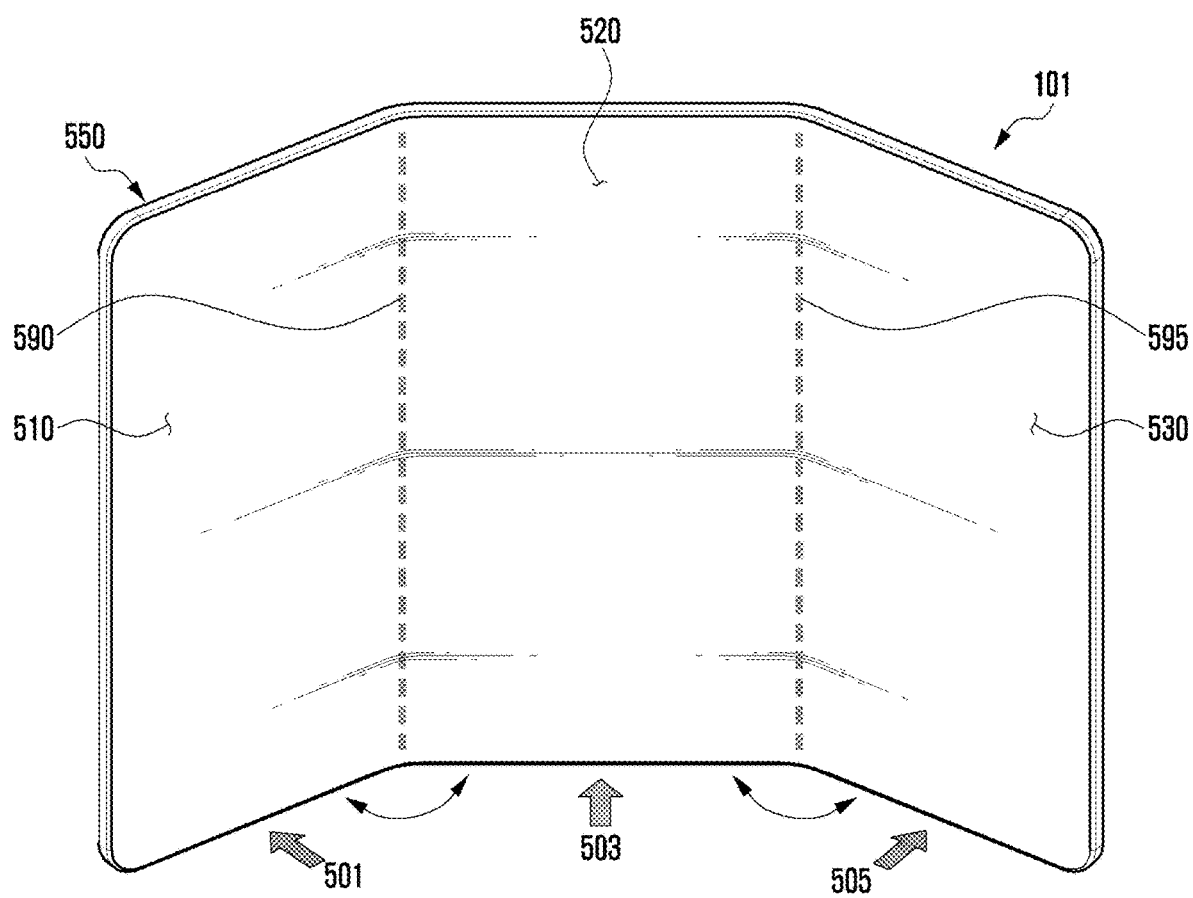
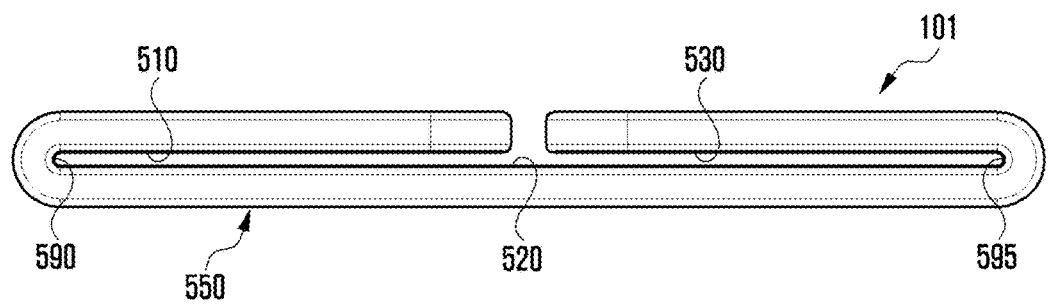

FIG. 6
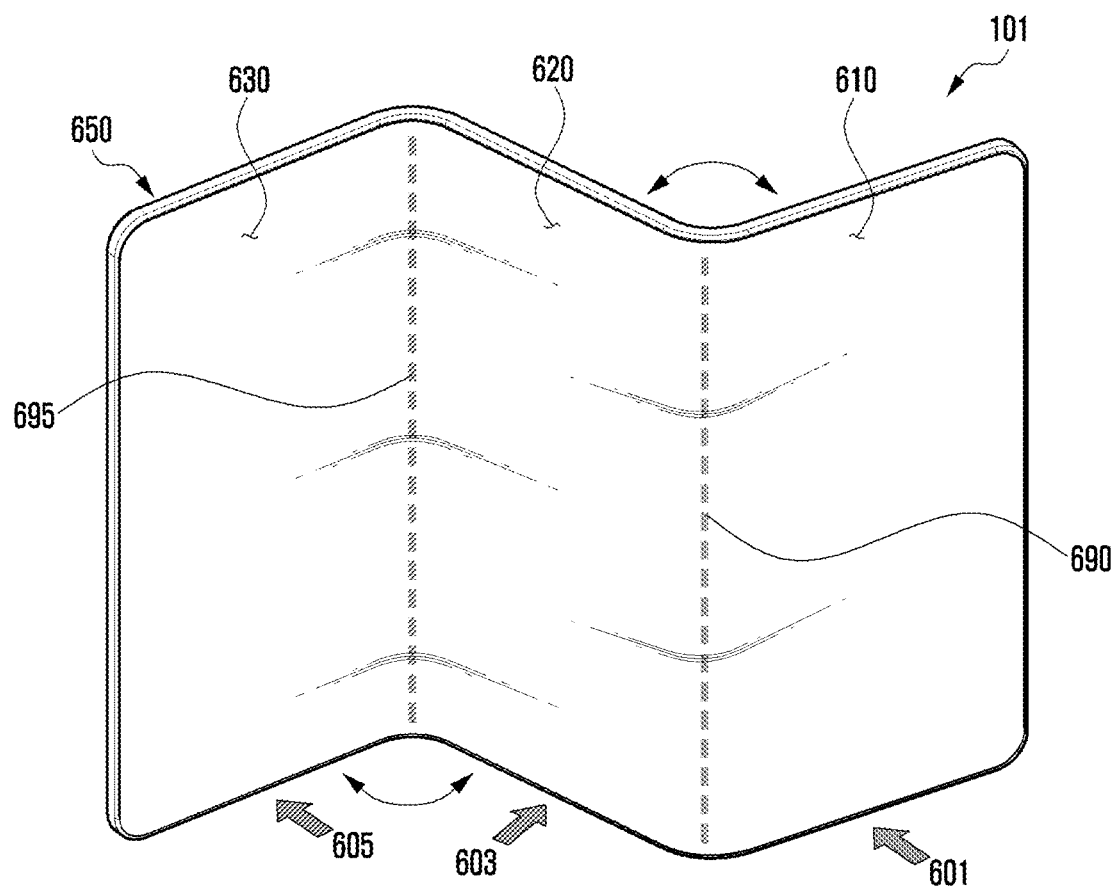
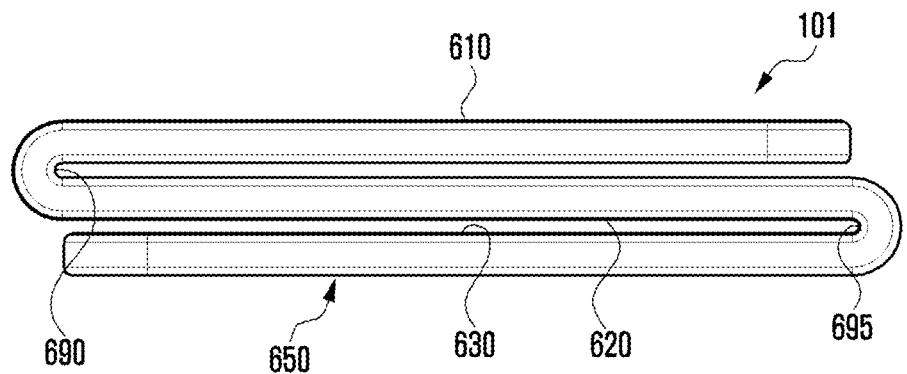

FIG. 11
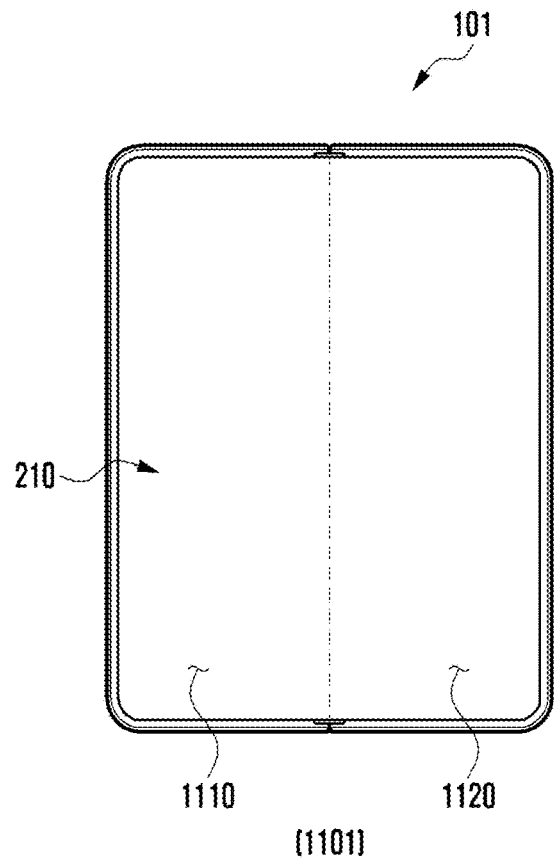
[1101]
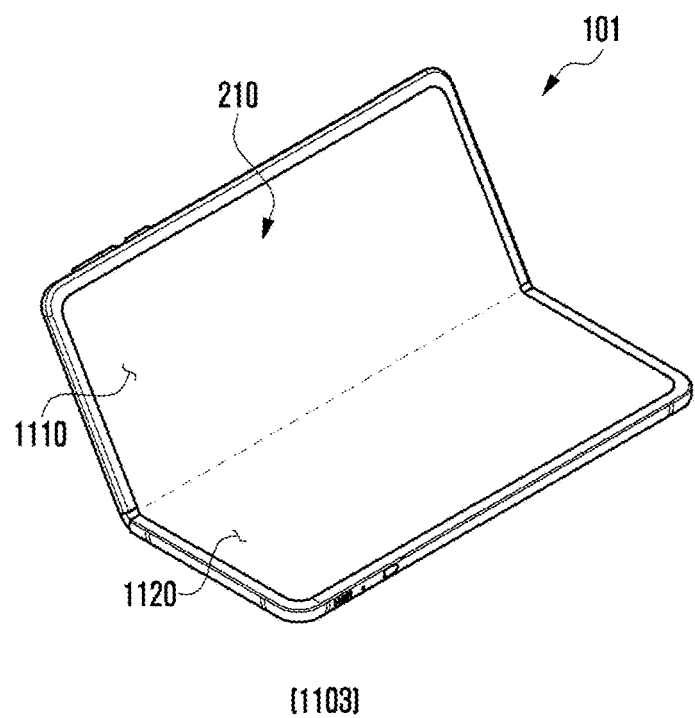
[1103]

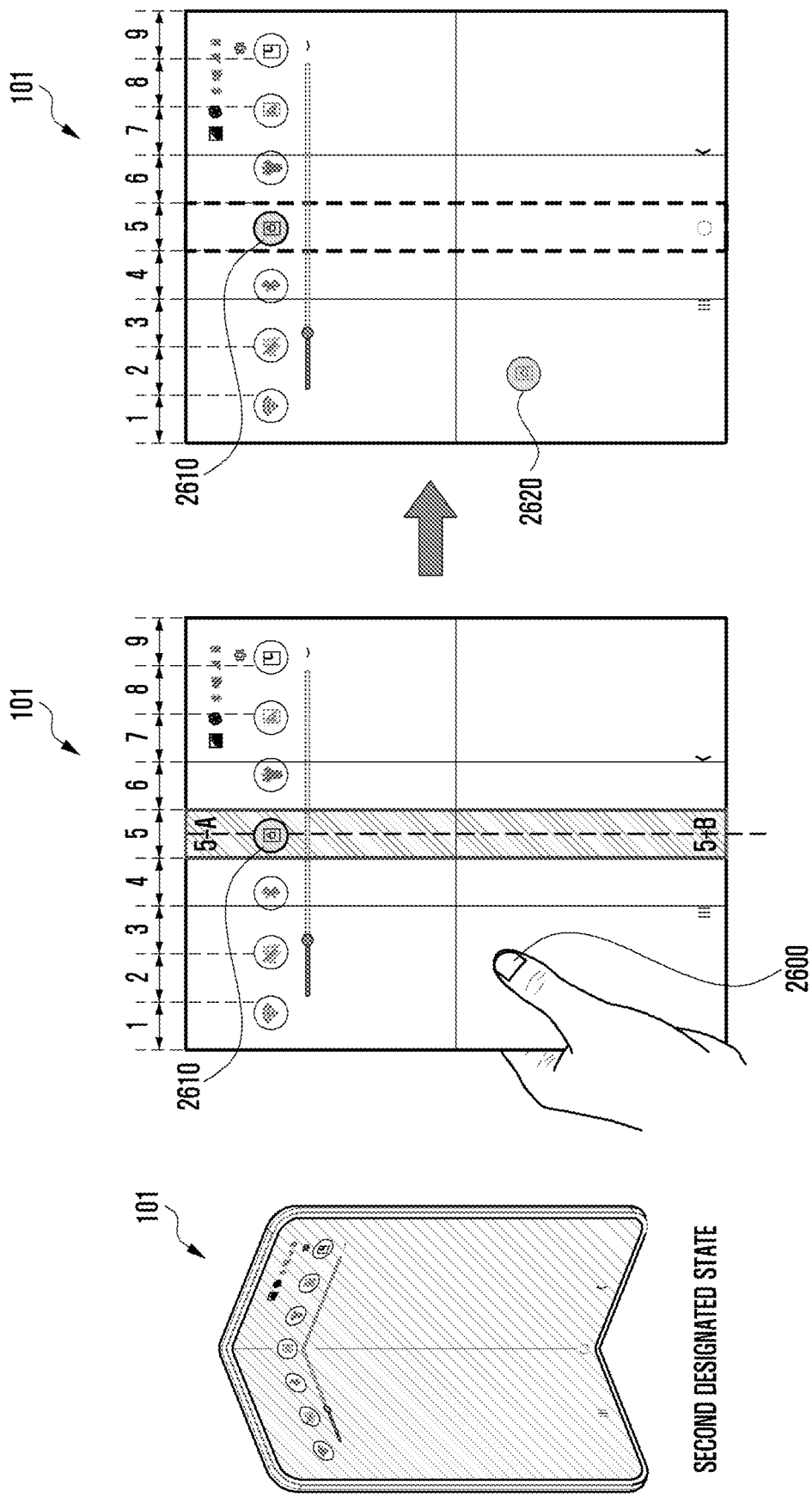

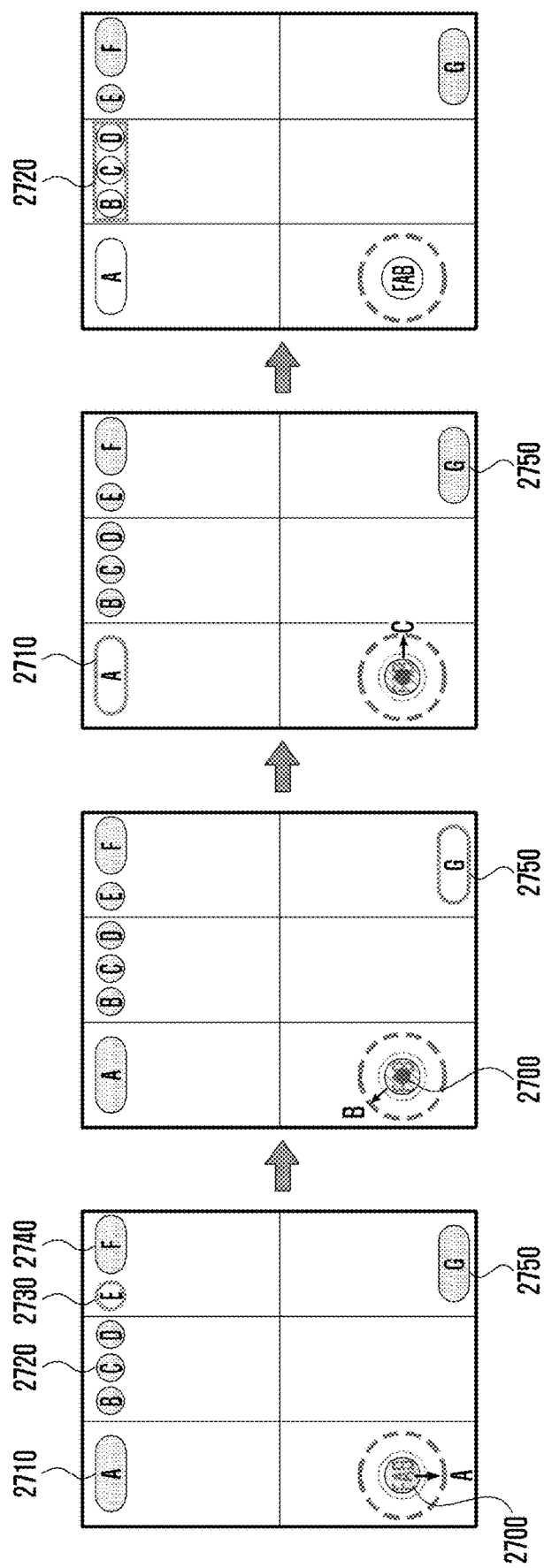

ELECTRONIC DEVICE HAVING FLEXIBLE DISPLAY AND METHOD FOR PROVIDING CONTROL OBJECT BASED ON GRIPPING STATE THEREOF

CROSS-REFERENCE TO RELATED APPLICATION(S)

This application is a continuation application, claiming priority under § 365(c), of an International application No. PCT/KR2023/013229, filed on Sep. 5, 2023, which is based on and claims the benefit of a Korean patent application number 10-2022-0112182, filed on Sep. 5, 2022, in the Korean Intellectual Property Office, and of a Korean patent application number 10-2022-0133910, filed on Oct. 18, 2022, in the Korean Intellectual Property Office, the disclosure of each of which is incorporated by reference herein in its entirety.

TECHNICAL FIELD

The disclosure relates to an electronic device having a flexible display (or a foldable display). More particularly, the disclosure relates to a method for providing a control object, based on a user's gripping state of an electronic device.

BACKGROUND ART

With the development of digital technology, various types of electronic devices, such as mobile communication terminals, personal digital assistants (PDAs), electronic organizers, smartphones, tablet personal computers (PCs), and/or laptop PCs are being widely used. To support and increase the functions of these electronic devices, the hardware part and/or the software components of the electronic device are continuously being improved.

Electronic devices may have a limited size for portability, and accordingly, the size of a display is also limited. In recent years, various types of electronic devices that provide a more expanded screen in an electronic device by means of a multi-display have been developed. For example, electronic devices include a plurality of displays to provide an expanded screen through a multi-display. For example, according to the current designs of electronic devices, the size of the screen is gradually increasing within the limit in the display size, to provide various services (or functions) to users through a large screen.

Recently, electronic devices may have a new form factor, such as a multi-display (e.g., a dual display) device (e.g., a foldable device). A foldable device may be equipped with a foldable (or bendable) display (e.g., a flexible display or a foldable display) to be used while folded or unfolded. The need for development of a user interface (UI) corresponding to a multi-display and an operation thereof is increasing according to the new form factor such as multi-display implementation of electronic devices.

An electronic device may provide a fixed user interface regardless of a user's gripping state. For example, the electronic device may provide an identically configured user interface in an unfolded or folded state regardless of a user's gripping state. However, an electronic device having a large screen may reduce user accessibility to a user interface. For example, the electronic device having a large screen may cause users to find difficulty in selecting (or touching) a control object provided in a region where the user's finger is not reachable.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a method for duplicatively providing a control object (or controller) related to an application running on an electronic device to an optimization region according to a state in which a user grips the electronic device, and an electronic device configured to support the same.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display, a memory, and a processor operatively connected to the display and the memory. The processor according to an embodiment may control the display to display an execution screen of an application in a designated state of the electronic device. The processor according to an embodiment may detect at least one control object from the execution screen. The processor according to an embodiment may determine a user's gripping state. The processor according to an embodiment may identify a target control object from the at least one control object, based on the designated state and the gripping state. The processor according to an embodiment may provide a duplicate control object corresponding to the target control object to an optimization region corresponding to the gripping state.

In accordance with another aspect of the disclosure, an operating method performed by an electronic device is provided. The operating method includes displaying an execution screen of an application in a designated state of the electronic device. The operating method includes detecting at least one control object from the execution screen. The operating method includes determining a user's gripping state. The operating method includes identifying a target control object from the at least one control object, based on the designated state and the gripping state. The operating method includes providing a duplicate control object corresponding to the target control object to an optimization region corresponding to the gripping state.

Various embodiments of the disclosure to solve the above problems includes a computer-readable recording medium in which a program configured to execute the method in a processor is recorded.

According to an embodiment, a non-transitory computer readable storage medium (or computer program product) configured to store one or more programs is described. According to an embodiment, the one or more programs, when executed by a processor of an electronic device, includes instructions that perform displaying an execution screen of an application in a designated state of the electronic device, detecting at least one control object from the execution screen, determining a user's gripping state, identifying a target control object from the at least one control object, based on the designated state and the gripping state, and providing a duplicate control object corresponding to the target control object to an optimization region corresponding to the gripping state.

Additional scope of applicability of the disclosure will become apparent from the detailed description that follows. However, since various changes and modifications within the spirit and scope of the disclosure are clearly understandable by those skilled in the art, it should be understood that the detailed description and specific embodiments such as the preferred embodiments of the disclosure are given by way of example only.

Advantageous Effects of Invention

According to an electronic device, an operating method thereof, and a recording medium according to an embodiment of the disclosure, a control object (or controller) related to an application running in the electronic device may be duplicatively provided to an optimization region according to a state in which a user grips the electronic device, thereby minimizing movement distance of the user's finger. According to an electronic device, an operating method thereof, and a recording medium according to an embodiment of the disclosure, a control object in the most inaccessible region is duplicatively provided to an optimization region, thereby improving user accessibility to a control object provided in a region untouchable by the user's finger.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 illustrates an example of an electronic device according to an embodiment of the disclosure;

FIG. 6 illustrates an example of an electronic device according to an embodiment of the disclosure;

FIG. 11 is a diagram illustrating an example of a designated state of an electronic device according to an embodiment of the disclosure;

FIG. 26 illustrates an example of duplicatively providing a control object on an execution screen in an electronic device according to an embodiment of the disclosure;

FIG. 27A illustrates an example of selecting a target control object, based on an interaction with a user in an electronic device according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
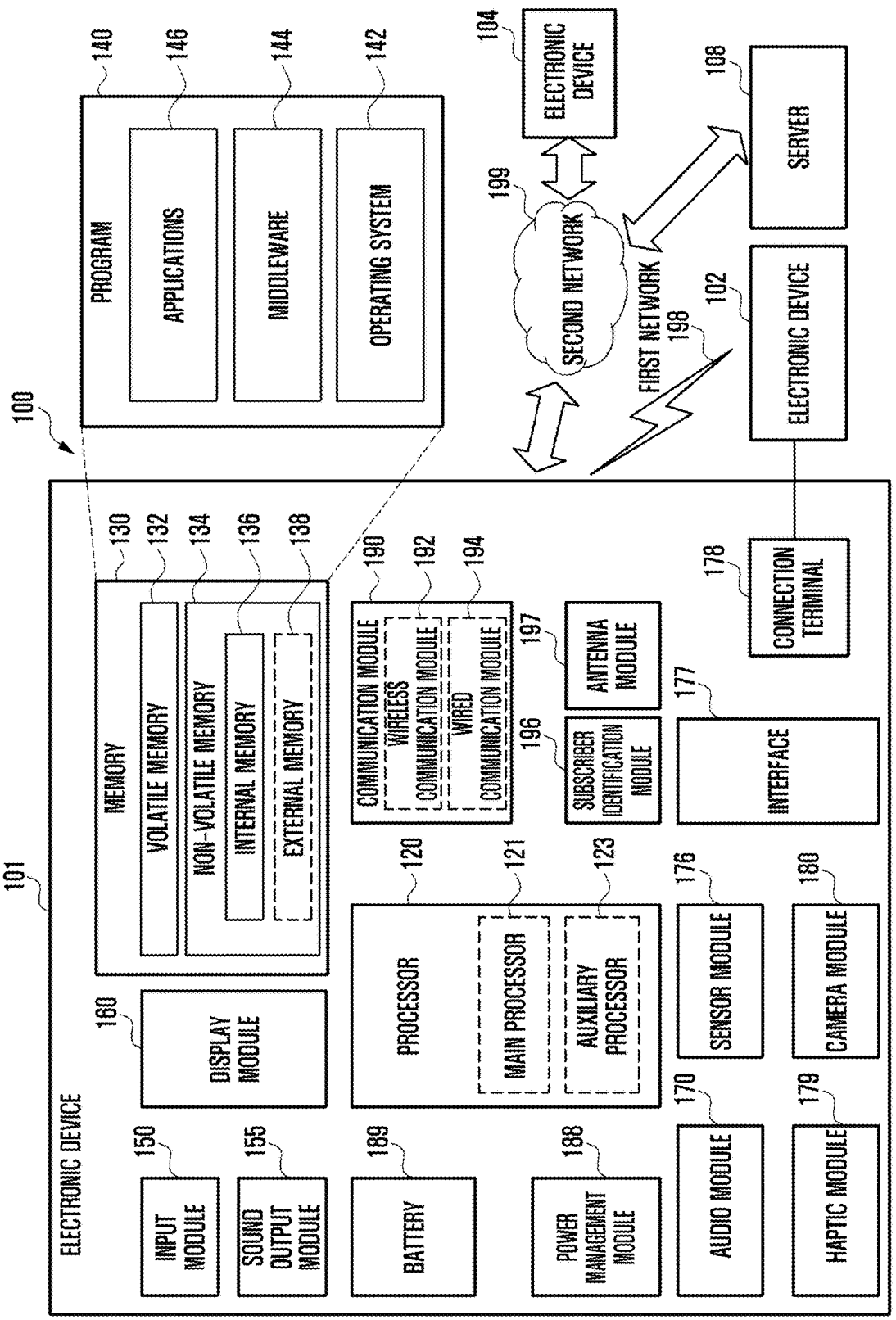
FIG. 1 is a block diagram illustrating an example electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter waves (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
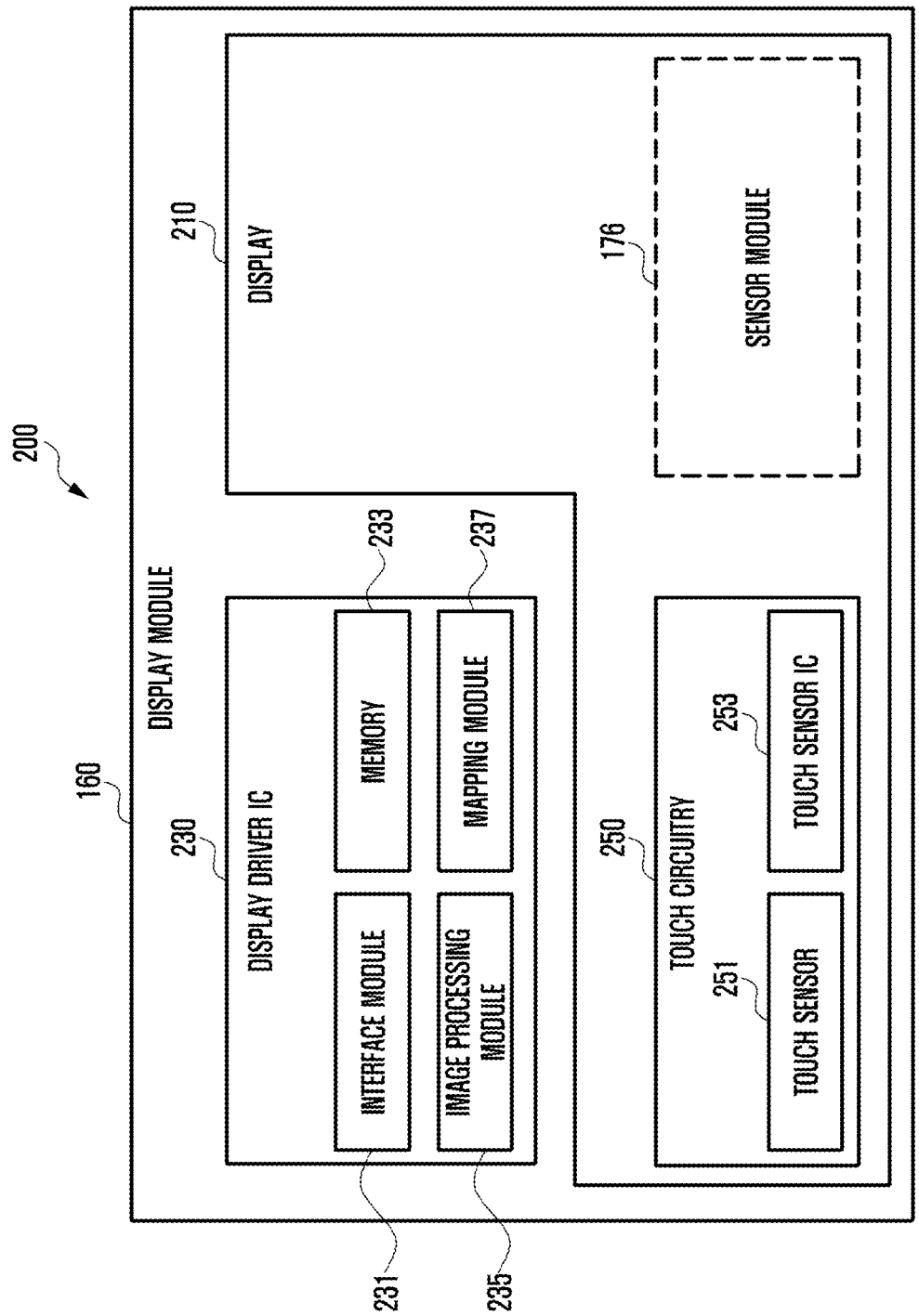
FIG. 2 is a block diagram of a display module according to an embodiment of the disclosure.

FIG. 2 is a block diagram 200 illustrating the display module 160 according to an embodiment of the disclosure.

Referring to FIG. 2, the display module 160 may include a display 210 and a display driver integrated circuit (DDIC) 230 to control the display 210. The DDIC 230 may include an interface module 231, memory 233 (e.g., buffer memory), an image processing module 235, or a mapping module 237.

The DDIC 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a GPU) operated independently from the function of the main processor 121. The DDIC 230 may communicate, for example, with touch circuitry 250 or the sensor module 176 via the interface module 231. The DDIC 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as a red green and blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor integrated circuit (IC) 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDIC 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDIC 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

FIGS. 3, 4, 5, and 6 illustrate an example of an electronic device according to various embodiments of the disclosure.

According to an embodiment, FIG. 3, 4, 5, or 6 illustrate an example of changing a display shape (or state of an electronic device) according to a display type of the electronic device 101 according to an embodiment. According to an embodiment, FIG. 3, 4, 5, or 6 illustrates an example of changing a display shape (e.g., the display 210 in FIG. 2) of the electronic device 101 including a foldable (or bendable) display (e.g., a foldable display or a flexible display). According to an embodiment, as in the example shown in FIG. 3, 4, 5, or 6, the electronic device 101 may be implemented in various forms, and according to the implemented form of the electronic device 101, the display may be folded and unfolded in various ways.

Figure 3:
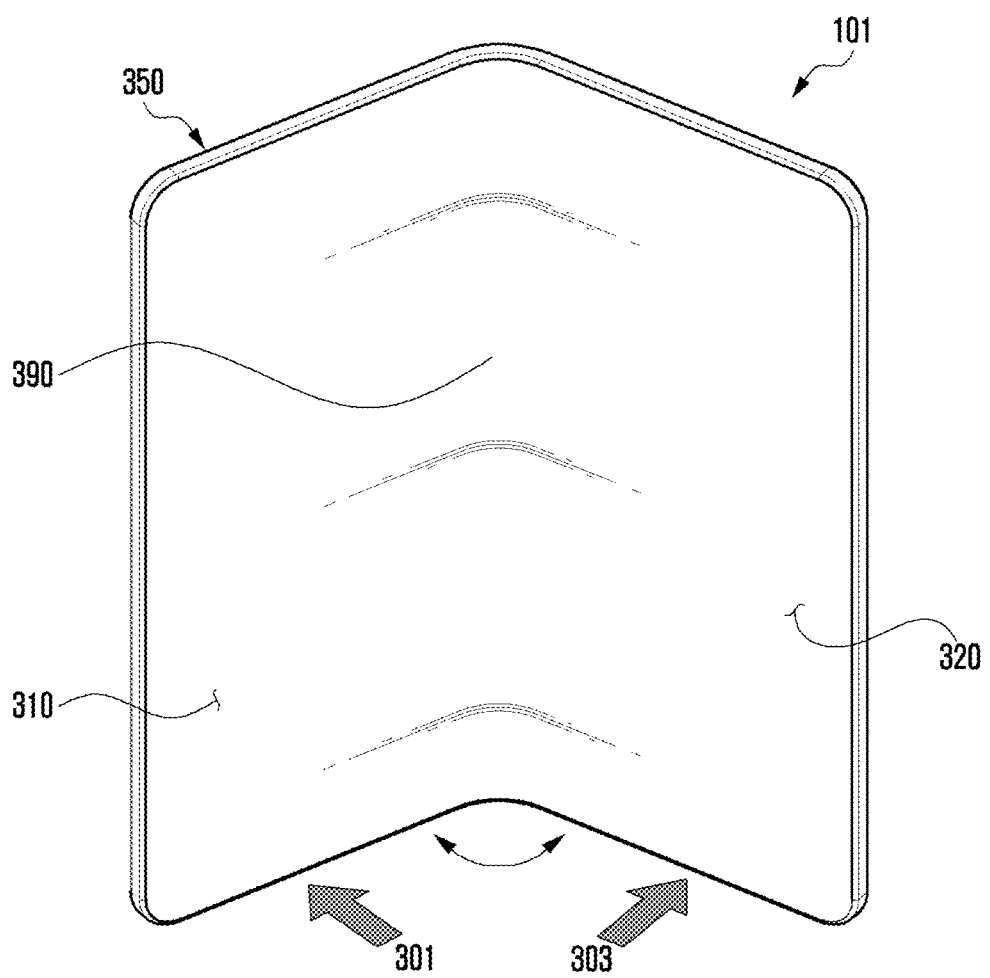
FIG. 3 illustrates an example of an electronic device according to an embodiment of the disclosure.
Figure 4:
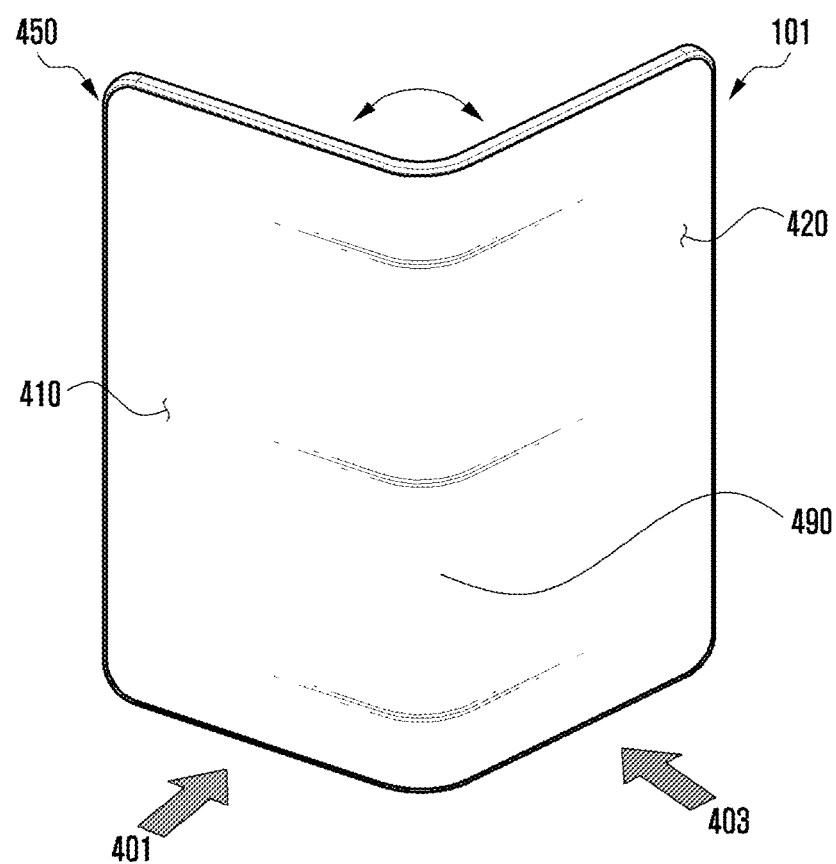
FIG. 4 illustrates an example of an electronic device according to an embodiment of the disclosure.

The examples of the electronic device 101 shown in FIGS. 3 and 4 may show that the electronic device 101 has one folding axis. For example, FIGS. 3 and 4 illustrate an example of changing the shape of a display (e.g., the display 210 in FIG. 2) of an electronic device 101 including two display surfaces (e.g., a first display surface and a second display surface). In the example of the electronic device 101 shown in FIGS. 5 and 6, the electronic device 101 may have two folding axes. For example, FIGS. 5 and 6 illustrate an example of changing the shape of the display 210 of the electronic device 101 including three display surfaces (e.g., a first display surface, a second display surface, and a third display surface). Various embodiments are not limited thereto, and are an example, and the number of folding axes that the electronic device 101 may have is not limited.

According to an embodiment, the electronic device 101 may include a foldable device which may be folded and then unfolded. According to an embodiment, the electronic device 101 may be equipped with a foldable (or bendable) display (e.g., a foldable display or a flexible display) and may be used while being folded or unfolded.

According to an embodiment, when the in-foldable electronic device 101 is folded (e.g., a folded state (or a closed state) based on the shape in FIG. 3 or 5), the electronic device 101 may be in a closed state such that the first display surface (or a first region) and the second display surface (or a second region) of the display 210 are at least partially in contact with each other based on a folded point (e.g., a folding axis or a hinge axis).

According to an embodiment, when the out-foldable electronic device 101 is folded (e.g., the folded state based on the shape in FIG. 4), the electronic device 101 may be in a closed state such a first part and a second part of a housing (e.g., a cover) are at least partially in contact with each other based on a folded point (e.g., a folding axis or a hinge axis).

According to an embodiment, when the in/out foldable electronic device 101 is folded (e.g., a folded state based on the shape in FIG. 6), the electronic device 101 may be in a closed state such that the first part and the second part of the housing (e.g., a cover) are at least partially in contact with each other based on a first folded point (e.g., a first folding axis) and the second display surface (or a second region) and the third display surface (or a third region) of the display 210 are at least partially in contact with each other based on a second folded point (e.g., a second folding axis).

According to an embodiment, when the electronic device 101 is unfolded (e.g., an unfolded state (or an open state)), all display surfaces (or regions) of the display 210 may be provided as one surface (or the entire surface) to be used as a display having a relatively large size. According to an embodiment, FIG. 3, 4, 5, or 6 illustrates a state (e.g., a partially closed state) in which the display of the electronic device 101 is folded at a predetermined angle (e.g., about 180 degrees) or less, based on a folding axis (or a hinge axis).

According to an embodiment, the electronic device 101 as illustrated in FIG. 3, 4, 5, or 6 may include a processor (e.g., the processor 120 in FIG. 1) and one display driver IC (DDIC, display driver IC) (e.g., the DDIC 230 in FIG. 2) operatively or electrically connected to the display 210. For example, the first display surface and the second display surface may be connected to one DDIC.

Embodiments of the disclosure are not limited thereto, and the electronic device 101 may include a first DDIC operatively or electrically connected to the first display surface, and a second DDIC operatively or electrically connected to the second display surface. According to an embodiment, the first display surface and the second display surface may be operatively or electrically connected to each other and may be formed by one display 210 (e.g., a foldable display or a flexible display).

According to embodiments of the disclosure, the display 210 may be folded or unfolded in various ways (e.g., in-foldably, out-foldably, or in/out foldably) depending on the implemented form of the electronic device 101.

Referring to FIG. 3, the electronic device 101 may include a housing 350 configured to fix a display 210 including a first display surface 310 (or a first region) and a second display surface 320 (or a second region). According to an embodiment, the housing 350 may include a foldable structure (e.g., a hinge structure). A first part 301 and a second part 303 may face away from each other in a folded state (or in a closed state) and face in the same direction in an unfolded state (or in an open state).

According to an embodiment, the electronic device 101 may include a vertical folding axis 390 passing through the center of the electronic device 101 (e.g., the center of the display 210 or between the first display surface 310 and the second display surface 320). The electronic device 101 may be folded, unfolded, or bent based on the folding axis 390. According to an embodiment, FIG. 3 illustrates the electronic device 101 which is folded inward such that the display 210 (e.g., the first display surface 310 and the second display surface 320) thereof is not exposed to the outside.

In the form of the electronic device 101 illustrated in FIG. 3, the electronic device 101 which is completely folded (e.g., in a folded state) may refer to the electronic device 101 in which two parts included in the display 210 (e.g., the first display surface 310 and the second display surface 320) face each other (or are opposite to each other) such that the two parts are completely parallel or almost parallel. For example, that the electronic device 101 which is completely folded may refer to the electronic device 101 in which the two parts are arranged to be closely neighbored without being necessarily in contact with each other.

In the form of the electronic device 101 illustrated in FIG. 3, the electronic device 101 which is fully unfolded (e.g., in an unfolded state) may refer to the electronic device 101 in a state in which the first display surface 310 of the display 210 and the second display surface 320 of the display 210 are visually exposed to the outside and form a flat surface as one display 210, and at this time, the display 210 may have the largest area exposed to the outside or may have an area close to the largest area.

Referring to FIG. 4, the electronic device 101 may include a housing 450 configured to fix a display 210 including a first display surface 410 (or a first region) and a second display surface 420 (or a second region). According to an embodiment, the housing 450 may include a foldable structure (e.g., a hinge structure), and a first part 401 and a second part 403 may face in the opposite directions in a folded state and face in the same direction in an unfolded state.

According to an embodiment, the electronic device 101 may include a vertical folding axis 490 passing through the center of the electronic device 101. The electronic device 101 may be folded, unfolded, or bent based on the folding axis 490. According to an embodiment, FIG. 4 illustrates the electronic device 101 which is folded outward such that the display 210 (e.g., the first display surface 410 and the second display surface 420) is visually exposed to the outside of the electronic device 101.

In the form of the electronic device 101 illustrated in FIG. 4, the electronic device 101 which is completely folded may refer to the electronic device 101 in which two parts (e.g., a housing) included in one surface (e.g., a rear surface) of the electronic device 101 face each other such that the two parts are completely or almost parallel. For example, that the electronic device 101 which is fully folded may refer to the electronic device in which the two parts included in one surface of the electronic device 101 are arranged to be closely neighbored without being necessarily in contact with each other.

In the form of the electronic device 101 illustrated in FIG. 4, the electronic device 101 which is fully unfolded may refer to the electronic device 101 in a state in which the first display surface 410 of the display 210 and the second display surface 420 of the display 210 are visually exposed to the outside and form a flat surface as one display 210, and at this time, the display 210 may have the largest area exposed to the outside or may have an area close to the largest area.

In the examples shown in FIGS. 3 and 4, the folding axes 390 and 490 are illustrated as passing through the center of the electronic device 101, but the folding axes 390 and 490 may be provided at arbitrary positions in the electronic device 101. For example, the electronic device 101 may be folded or bent asymmetrically with respect to the folding axes 390 and 490, and when the electronic device 101 is in a folded state, two facing display surfaces (or two regions) divided by the folding axes 390 and 490 may have different sizes (or sizes of the display surfaces separated after folding). In addition, depending on the degree to which the electronic device 101 is folded, the electronic device 101 may be in a fully folded state, a fully unfolded state, or an intermediate state thereof.

According to an embodiment, the electronic device 101 may detect a folded state of the electronic device 101 or degree to which the electronic device 101 is folded. According to an embodiment, the electronic device 101 may detect a folded state of the electronic device 101 or degree to which the electronic device 101 is folded, to activate or deactivate a partial display surface (or a partial region) of the display 210.

According to an embodiment, in the type as illustrated in FIG. 3, when the electronic device 101 detects a folded state thereof, all display surfaces (e.g., the first display surface 310 and the second display surface 320) of the display 210 may all be deactivated. According to an embodiment, in the type as illustrated n FIG. 4, the electronic device 101 detects a folded state thereof, the electronic device 101 may determine a display surface (e.g., the first display surface 410 (e.g., a front surface) or the second display surface 420 (e.g., a rear surface)) used by the electronic device 101, and based on the determination result, the electronic device may activate one surface of the display 210 that is being used and inactivate the other surface of the display 210 that is not being used.

Referring to FIG. 5, the electronic device 101 may include a housing 550 configured to fix a display 210 including a first display surface 510 (or first region), a second display surface 520 (or second region), and a third display surface 530 (or a third region). According to one embodiment, the housing 550 may include a foldable structure (e.g., a hinge structure). When the electronic device 101 is in a folded state, a first part 501 and a third part 505 may face in the opposite direction to the second part 503, and the first part 501 and the third part 505 may face in the same direction as each other. When the electronic device 101 is unfolded, the first part 501, the second part 503, and the third part 505 may face in the same direction.

According to an embodiment, FIG. 5 illustrates an example of an electronic device 101 including two folding axes 590 and 595. FIG. 5 illustrates an example in which the two folding axes 590 and 595 are employed in a vertical direction to divide the electronic device 101 into thirds. The electronic device 101 may be folded, unfolded, or bent based on the folding axes 590 and 595. For example, the electronic device 101 illustrated in FIG. 5 may represent an example of the G fold type electronic device, and may represent a partially folded state (or partially unfolded state) viewed from the front of the electronic device 101 and a folded state viewed from the back (or bottom) of the electronic device 101.

The electronic device 101 as illustrated in FIG. 5 may have different folding or bending directions, based on the respective folding axes 590 and 595. This is an example, and the folding or bending directions of the electronic device 101 may be the same, based on the respective folding axes 590 and 595. According to an embodiment, the electronic device 101 may be folded such that the first display surface 510 and the second display surface 520 of the display 210 face each other and the second display surface 520 and the third display surface 530 face each other. Without being limited thereto, when the electronic device 101 illustrated in FIG. 5 is folded in an out-folding manner, the electronic device 101 may be folded such that the first display surface 510, the second display surface 520, and the third display surface 530 are exposed to the outside, the rear surface of the first display surface 510 and the rear surface of the second display surface 520 face each other, and the rear surface of the second display surface 520 and the rear surface of the third display surface 530 face each other.

According to an embodiment, according to the position at which the two folding axes 590 and 595 are employed on the electronic device 101, the electronic device 101 may be folded or bent asymmetrically based on the respective folding axes 590 and 595. Even when the electronic device 101 is completely folded based on the folding axes 590 and 595, the respective display surfaces (or respective regions) of the electronic device 101 distinguished by the folding axes 590 and 595 do not completely overlap. According to an embodiment, even when the electronic device 101 as illustrated in FIG. 5 is provided with folding axes 590 and 595, the display 210 may be employed on the front surface and/or rear surface of the electronic device 101, and the display 210 may be activated or deactivated in a similar manner as given by the description with reference to FIGS. 3 and 4 above.

Referring to FIG. 6, the electronic device 101 may include a housing 650 configured to fix a display 210 including a first display surface 610 (or a first region), a second display surface 620 (or a second region), and a third display surface 630 (or a third region). According to an embodiment, the housing 650 may include a foldable structure (e.g., a hinge structure). When the electronic device 101 is in a folded state, the first part 601 and the third part 605 may face in the opposite direction to the second part 603, and the first part 601 and the third part 605 may face in the same direction as each other. When the electronic device 101 is unfolded, the first part 601, the second part 603, and the third part 605 may face in the same direction.

According to an embodiment, FIG. 6 illustrate an example of the electronic device 101 including two folding axes 690 and 695. FIG. 6 illustrates an example in which the two folding axes 690 and 695 are employed in a vertical direction to divide the electronic device 101 into a thirds. The electronic device 101 may be folded, unfolded, or bent based on the folding axes 690 and 695. For example, the electronic device 101 illustrated in FIG. 6 may represent an example of an S fold type electronic device, and may represent a partially folded state (or partially unfolded state) viewed from the front of the electronic device 101 and a folded state viewed from the back of the electronic device 101.

The electronic device 101 as illustrated in FIG. 6 may have different folding or bending directions, based on the respective folding axes 690 and 695. This is an example, and the folding or bending direction of the electronic device 101 may be the same, based on the respective folding axes 690 and 695. According to an embodiment, the electronic device 101 may be folded such that the first display surface 610 of the display 210 is exposed to the outside, the rear surface of the first display surface 610 and the rear surface of the second display surface 620 face each other, and the second display surface 620 and the third display surface 630 of the display 210 face each other.

According to an embodiment, according to the position at which the two folding axes 690 and 695 are employed on the electronic device 101, the electronic device 101 may be folded or bent asymmetrically, based on the respective folding axes 690 and 695. Even when the electronic device 101 is completely folded based on the folding axes 690 and 695, respective display surfaces (or respective regions) of the electronic device 101 distinguished by the folding axes 690 and 695 do not completely overlap. According to an embodiment, even when the electronic device 101 as illustrated in FIG. 6 is provided with folding axes 690 and 695, the display 210 may be employed on the front surface and/or rear surface of the electronic device 101, and the display 210 may be activated or deactivated in a similar manner as given by the description with reference to FIGS. 3 and 4 above.

According to an embodiment, the electronic device 101 may detect a change in shape (e.g., folding or unfolding) of the display 210, based on various methods.

According to an embodiment, the electronic device 101 may include a state detection sensor based on at least one sensor (e.g., the sensor module 176 in FIG. 1). According to an embodiment, the state detection sensor may include, for example, at least one of a proximity sensor, an illuminance sensor, a magnetic sensor, a Hall sensor, a gesture sensor, a bending sensor, an infrared sensor, a touch sensor, a pressure sensor, or an infrared camera, or a combination thereof. According to an embodiment, the state detection sensor may be located on one side (e.g., a folding axis, an end of a housing, under the display 210 (e.g., under panel, and/or bezel of display 210) of the electronic device 101 to measure the unfolded (or folded) angle of the electronic device 101. The unfolding angle may indicate an angle formed by the folding axis and two display surfaces of the electronic device 101 divided by the folding axis. According to an embodiment, the electronic device 101 may measure the unfolding angle to determine whether the electronic device 101 is in a fully folded state, a fully unfolded state, or an unfolded (or folded) state at a predetermined angle.

According to an embodiment, when the unfolding angle (or folding angle) measured by the electronic device 101 is about 180 degrees or an angle close thereto, the electronic device 101 may determine that the display 210 of the electronic device 101 is fully unfolded (e.g., an unfolded state). According to an embodiment, when the unfolding angle measured by the electronic device 201 is about 0 degrees or an angle close thereto, the electronic device 101 may determine that the display 210 of the electronic device 201 is fully folded (e.g., a folded state).

According to an embodiment, when the unfolding angle measured by the electronic device 101 is greater than or equal to a first designated angle (e.g., an angle at which the user's view is guaranteed, in a partially folded state (e.g., about 90 degrees)) and less than a second designated angle (e.g., about 180 degrees) (hereinafter referred to as a partially folded state), the electronic device 101 may determine that the display 210 of the electronic device 101 is in a partially folded (or a partially unfolded) (e.g., a partially folded) state. For example, when the measured unfolding angle (or folding angle) is within a predetermined angle range (e.g., the first designated angle (e.g., about 90 degrees) ≤angle<the second designated angle (e.g., about 180 degrees)), the electronic device 101 may determine that the display 210 of the electronic device 101 is folded, bent, or unfolded to the predetermined degree, based on data obtained from at least one sensor of the state detection sensor.

Figure 7A:
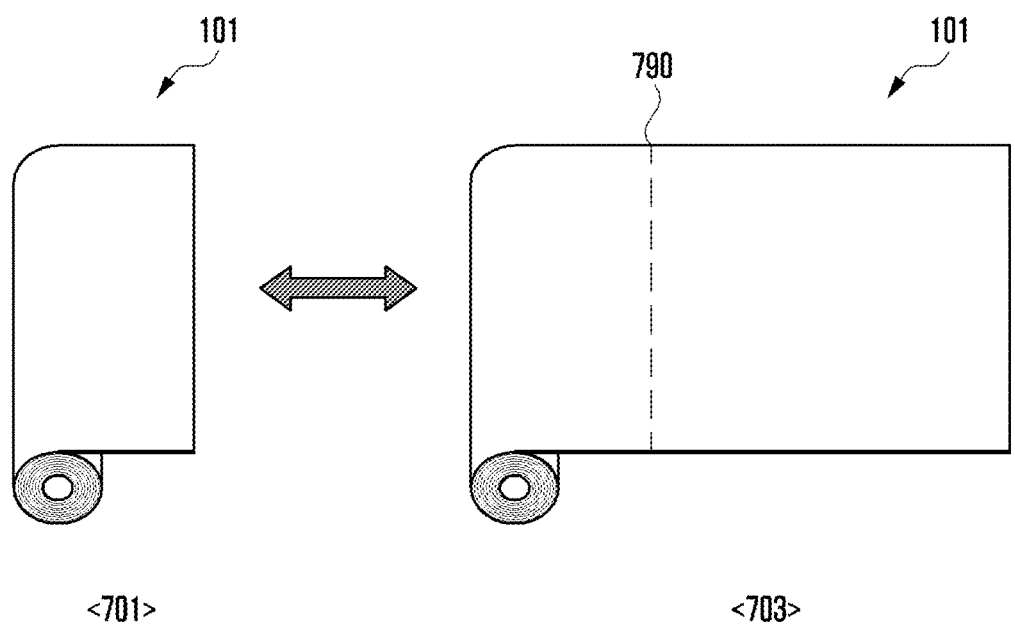
FIGS. 7A and 7B illustrate an example of an electronic device according to various embodiments of the disclosure.
Figure 7B:
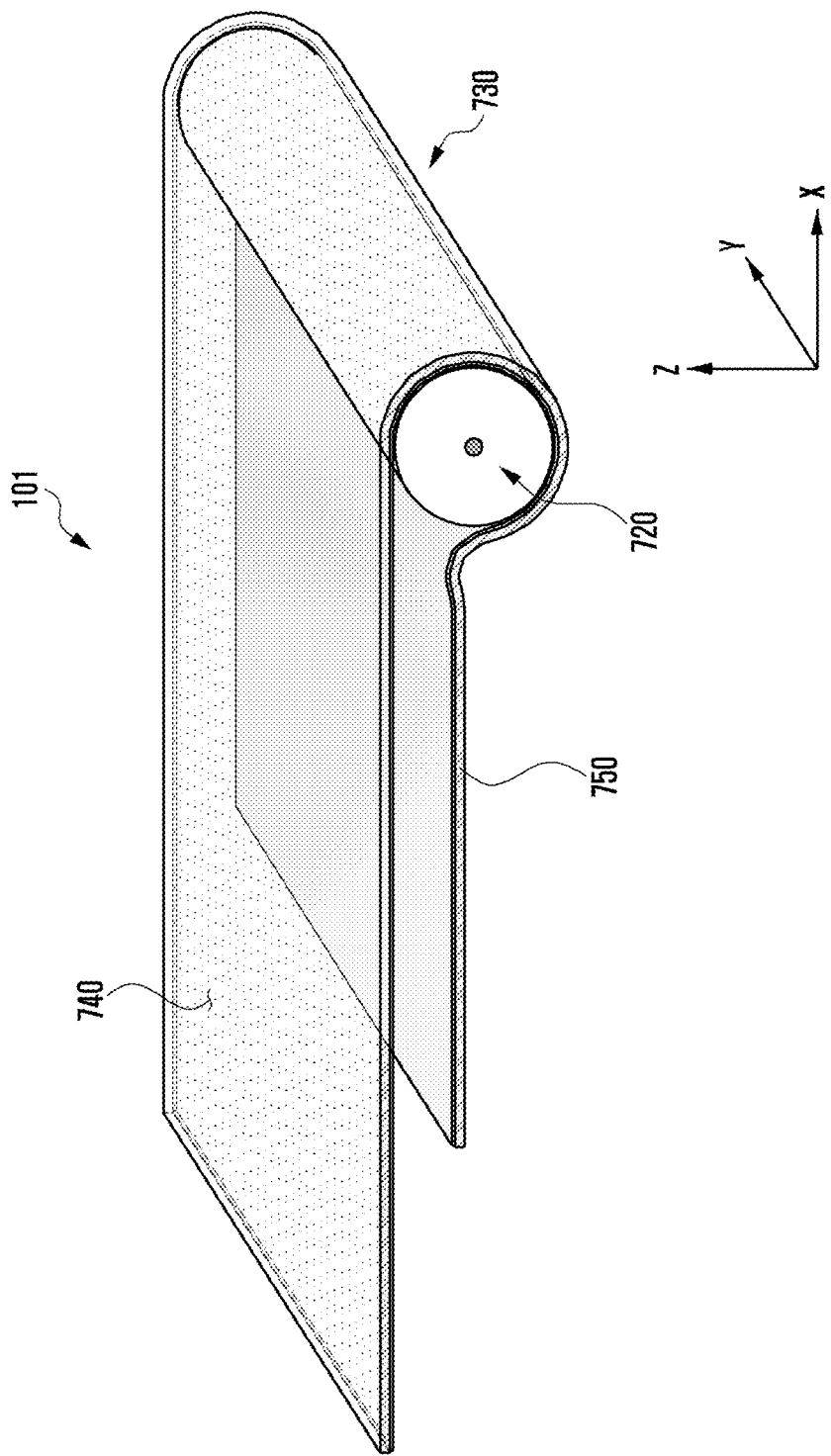

FIGS. 7A and 7B illustrate an example of an electronic device according to various embodiments of the disclosure.

Referring to FIGS. 7A and 7B, FIGS. 7A and 7B illustrate an example of an electronic device 101 (e.g., a rollable device) including a roll-up type display (e.g., a rollable display).

According to an embodiment, when the electronic device 101 is implemented in the rollable device in FIG. 7A, an area of the display 210 visually exposed to the outside may be relatively narrow (e.g., example <701>) or be relatively wide (e.g., example <703>) according to the degree to which the display 210 is unfolded by a user. For example, when the area exposed to the outside of the display 210 is relatively narrow as in Example <701> (e.g., when unfolded within the preconfigured first range), the electronic device 101 may be used in a first form (e.g., a folded state) (or a bar type form). For example, when the area exposed to the outside of the display 210 is relatively wide as in Example <703> (e.g., when unfolded to the preconfigured second range), the electronic device 101 may be used in a second form (e.g., an unfolded state) (or a tablet type or expanded display type).

According to an embodiment, based on the degree of unfolding curvature (e.g., a radius of curvature) of the display 210 is unfolded, the electronic device 101 may obtain information related to the size of the externally exposed region of the display 210. For example, the electronic device 101 may measure the unfolding curvature of the display 210 (or the electronic device 101), based on the state detection sensor.

According to an embodiment, a threshold curvature of the electronic device 101 may be determined in advance to measure the degree of unfolding curvature, and accordingly, the electronic device 101 may obtain the size of the region of the display 210 unfolded with a curvature greater than the threshold curvature. The electronic device 101 may determine whether the electronic device 101 is used in the first form (e.g., a folded state) as in example <701> or the second form (e.g., an unfolded state) as in example <703>, based on the information related to the obtained size.

According to an embodiment, the electronic device 101 may obtain information related to the size of the externally exposed region of the display 210 of the electronic device 101, with a virtual threshold line 790 placed on the display 210. For example, the electronic device 101 may obtain information on a curvature difference between two adjacent parts located in opposite directions with respect to the threshold line 790 on the display 210, based on the state detection sensor. When the curvature difference is greater than a predetermined value, the electronic device 101 may determine that the display 210 is exposed to the outside by an area exceeding the threshold line 790. The electronic device 101 may determine whether the electronic device 101 is used in the first form as in <701> or the second form as in <703>, based on the information related to the obtained size.

According to an embodiment, when the electronic device 101 is implemented in the rollable device in FIG. 7B, an externally exposed area of the display 210 may be relatively narrow or be relatively wide according to the degree to which the display 210 is unfolded by a user.

According to an embodiment, a roller unit 730 of the electronic device 101 may have a substantially cylindrical shape, but is not limited thereto. According to an embodiment, the roller unit 730 may include a roller 720 and a roller housing (not shown) surrounding the roller 720. According to an embodiment, the roller 720 may mounted inside the roller unit 730 to be rotatable by a bearing which is not shown. According to an embodiment, a part of a second display 750 of the display 210 may be slid into the roller unit 730 to be in contact with the roller 720. According to an embodiment, the roller 720 may be coated with an adhesive layer (not shown) having an adhesive function to adhere to the second display 750.

According to an embodiment, the display screen of the display 210 of the electronic device 101 may be at least partially expanded or reduced based on the slide movement of the display 210 (e.g., the second display 750). For example, the electronic device 101 may be operated in a sliding manner such that the width of one side of the first display 740 is partially variable. For example, the electronic device 101 may be operated in a sliding manner such that the width of the other side of the first display 740 is partially variable. According to an embodiment, the electronic device 101 may be operated such that the first display 740 has a first distance (D1) (or a first width (W1)) in the closed state. According to an embodiment, in the unfolded state, the electronic device 101 may be operated such that when the second display 750 is moved to have a second distance (D2) (or the second width (W2)) and the display screen of the display 210 has a third distance (D3) (e.g., a third width (W3)) greater than the first distance (D1) (e.g., increased by the second distance (D2)).

According to an embodiment, the display 210 may include a first display 740 always visible from the outside, and a second display 750 partially extending from a portion of the first display 740 and at least partially slidable into an inner space of the electronic device 101 to be invisible from the outside in a folded state. According to an embodiment, the first display 740 of the display 210 may be constantly exposed to the outside when the electronic device 101 is folded (e.g., a slide-in state of the second display 750) and when the electronic device is unfolded (e.g., a slide-out state of the second display 750). According to an embodiment, the second display 750 of the display 210 may be disposed in the inner space of the electronic device not to be exposed to the outside when the electronic device 101 is in a folded state (or the slide-in state), and may be exposed to the outside to extend from a portion of the first display 740 when the electronic device 101 is unfolded (or the slide-out state). Accordingly, the electronic device 101 may have the display screen of the display 210 which is partially expandable according to an opening operation (e.g., a sliding movement) of the second display 750.

According to an embodiment, the display 210 may have a display area corresponding to the first width (W1) in the folded state. According to an embodiment, the display 210 may have a display area in which a portion of the display 210 is expanded beyond the first width (W1) in a partially unfolded state (e.g., the slide-out state of the second display 750).

As described above with reference to FIGS. 3, 4, 5, 6, 7A, and 7B, the electronic device 101 according to an embodiment of the disclosure may include a foldable (or flexible or rollable) display 210 which is folded, bent, rolled, or unfolded. For example, the electronic device 101 may be folded, bent, or unfolded based on one or more folding axes as illustrated in FIG. 3, 4, 5, or 6, and may be rolled or unfolded based on the roller 720 as illustrated in FIG. 7A or 7B. According to the folding, bending, rolling, unfolding of the electronic device 101 and the degree thereof, the electronic device 101 may have various shapes. In an embodiment, the display 210 is described using an example of a vertical axis foldable display, but is not limited thereto, and may be applied in the form of a horizontal axis foldable display. The form of the display 210 that the electronic device 101 may vary.

Figure 8A:
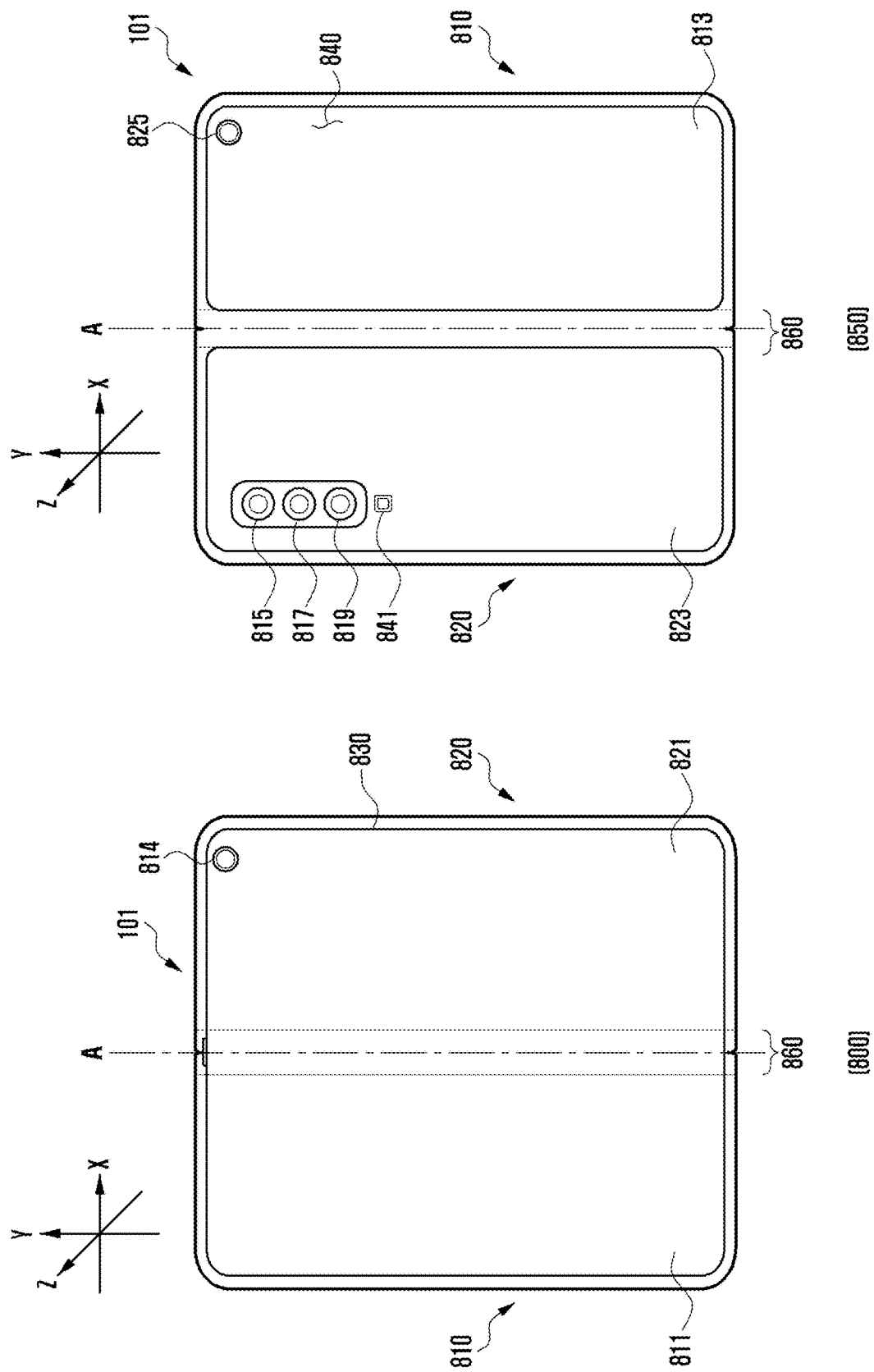
FIG. 8A illustrates an unfolded state of an electronic device according to an embodiment of the disclosure.

FIG. 8A illustrates an unfolded state of an electronic device according to an embodiment of the disclosure.

Referring to FIG. 8A illustrates a front surface 800 and a rear surface 850 of the electronic device 101 in an unfolded state.

Referring to FIG. 8A, the electronic device 101 according to an embodiment of the disclosure may include a first housing 810 including a first surface 811 and a third surface 813, and a second housing 820 including a second surface 821 and a fourth surface 823. The first surface 811 of the first housing 810 and the second surface 821 of the second housing 820 may represent the front surface 800 of the electronic device 101, and the third surface 813 of the first housing 810 and the fourth surface 823 of the second housing 820 may represent the rear surface 850 of the electronic device 101.

According to an embodiment, the first housing 810 and the second housing 820 may be disposed on both sides of the electronic device 101 with a folding axis (e.g., axis A) interposed therebetween, and may have a generally symmetrical shape with respect to the folding axis. For example, on the front surface 800 of the electronic device 101, with respect to the folding axis, the first housing 810 may be disposed on the left side of the electronic device 101, and the second housing 820 may be disposed on the right side of the electronic device 101. The first housing 810 and the second housing 820 may be designed to be folded relative to each other. A hinge structure 860 may be disposed between the first housing 810 and the second housing 820 to enable the front surface 800 of the electronic device 101 to be foldable.

According to an embodiment, the first housing 810 and the second housing 820 may have different angles or distances therebetween depending on whether the electronic device 101 is in an unfolded (or open) state, a folded (or closed) state, or an intermediate state.

In an embodiment, an unfolded state may refer to an open state, or a flat state (e.g., FIG. 8A). In an embodiment, the unfolded state is a state in which the first housing 810 and the second housing 820 are disposed side by side, and may refer to a state in which the electronic device 101 is fully unfolded. In an embodiment, in the unfolded state, an angle formed by the first housing 810 and the second housing 820 is about 180 degrees, and the first surface 811 of the first housing 810 and the second surface 821 of the second housing 820 may be disposed to face in the same direction (e.g., the first direction). FIG. 8A illustrates the front surface 800 of the electronic device 101 and the rear surface 850 of the electronic device 101 when the electronic device 101 is unfolded.

Figure 8B:
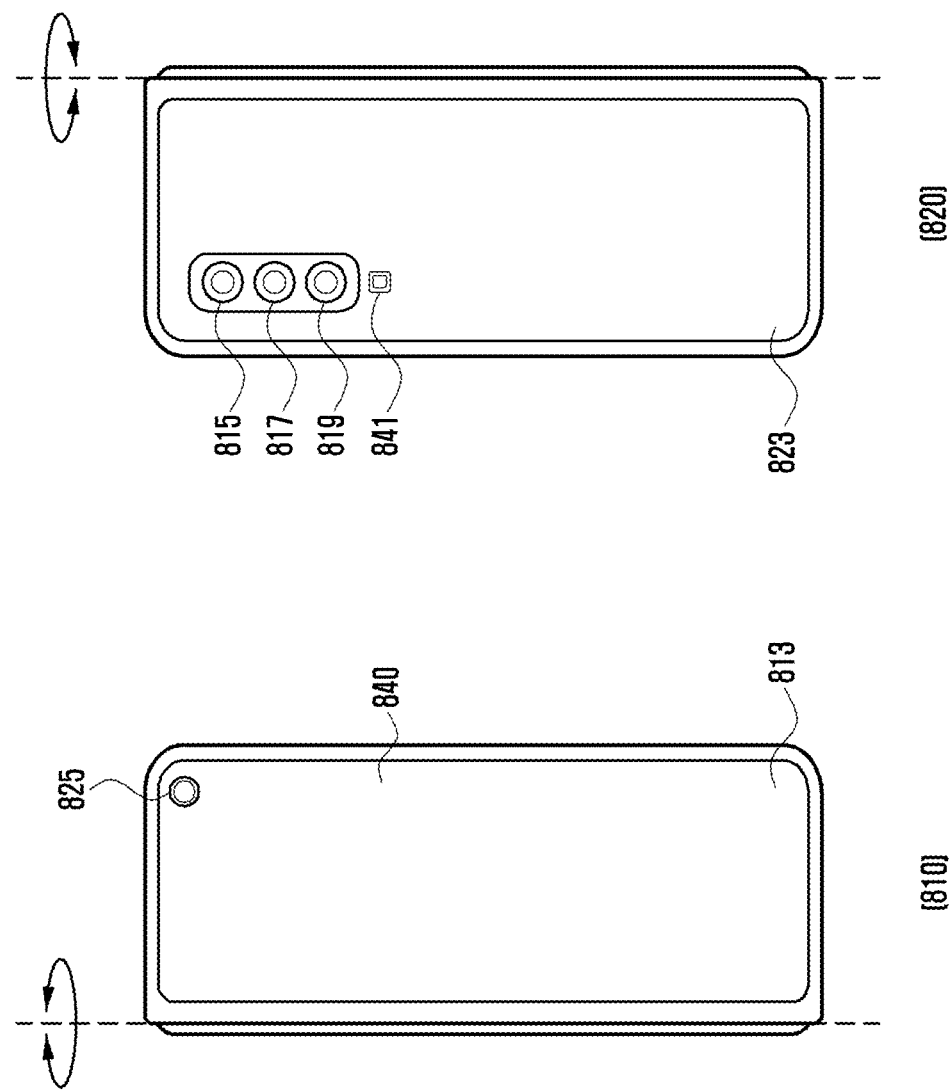
FIG. 8B illustrates a folded state of an electronic device according to an embodiment of the disclosure.

In an embodiment, a folded state may refer to a closed state (e.g., FIG. 8B). In an embodiment, the folded state is a state in which the first housing 810 and the second housing 820 are disposed to face each other, and may refer to a state in which the electronic device 101 is fully folded. In an embodiment, in the folded state, an angle formed by the first housing 810 and the second housing 820 is a narrow angle (e.g., about 0 degree to about 5 degrees), and the first surface 811 of the first housing 810 and the second surface of 821 of the second housing 820 may face each other. Hereinafter, a description of the electronic device 101 implemented in an in-folding manner will be given, but the same or similar implementation may be given for the electronic device 101 implemented in an out-folding manner.

In an embodiment, the intermediate state is a state in which the first housing 810 and the second housing 820 are disposed at a predetermined angle and may not be a state in which the electronic device 101 is unfolded or folded. In an embodiment, the intermediate state may refer to a state in which the first surface 811 of the first housing 810 and the second surface 821 of the second housing 820 form a predetermined angle (e.g., about 6 degrees to about 179 degrees).

According to an embodiment, the electronic device 101 may include a first display 830 (e.g., a main display) (e.g., the display module 160 in FIGS. 1 and/or 2) disposed on the first surface 811 and the second surface 821 which are the front surface 800 of the electronic device 101. The first display 830 may be entirely formed on the front surface 800 (e.g., in the first direction of the electronic device 101). The first display 830 may include a flexible display having at least a partial region which is deformable into a flat or curved surface. The first display 830 may be folded left and right based on a folding axis (e.g., axis A). The first display 830 may include a first display region corresponding to the first surface 811 or a second display region corresponding to the second surface 821. In addition, the electronic device 101 may dispose a first camera 814 on the second surface 821. The drawing illustrates that the first camera 814 is provided as one, the first camera 814 may be provided in plurality. Although the drawing illustrates that the first camera 814 is disposed on the second surface 821, the first camera 814 may be formed on the first surface 811.

According to an embodiment, the electronic device 101 may form a second display 840 (e.g., a cover display or a sub-display) (e.g., the display module 160 in FIGS. 1 and/or 2) on a part of the rear surface 850 of the electronic device 101. The second display 840 may be disposed on at least a part of the third surface 813 of the electronic device 101. According to an embodiment, the electronic device 101 may include a plurality of cameras (e.g., 815, 817, 819, and 825) on a rear surface 850 of the electronic device 101. For example, the electronic device 101 may include the second camera 815, the third camera 817, and the fourth camera 819 arranged on the fourth surface 823, and the fifth camera 825 disposed on the third surface 813.

According to an embodiment, the second camera 815, the third camera 817, the fourth camera 819, and the fifth camera 825 may have the same or different performance (e.g., field of view, resolution). For example, the second camera 815 may have a field of view greater than about 125 degrees (e.g., ultra-wide), the third camera 817 may have a field of view of about 90 degrees to about 125 degrees (e.g., wide), the fourth camera 819 may have a field of view of about 90 degrees and a 2× zoom (e.g., tele), and the fifth camera 825 may have a field of view of about 90 degrees and a normal magnification. According to an embodiment, the electronic device 101 may further include a sensor region 841 on the fourth surface 823. An infrared sensor, a fingerprint sensor, or an illuminance sensor may be disposed in the sensor region 841, similarly as in the sensor module 176 in FIG. 1.

According to an embodiment, in a state in which the electronic device 101 is unfolded (e.g., FIG. 2A), the first display 830 may be turned on (or activated) and the second display 840 may be turned off (or inactivated). When no user input (e.g., touch or button selection) is detected for a predetermined time (e.g., about 5 seconds, about 10 seconds, or about 1 minute) while being the first display 830 is turned on, the electronic device 101 may turn off the first display 830. According to an embodiment, when a user input (e.g., touch or button selection) is detected on the second display 840 while the second display 840 is turned off, the electronic device 101 may turn on the second display 840. According to an embodiment, when the second display 840 is turned on, the first display 830 may be turned off. According to an embodiment, the first display 830 may be maintained in an on state for a predetermined time even after the second display 840 is turned on, and then when a user input is not detected on the first display 830 even after a predetermined time has elapsed, the electronic device 101 may turn off the first display 830.

According to an embodiment, the electronic device 101 may further include a sensor module (e.g., the sensor module 176 in FIG. 1). For example, the electronic device 101 may include a sensor module 176 disposed in at least one of the first housing 810 and the second housing 820. The sensor module 176 may include at least one of an acceleration sensor, a gyroscope sensor, a geomagnetic sensor, a proximity sensor, an illuminance sensor, a gesture sensor, or a Hall sensor.

An acceleration sensor may be a sensor configured to detect speed, and a gyroscope sensor may detect angular velocity, which is a rotational speed of an object. A geomagnetic sensor serving as a sensor that detects geomagnetism may detect geomagnetic directions (e.g., azimuth) of east, west, south, and north, like a compass. The proximity sensor may detect whether an object is nearby, and the illuminance sensor may measure the amount of ambient light (e.g., illuminance) in real time or periodically. The gesture sensor may detect infrared rays. The Hall sensor may detect changes in electrical signals, based on the closeness or farness of an object with magnetism (or magnetic force). When the Hall sensor is used to detect the folded state of the electronic device 101, the electronic device 101 may further include a magnet corresponding to the Hall sensor.

FIG. 8B illustrates a folded state of an electronic device according to an embodiment of the disclosure.

Referring to FIG. 8B, the electronic device 101 may be in a state in which a hinge structure 860 is disposed around a folding axis (e.g., axis A) and the front surface 800 of the electronic device 101 is folded. FIG. 8B illustrates the third surface 813 of the first housing 810 and the fourth surface 823 of the second housing 820 when the electronic device 101 is folded.

According to an embodiment, when the electronic device 101 is in a folded state, the first display 830 may be turned off and the second display 840 may be turned on. When a user input is not detected for a predetermined time while the second display 840 is turned on, the electronic device 101 may turn off the second display 840. In the folded state of the electronic device 101, when a button disposed (or mounted) on the electronic device 101 is selected while the second display 840 is turned off, the electronic device 101 may turn on the second display 840. Alternatively, in the folded state of the electronic device, when a user input is detected on the second display 840 after the second display 840 is turned off, the electronic device 101 may turn on the second display 840.

Figure 8C:
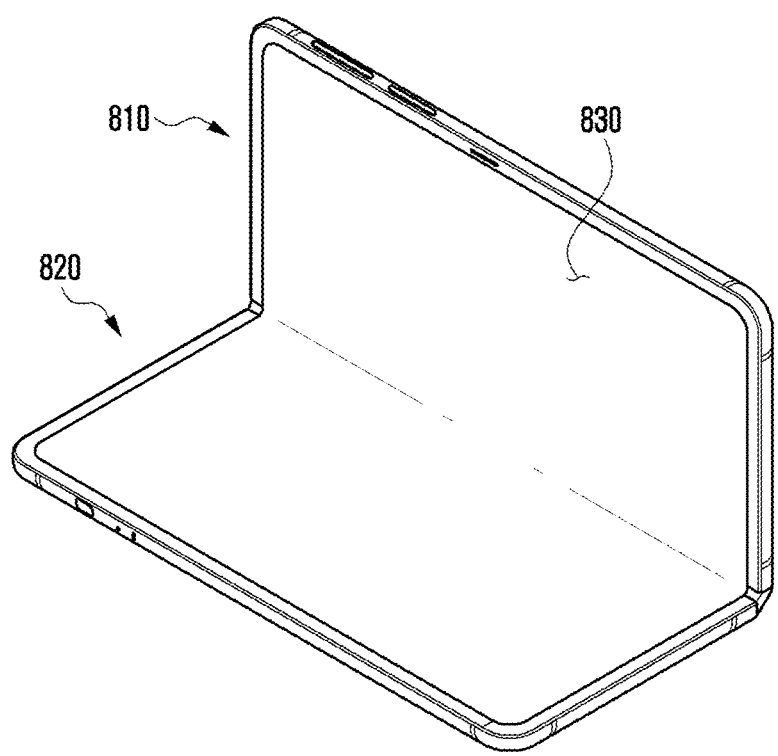
FIG. 8C illustrates a partially folded state or an intermediate state of an electronic device according to an embodiment of the disclosure.

FIG. 8C illustrates a partially folded state or an intermediate state of an electronic device according to an embodiment of the disclosure.

Referring to FIG. 8C, the electronic device 101 may be in an intermediate state 801 in which a hinge structure 860 is disposed around a folding axis (e.g., axis A) and the first housing 810 and the second housing 820 form a predetermined angle. For example, in the intermediate state 801, one surface of the first housing 810 or the second housing 820 may be placed on the floor, and the second housing 820 placed on the floor and the first housing 810 which is not placed on the floor may form a predetermined angle. The drawing shows that the fourth surface 823 of the second housing 820 is placed on the floor, and the first surface 811 of the first housing 810 and the second surface 821 of the second housing 820 form a predetermined angle.

According to an embodiment, in the intermediate state 801, the first display 830 may be activated and a user interface may be displayed through the first display 830. The user interface may be displayed through the entire screen of the first display 830 or displayed on two divided parts (or regions) like a split screen. Alternatively, in the intermediate state, an output unit (e.g., an execution screen of an application) may be displayed through the first surface 811 of the first housing 810, and an input unit (e.g., a keypad) may be displayed through the second surface 821 of the second housing 820.

In an embodiment of the disclosure, for convenience of explanation, the electronic device 101 has been described as a device having an asymmetrical front and rear display (e.g., a front first display and a rear (e.g., a cover surface) second display), but various embodiments according to the disclosure are not limited thereto. For example, hereinafter, the electronic device 101 according to an embodiment will be describe as a foldable device having one folding axis, but embodiments of the disclosure are not limited thereto. For example, the various embodiments to be described below are merely presenting specific components to easily explain the technical content of the disclosure and help understanding of the disclosure, and are not intended to limit the scope of the disclosure. Therefore, the scope of the disclosure should be construed as including all changes or modified forms derived based on the technical spirit of the disclosure in addition to the embodiments disclosed herein.

Figure 9:
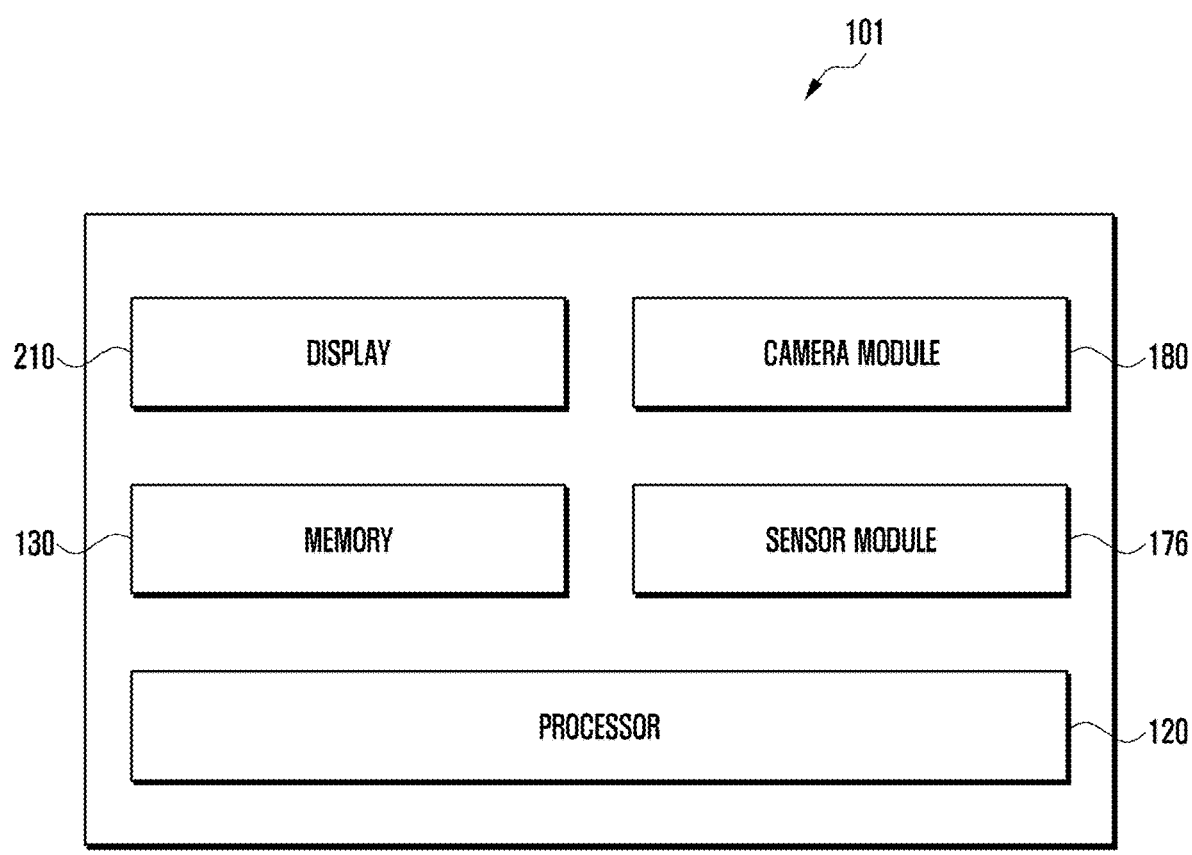
FIG. 9 schematically illustrates a configuration of an electronic device according to an embodiment of the disclosure.

FIG. 9 schematically illustrates a configuration of an electronic device according to an embodiment of the disclosure.

The electronic device 101 according to an embodiment of the disclosure may include various devices that may be used while being gripped by a user's one hand or two hands. According to an embodiment, the electronic device 101 may include a foldable device or a rollable device as described in the description with reference to FIGS. 3, 4, 5, 6, 7A, and 7B described above.

Referring to FIG. 9, the electronic device 101 according to an embodiment of the disclosure may include a display 210, a memory 130, a camera module 180, a sensor module 176, and/or a processor 120. According to an embodiment, the electronic device 101 may not include at least one component (e.g., the camera module 180). According to an embodiment, the electronic device 101 may include one or more other components (e.g., the communication module 190, the power management module 188, and/or the battery 189 in FIG. 1). For example, the electronic device 101 may include all or at least some of the components of the electronic device 101 as described in the description with reference to FIG. 1.

According to an embodiment, the display 210 may correspond to the display module 160 or the display 210 as described in the description with reference to FIGS. 1 and/or 2. According to an embodiment, the display 210 may visually provide various information to the outside of the electronic device 101 (e.g., a user). According to an embodiment, the display 210 may visually provide various information related to an application under the control of the processor 120.

According to an embodiment, the display 210 may include a front first display (e.g., a main display), and a rear second display (e.g., a cover display). According to an embodiment, the display 210 may include a touch sensor, a pressure sensor capable of measuring the intensity of a touch, and/or a touch panel (e.g., a digitizer) configured to detect a magnetic stylus pen. According to an embodiment, the display 210 may measure a change in a signal (e.g., voltage, light amount, resistance, electromagnetic signal, and/or charge amount) for a specific location of the display 210, based on the touch sensor, the pressure sensor and/or the touch panel, thereby detecting a touch input and/or a hovering input (or a proximity input). According to an embodiment, the display 210 may include a liquid crystal display (LCD), an organic light emitted diode (OLED), or an active matrix organic light emitted diode (AMOLED). According to an embodiment, the display 210 may include a flexible display.

According to an embodiment, the memory 130 may correspond to the memory 130 as described in the description with reference to FIG. 1. According to an embodiment, the memory 130 may store various data used by the electronic device 101. In an embodiment, the data may include, for example, input data or output data for an application (e.g., the program 140 in FIG. 1) and commands associated with the application.

In an embodiment, the data may include various sensor data (e.g., acceleration sensor data, gyro sensor data, or air pressure sensor data) obtained from the sensor module 176. In an embodiment, the data may include sensor data (e.g., touch sensor data) obtained from a touch sensor of the display 210. In an embodiment, the data may include various reference data configured in the memory 130 to identify a designated state (e.g., a first designated state (e.g., an unfolded state), a second designated state (e.g., a partially folded state), and a third designated state (e.g., a folded state)) of the electronic device 101. In an embodiment, the data may include various schemas (or algorithms) configured in the memory 130 to identify the user's gripping state. In an embodiment, the data may include various schemas (or algorithms) configured in the memory 130 to measure the distance between the user's gripping point and at least one object (e.g., a control object or function controller) for controlling a function related to the application on the execution screen of the application.

According to an embodiment, the memory 130 may store instructions that, when executed, cause the processor 120 to perform operations. For example, the application may be stored as software (e.g., the program 140 in FIG. 1) on the memory 130 and may be executable by the processor 120. According to an embodiment, the application may be various applications (e.g., service (or function) for optimizing usability according to a gripping state (hereinafter referred to as "optimization service") capable of providing various services in the electronic device 101.

In an embodiment, the optimization service may represent a service that supports to enable a control object (or a controller) in the most inaccessible region to be duplicatively provided to the most optimized region while a user is gripping the electronic device 101. For example, the optimization service may represent a service by which at least one control object for controlling a function related to an application running on the electronic device 101 is duplicatively provided to an optimized region according to a user's gripping state of the electronic device 101 to minimize the user's finger movement distance.

According to an embodiment, a control object may include one or more control objects for controlling a function related to an application running in the foreground. According to an embodiment, the control object may indicate a control object provided on an execution screen currently displayed through the display 210, among various control objects related to an application. According to an embodiment, a control object may be selected as a target of duplicate object (e.g., a target control object) for an optimization service of a control object located at the farthest distance from a user's gripping position (e.g., a touched point). In an embodiment, the gripping position (or point) may include, for example, a point of the front display 210 touched by the user's finger.

According to an embodiment, the sensor module 176 may correspond to the sensor module 176 as described in the description with reference to FIG. 1. According to an embodiment, the sensor module 176 may include a state detection sensor. According to an embodiment, the state detection sensor may include, for example, at least one of a proximity sensor, an illuminance sensor, a magnetic sensor, a Hall sensor, a gesture sensor, a bending sensor, an infrared sensor, a touch sensor, a pressure sensor, or an infrared camera, or a combination thereof.

According to an embodiment, the state detection sensor may be located on one side (e.g., folding axis, the end of a housing, under the display 210 (e.g., under panel, and/or bezel of display 210) of the electronic device 101 to measure a folding (or unfolding) angle of the electronic device 101. According to an embodiment, the electronic device 101 may determine a designated state of the electronic device 101, based on sensor data (e.g., a folding angle) by using the state detection sensor of the sensor module 176.

According to an embodiment, the camera module 180 may include a first camera module disposed on a first surface (e.g., the front first display surface or rear second display) of the electronic device 101 and/or a second camera module disposed on a second surface (e.g., a rear housing). According to an embodiment, the camera module 180 may include one or a plurality of lenses, an image sensor, and/or an image signal processor (ISP). According to an embodiment, two or more lenses (e.g., wide-angle and telephoto lenses) and image sensors may be disposed on one surface of the electronic device 101.

According to an embodiment, the camera module 180 may be used for an operation of identifying a user's gripping state. For example, the camera module 180 (e.g., a camera module disposed on a rear housing) may be activated during an operation of identifying a user's gripping state, under the control of the processor 120. For example, the camera module 180 may transmit a related result (e.g., a captured image) to the processor 120 through photographing a subject while being activated. According to an embodiment, the processor 120 may operate to determine whether an object corresponding to the user's finger is present, through object recognition from the related result (e.g., a captured image) of the camera module 180.

According to an embodiment, the processor 120 may perform an application layer processing function requested by a user of the electronic device 101. According to an embodiment, the processor 120 may provide functional control and commands for various blocks of the electronic device 101. According to an embodiment, the processor 120 may perform calculations or data processing related to control and/or communication of each component of the electronic device 101. For example, the processor 120 may include at least some of the components and/or functions of the processor 120 of FIG. 1. For example, the processor 120 may be operatively connected to components of the electronic device 101. The processor 120 may load commands or data received from other components of the electronic device 101 into the memory 130, process the commands or data stored in the memory 130, and store resultant data.

According to an embodiment, the processor 120 may include processing circuitry and/or executable program elements. According to an embodiment, the processor 120 may control (or process) an operation related to providing an optimization service, based on the processing circuitry and/or executable program element. According to an embodiment, the processor 120 may control (or process) an operation related to providing at least one control object for controlling a function related to an application in a designated state of the electronic device 101 to the optimized region corresponding to the user's gripping state of the electronic device 101, based on the processing circuitry and/or executable program elements.

According to an embodiment, the processor 120 may control the display 210 such that an execution screen of an application is displayed in a designated state (e.g., a first designated state or a second designated state) of the electronic device 101. According to an embodiment, the processor 120 may detect a control object from an execution screen. According to an embodiment, the processor 120 may determine a user's gripping state. According to an embodiment, the processor 120 may determine at least one target control object from control objects, based on the designated state and the gripping state. According to an embodiment, the processor 120 may produce a duplicate control object, based on a control object corresponding to the determined target control object. According to an embodiment, the processor 120 may float and provide a duplicate control object to an optimization region corresponding to the gripping state.

According to an embodiment, the processor 120 may detect one or more control objects for controlling a function related to an application running in the foreground. According to an embodiment, the processor 120 may detect a control object from an execution screen currently displayed through the display 210.

According to an embodiment, the processor 120 may determine a gripping position for an optimization region, based on a gripping state. According to an embodiment, the processor 120 may determine a target control object, based on the distance between the determined gripping position and the control object.

According to an embodiment, the processor 120 may determine, as a target control object, a control object located at the farthest distance from the gripping position, in the designated state (e.g., a first designated state or second designated state). According to an embodiment, the processor 120 may provide, to the gripping position, a duplicate control object corresponding to the control object determined as the target control object.

According to an embodiment, the processor 120 may distinguish the display 210 as a plurality of virtual division regions in the background, based on designated division information. According to an embodiment, the processor 120 may determine a target control object, based on a control object in the division region located at the farthest distance from the division region of the gripping position.

According to an embodiment, the processor 120 may calculate the straight-line distance between the gripping position and the control object in the first designated state of the electronic device 101 and determine the farthest control object as a target control object. According to an embodiment, the processor 120 may determine a control object in the farthest hinge region as a target control object, based on the calculation of the three dimensional (3D) distance between the control object and the gripping position, in the second designated state of the electronic device 101.

According to an embodiment, a detailed operation of the processor 120 of the electronic device 101 will be described with reference to drawings to be described later.

According to an embodiment, operations performed by the processor 120 may be implemented as a recording medium (or a computer program product). For example, the recording medium may include a non-transitory computer-readable recording medium in which a program for executing various operations performed by the processor 120 is recorded.

The embodiments described in this disclosure may be implemented in a recording medium readable by a computer or similar device by using software, hardware, or a combination thereof. According to hardware implementation, the operations described in an embodiment may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and/or electrical units for perform other functions.

In an embodiment, the recording medium (or computer program product) may include a computer-readable recording medium having a program for executing operations of displaying an execution screen of an application in a designated state (e.g., a first designated state or a second designated state) of the electronic device 101, detecting a control object (or a controller) from an execution screen, determining a user's gripping state, identifying at least one target control object from the control object, based on the designated state and gripping state, and providing a duplicate control object corresponding to the control object identified as a target control object to the optimization region corresponding to the gripping state.

The electronic device 101 according to an embodiment of the disclosure may include a display (e.g., the display module 160 in FIG. 1, the display 210 in FIG. 2 or 9), a memory (e.g., the memory 130 in FIG. 1 or 9), and a processor (e.g., the processor 120 in FIG. 1 or 9) operatively connected to the display and the memory.

According to an embodiment, the processor 120 may control the display to display an execution screen of an application in a designated state of the electronic device 101. According to an embodiment, the processor 120 may detect at least one control object from the execution screen. According to an embodiment, the processor 120 may determine a user's gripping state. According to an embodiment, the processor 120 may identify a target control object from the at least one control object, based on the designated state and the gripping state. According to an embodiment, the processor 120 may provide a duplicate control object corresponding to the target control object to an optimization region corresponding to the gripping state.

According to an embodiment, the first designated state may include a fully unfolded state of the electronic device. According to an embodiment, the second designated state may include a partially folded state of the electronic device.

According to an embodiment, the control object may include one or more control objects for controlling a function related to an application running in the foreground. According to an embodiment, the control object may be detected from an execution screen currently displayed through the display.

According to an embodiment, the processor 120 may determine a gripping position for the optimization region, based on the gripping state. According to an embodiment, the processor 120 may determine the target control object, based on the distance between the gripping position and the control object.

According to an embodiment, the processor 120 may determine, as the target control object, a control object located at the farthest distance from the gripping position in the designated state. According to an embodiment, the processor 120 may produce a duplicate control object, based on the control object determined as the target control object. According to an embodiment, the processor 120 may provide the duplicate control object to the gripping position.

According to an embodiment, the processor 120 may distinguish the display as a plurality of virtual division regions in the background, based on designated division information. According to an embodiment, the processor 120 may determine a target control object, based on a control object in the division region located at the farthest distance from the division region of the gripping position.

According to an embodiment, the processor 120 may calculate the straight-line distance between a control object and the gripping position in the first designated state of the electronic device 101 to determine the farthest control object. According to an embodiment, the processor 120 may determine a control object in the farthest hinge region, based on the calculation of the 3D distance between a control object and the gripping position in the second designated state of the electronic device 101.

According to an embodiment, at the time of determining the target control object, the processor 120 may determine a target control object, based on an additional point, considering a designated condition along with a distance.

According to an embodiment, the processor 120 may determine the optimization region, based on the gripping position or a region around the gripping position. According to an embodiment, the optimization region may be a region corresponding to the gripping position or may include a region that does not overlap with other objects, based on the gripping position.

According to an embodiment, the processor 120 may float and provide a duplicate control object having the corresponding function to the optimization region while maintaining the target control object at the original position thereof.

According to an embodiment, the processor 120 may provide a floating action button, based on the gripping position. According to an embodiment, the floating action button may include a call object for calling a duplicate control object corresponding to a control object designated as a target control object.

According to an embodiment, the processor 120 may provide the floating action button to the gripping position. According to an embodiment, the processor 120 may provide the duplicate control object corresponding to the control object to the gripping position in response to a user input based on the floating action button.

According to an embodiment, the processor 120 may provide a visual cue having a visual effect applied thereto, based on the control object determined as the target control object. According to an embodiment, the visual cue may be maintained while a floating action button or a duplicate control object is provided.

According to an embodiment, the processor 120 may produce a duplicate control object having a function corresponding to a control object designated as a target control object. According to an embodiment, the processor 120 may map a location at which the duplicate control object is to be provided with a location of a floating action button.

According to an embodiment, the processor 120 may determine a designated state of the electronic device 101. According to an embodiment, the processor 120 may determine a target control object, based on a first designated condition between a gripping position and a control object in the first designated state. According to an embodiment, the processor 120 may determine a target control object, based on a second designated condition between a gripping position and a control object in the second designated state.

According to an embodiment, the control object may be in the form of a single control object and/or in the form of bundled control objects. According to an embodiment, when a target control object is in the form of a single control object, the processor 120 may produce a duplicate control object in the form of a single control object corresponding to the corresponding control object. According to an embodiment, when a target control object is in the form of bundled control objects, the processor 120 may produce a duplicate control object in the form of bundled control objects corresponding to the control object.

According to an embodiment, the processor 120 may determine whether a space for a duplicate control object is securable in a region corresponding to a gripping position, based on a designated condition of the region corresponding to the gripping position and a duplicate control object.

According to an embodiment, the processor 120 may determine an optimization region to which the duplicate control object is to be provided, based on whether a space for a duplicate control object is securable.

According to an embodiment, when the space is securable, the processor 120 may determine a region of the gripping position as the optimization region. According to an embodiment, when the space is not securable, the processor 120 may determine a region around the gripping position as the optimization region. According to an embodiment, at the time of determining the optimization region, the processor 120 may correct the optimization region, based on the presence or absence of other objects overlapping the determined optimization region.

According to an embodiment, the processor 120 may move or remove a floating action button or a duplicate control object or change a target control object, based on an interaction with a user based on the floating action button or the duplicate control object.

Hereinafter, a method for operating the electronic device 101 according to various embodiments will be described in detail. Operations performed by the electronic device 101 according to various embodiments may be executed by the processor 120 including various processing circuitry and/or executable program elements of the electronic device 101. According to an embodiment, operations performed by the electronic device 101 may be executed by instructions that are stored in the memory 130 and cause the processor 120 to operate when executed.

Figure 10:
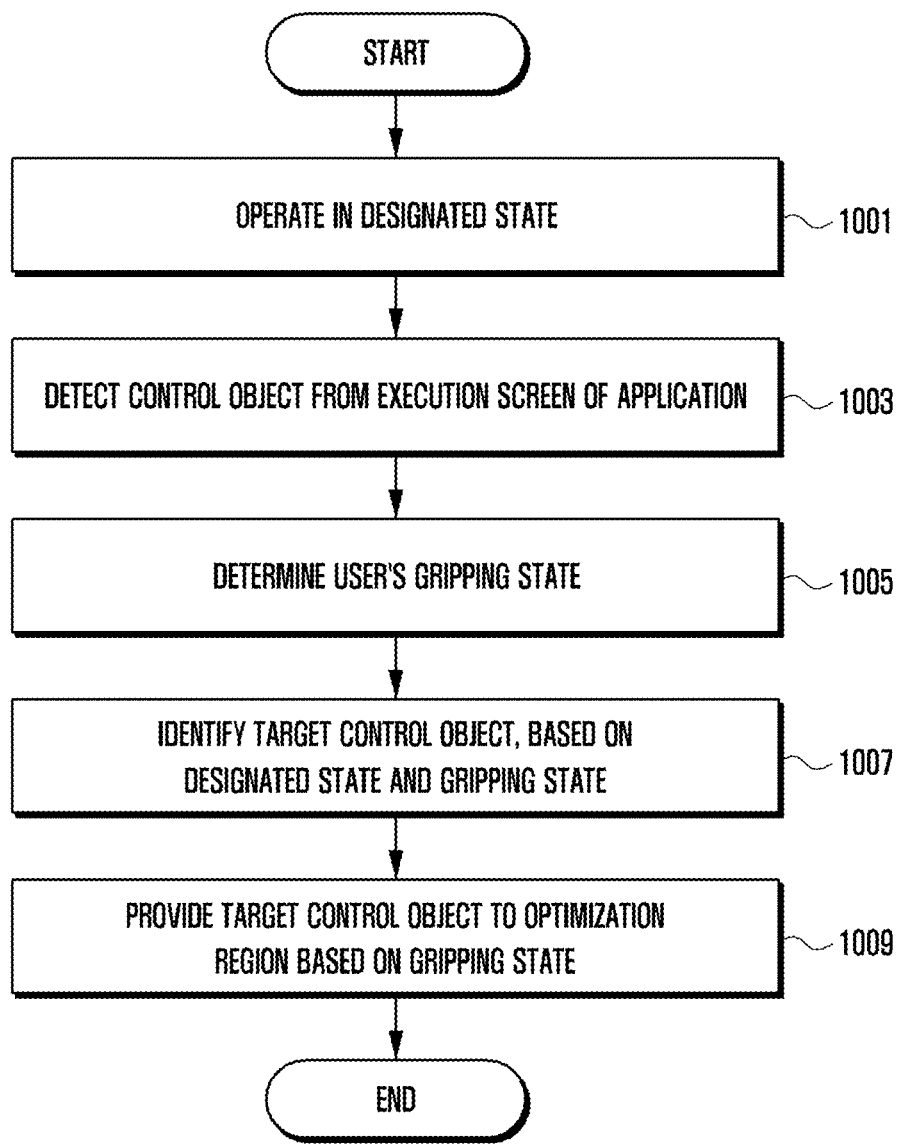
FIG. 10 is a flowchart illustrating a method for operating an electronic device according to an embodiment of the disclosure.

FIG. 10 is a flowchart illustrating a method for operating an electronic device according to an embodiment of the disclosure.

FIG. 11 illustrates an example of a designated state of an electronic device according to an embodiment of the disclosure.

Referring to FIG. 10 illustrates an example in which the electronic device 101 according to an embodiment supports an optimization service by which a control object in the most inaccessible region is duplicatively provided to the most optimized region while a user is gripping the electronic device 101.

A method for supporting an optimization service in the electronic device 101 according to an embodiment of the disclosure may be performed, for example, according to a flowchart illustrated in FIG. 10. The flowchart shown in FIG. 10 is only a flowchart according to an embodiment of an optimization service method of the electronic device 101, and the order of at least some operations may be changed, performed in parallel, performed as an independent operation, or at least some other operations may be performed complementary to at least some operations. According to an embodiment of the disclosure, operations 1001 to 1009 may be performed by at least one processor 120 of the electronic device 101.

Referring to FIG. 10, an operating method (e.g., an operating method for optimizing usability according to a user's gripping state of the electronic device 101) performed by the electronic device 101 according to an embodiment may include operation 1001 of operating in a designated state, operation 1003 of detecting a control object from an execution screen of an application, operation 1005 of determining a user's gripping state, operation 1007 of identifying a target control object, based on the designated state and gripping state, and operation 1009 of providing the target control object to the optimization region, based on the gripping state.

Referring to FIG. 10, in operation 1001, the processor 120 of the electronic device 101 may operate in a designated state of the electronic device 101. In an embodiment, the designated state may refer to various state information related to a device state of the electronic device 101 used by a user. For example, the designated state may be used as a meaning encompassing states determined based on various state information on whether the electronic device 101 is unfolded, an unfolding (or folding) angle, an operating mode (e.g., a flex mode, an unfolded mode, a folded mode), and/or an application to be executed. According to an embodiment, the processor 120 may control the display 210 such that an execution screen of an application is displayed in a designated state (e.g., a first designated state or a second designated state) of the electronic device 101. According to an embodiment, a user may use the electronic device 101 in a first designated state (e.g., a fully unfolded state) or a second designated state (e.g., a partially folded state). An example of this is shown in FIG. 11.

Referring to FIG. 11, the first designated state may indicate a state in which the electronic device 101 is fully unfolded, as in example 1101. For example, the first designated state may include a state (e.g., a state in which the unfolding angle (or folding angle) is about 180 degrees) in which the first display surface 1110 of the display 210 of the display 210 of the electronic device 101 and the second display surface 1120 of the display 210 of the electronic device 101 are exposed to the outside to form a plane, like one display 210.

Referring to FIG. 11, the second designated state may indicate a state in which the electronic device 101 is partially folded, as in example 1103. For example, the second designated state may include a state (e.g., a state in which the unfolding angle (or folding angle) is within a designated angle range) in which the first display surface 1110 of the display 210 of the electronic device 101 and the second display surface 1120 of the display 210 of the electronic device 101 form a predetermined angle. For example, the second designated state may include a state in which an unfolding angle (or a folding angle) between the first display surface 1110 and the second display surface 1120 forms an angle greater than or equal to a first designated angle (e.g., the angle at which the user's field of view is guaranteed in the partially folded state (e.g., approximately 90 degrees)) and less than a second designated angle (e.g., approximately 180 degrees).

In operation 1003, the processor 120 may detect a control object from the execution screen of the application. According to an embodiment, the processor 120 may detect one or more control objects related to function control supportable by the application from the execution screen of the application which is being displayed through the display 210.

According to an embodiment, the control object may include various objects selectable by a user to control a function related to an application running in the foreground. For example, the processor 120 may detect a control object (e.g., objects related to go to previous page, go to next page, go home, refresh, favorites, app icon, login, and/or category selection) related to a function of an application (e.g., a browser) from an Internet browser screen. For example, the processor 120 may detect a control object (e.g., objects related to pausing/playing, selecting previous/next content, switching landscape/portrait mode, adjusting sound, adjusting brightness, and/or selecting playback speed) related to the function of an application (e.g., a player) from a media (e.g., image or video) playback screen. Without being limited thereto, the processor 120 may detect various control objects from an execution screen executable in the electronic device 101 and currently displayed through the display 210, such as a control object related to the function of an application (e.g., gallery) from a gallery screen, a control object related to the function of an application (e.g., calendar) from a calendar screen, and/or a control object related to the function of an application (e.g., messages or messenger) from a message or messenger screen.

In operation 1005, the processor 120 may determine a user's gripping state. According to an embodiment, the processor 120 may identify a gripping position on the display 210, based on a touched point of the display 210.

According to an embodiment, the processor 120 may identify a user's gripping state (e.g., left hand gripping, right hand gripping, or both hand gripping, and a region of the display 210 where the user's hand is positioned), based at least on acquired data (e.g., sensor data and/or a captured image) from the sensor module 176 (e.g., a grip sensor in a bezel region), the rear camera module 180, and/or the rear display (e.g., a touch sensor of a cover display), and identify a gripping position, based on the gripping state. For example, the processor 120 may receive sensor data (e.g., a position value) from the sensor module 176 and/or a touch sensor of the cover display and determine a gripping state, based on the sensor data. For example, the processor 120 may acquire a captured image (e.g., an image for identifying the presence or absence of the user's finger) from the rear camera module 180 and determine the presence or absence of an object based on the captured image to determine a gripping state. According to an embodiment, an operation of determining a user's gripping state will be described with reference to the drawings to be described later.

According to an embodiment, operations 1003 and 1005 are not limited to the illustrated order and may be performed in parallel, sequentially, in reverse order, or heuristically.

In operation 1007, the processor 120 may identify a target control object, based on the designated state and the gripping state. According to an embodiment, the processor 120 may determine at least one target control object from among a plurality of control objects, based on the distance between a gripping position and a control object. For example, the processor 120 may determine, as a target control object, a control object located at the farthest distance from the gripping position in a designated state (e.g., a first designated state or a second designated state) of the electronic device 101.

According to an embodiment, the processor 120 may distinguish the display 210 as a plurality of virtual division regions in the background, based on designated division information (e.g., the number of divided screens), and determine a target control object, based on the division region of the gripping position and the division region in which the control object is located. For example, the processor 120 may determine a target control object, based on a control object in the division region located at the farthest distance from the division region of the gripping position.

According to an embodiment, the processor 120 may identify the farthest control object, based on calculation of the straight-line distance on the screen between the control object and the gripping position, in the first designated state of the electronic device 101. According to an embodiment, the processor 120 may identify the farthest control object, based on calculation of the 3D distance between the control object and the gripping position, in the second designated state of the electronic device 101.

According to an embodiment, when the processor 120 determines the target control object, the processor 120 may determine the target control object in consideration of a designated condition (e.g., usage frequency, usage time, assigned priority, and/or number of bundles of functional objects) along with the distance. According to an embodiment, the processor 120 may assign an additional point to a control object located on the folding axis in a second designated state. According to an embodiment, an operation of determining a target control object will be described with reference to the following drawings.

In operation 1009, the processor 120 may provide the target control object to the optimization region, based on the gripping state. According to an embodiment, the processor 120 may determine the optimization region, based on the gripping position or a region around the gripping position, and provide the target control object to the determined optimization region.

According to an embodiment, the optimization region may be a region corresponding to the gripping position or may be a region that does not overlap with other objects, based on the gripping position. According to an embodiment, when the processor 120 provides the target control object, the processor 120 may provide a duplicate control object having the corresponding function while maintaining the target control object at the original position thereof. According to an embodiment, the processor 120 may produce (e.g., duplicate) a control object (e.g., a duplicate control object) identical to the target control object and float and provide the duplicate control object to the optimization region.

According to an embodiment, when the processor 120 provides a target control object, the processor 120 may directly provide a duplicate control object corresponding to the target control object to the gripping position, or may provide the duplicate control object by associating the same with a user input using a floating action button (FAB). According to an embodiment, an operation of providing a target control object will be described with reference to the following drawings.

Figure 12:
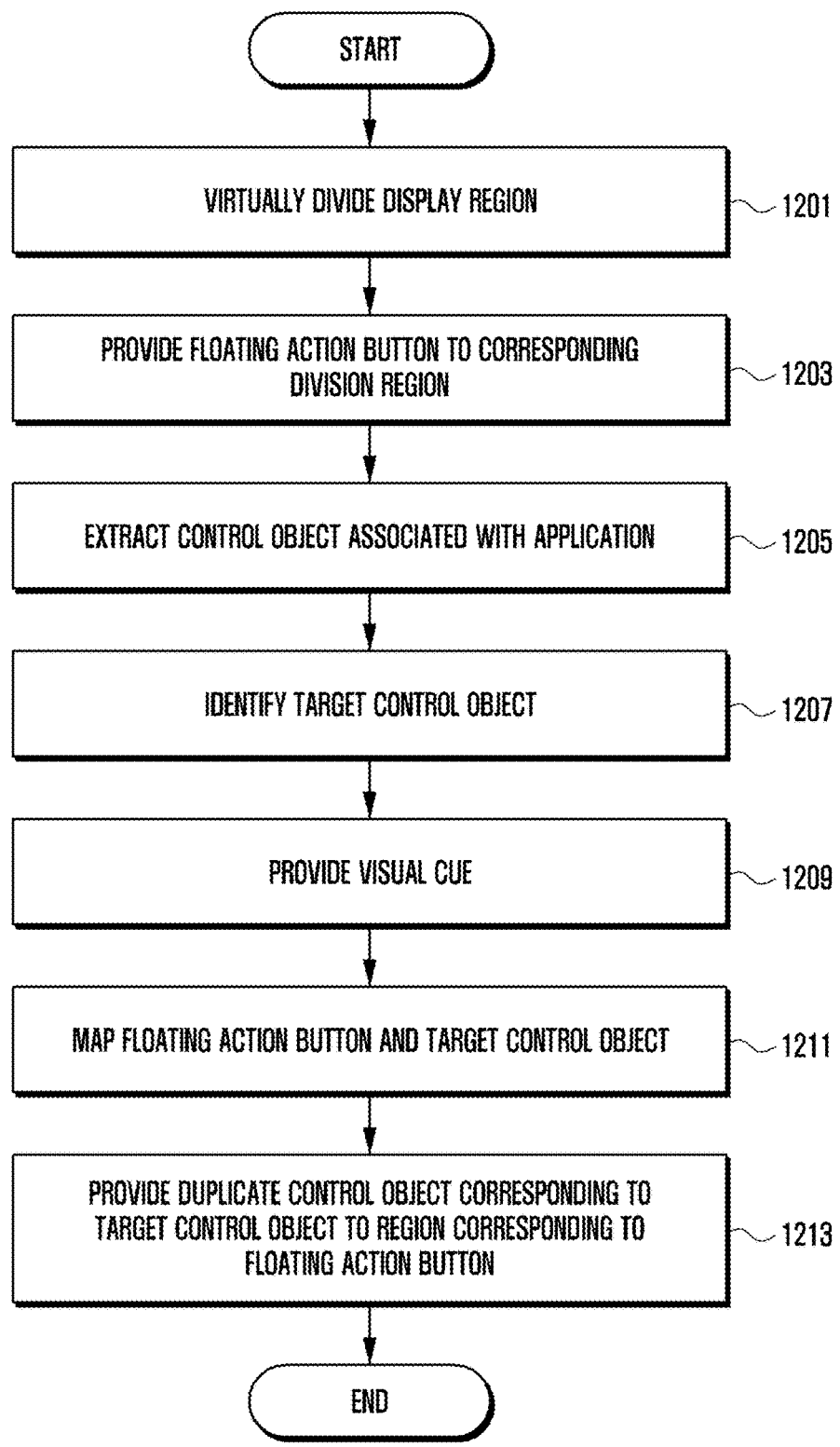
FIG. 12 is a flowchart illustrating a method for operating an electronic device according to an embodiment of the disclosure.

FIG. 12 is a flowchart illustrating a method for operating an electronic device according to an embodiment of the disclosure.

Figure 13:
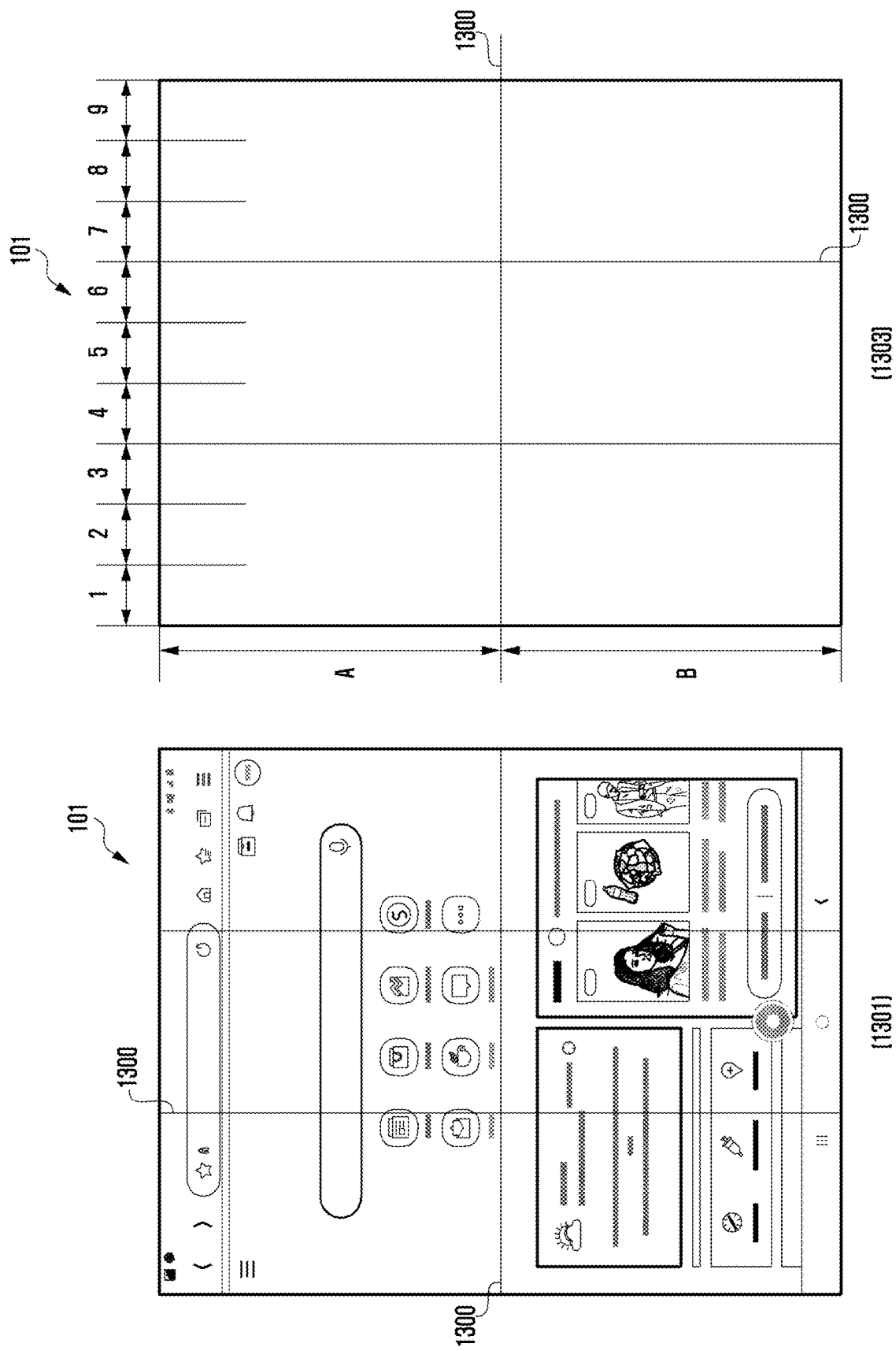
FIG. 13 illustrates an example of virtually dividing a display region of an electronic device according to an embodiment of the disclosure.

FIG. 13 illustrates an example of virtually dividing a display region of an electronic device according to an embodiment of the disclosure.

Figure 14:
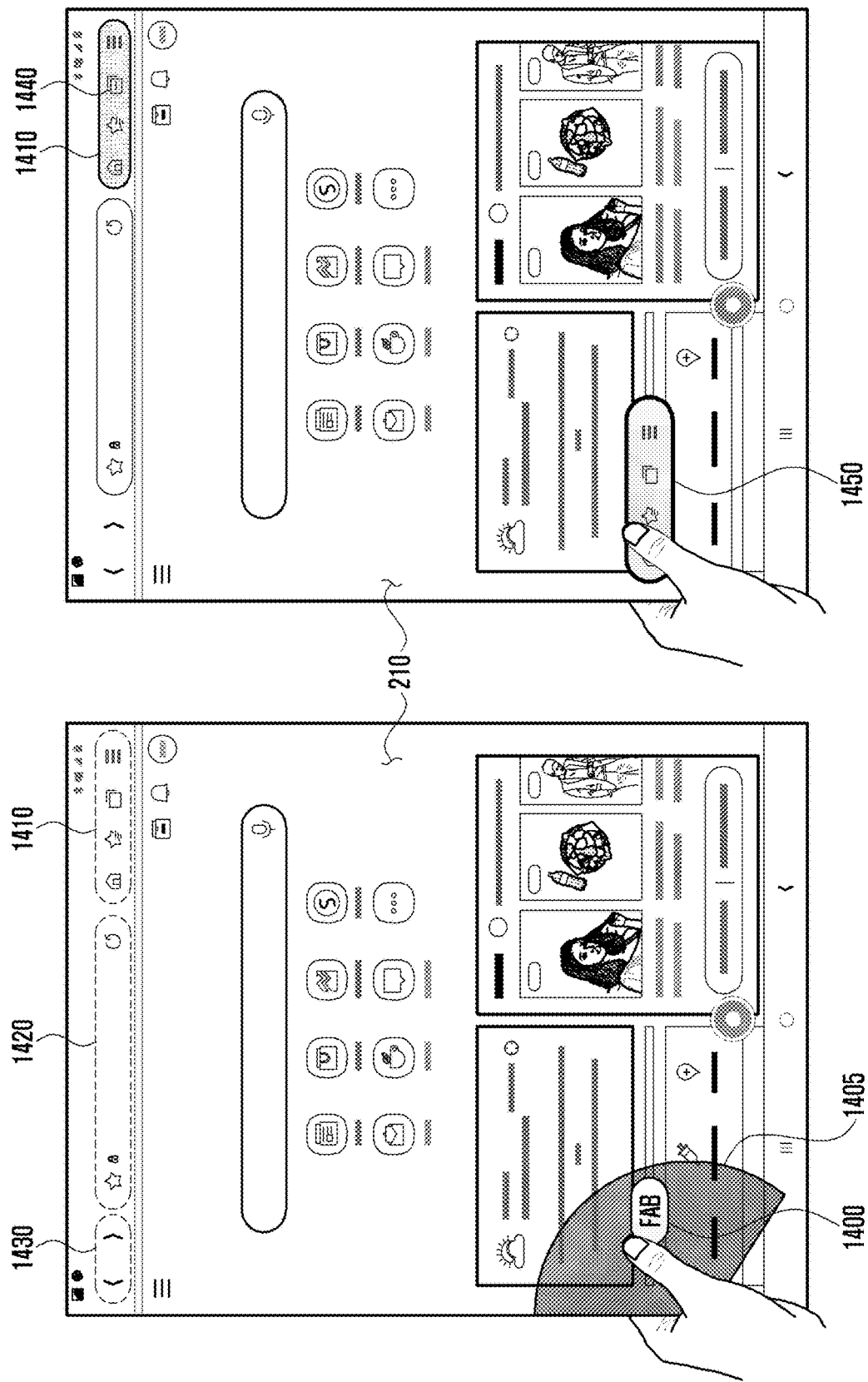
FIG. 14 illustrates an example of duplicatively providing a control object in an electronic device according to an embodiment of the disclosure.

FIG. 14 illustrates an example of duplicatively providing a control object in an electronic device according to an embodiment of the disclosure.

According to an embodiment, FIG. 12 illustrates an example in which the electronic device 101 supports an optimization service by which a control object in the most inaccessible region is duplicatively provided to the most optimized region while a user is gripping the electronic device 101. According to an embodiment, the operations described in FIG. 11 may be performed heuristically, for example, in combination with the operations described in FIG. 10, or may be performed heuristically as detailed operations of at least some of the described operations.

A method for supporting an optimization service in the electronic device 101 according to an embodiment of the disclosure may be performed, for example, according to a flowchart illustrated in FIG. 12. The flowchart shown in FIG. 12 is only a flowchart according to an embodiment of a usability optimizing method depending on a gripping state of the electronic device 101, and the order of at least some operations may be changed, performed in parallel, performed as an independent operation, or at least some other operations may be performed complementary to at least some operations. According to an embodiment of the disclosure, operations 1201 to 1213 may be performed by at least one processor 120 of the electronic device 101.

Referring to FIG. 12, an operating method performed by the electronic device 101 according to an embodiment (e.g., an operating method for optimizing usability according to a user's gripping state of the electronic device 101) may include an operation 1201 of virtually dividing a display region, an operation 1203 of providing a floating action button to a corresponding division region, based on the gripping state, an operation 1205 of extracting a control object associated with an application, based on the division region, an operation 1207 of identifying a target control object, an operation 1209 of providing a visual cue, an operation 1211 of mapping a floating action button and a target control object, and an operation 1213 of providing a duplicate control object corresponding to the target control object to a region corresponding to the floating action button.

Referring to FIG. 12, in operation 1201, the processor 120 of the electronic device 101 may virtually divide the display region. According to an embodiment, the processor 120 may distinguish the display 210 as a plurality of virtual division regions in the background (or internally), based on designated division information (e.g., the number of divided screens). An example of this is shown in FIG. 13.

Referring to FIG. 13, reference numeral 1300 in FIG. 13 may indicate a virtual dividing line. According to an embodiment, the virtual dividing line 1300 is illustrated for convenience of explanation, and may not be substantially displayed on the display 210 of the electronic device 101. For example, the processor 120 may distinguish the region of the display as virtual division regions in the background, in response to designated division information. According to an embodiment, the virtual dividing line 1300 may be provided as visual information on the display 210, based on the configuration of the electronic device 101, such that a user is able to intuitively recognize the division regions.

According to an embodiment, example <1301> may represent an example of dividing the region of the display 210 into 6 virtual regions (e.g., a 1st division region, a 2nd division region, a 3rd division region, . . . , and a 6th division region). For example, the designated division information may be "3×2 grid". For example, the processor 120 may divide the entire region of the display 210 into 6 virtual regions to be a 3×2 grid.

According to an embodiment, example <1303> may represent an example of dividing the region of the display 210 into 18 virtual regions (e.g., a 1st division region, a 2nd division region, a 3rd division region, . . . , and a 18th division region). For example, the designated division information may be "9×2 grid". For example, the processor 120 may divide the entire region of the display 210 into 18 virtual regions to be a 9×2 grid.

According to an embodiment, the virtual division regions are not limited to the 6 divisions (e.g., 3×2 grid) of example <1301> or the 18 divisions (e.g., 9×2 grid) of example <1303>, and may be configured in various ways. For example, a 2×3 grid or a 1×9 grid may also be formed in the case of 6 divisions or 9 divisions, respectively, or various configurations, such as 9 divisions (e.g., 3×3 grid), 8 divisions (e.g., 4×2 grid), 10 divisions (e.g., 5×2 grid), 12 divisions (e.g., 4×3 grid or 3×4 grid), or 27 divisions (e.g., 9×3 grid or 3×9 grid), may be provided. According to an embodiment, the size and shape of the virtual division region may vary according to the dividing method. According to an embodiment, the virtual division region may be configured based on a position at which the electronic device 101 is folded. For example, the virtual division regions may be configured to include two regions, left/right or top/bottom in the horizontal or vertical direction of a folding axis according to the landscape or the portrait mode of the electronic device 101.

According to an embodiment, region division of the display 210 may be performed by the processor 120 in the background. According to an embodiment, the division regions of the display 210 may be obtained by virtual division to distinguish the position of a user's grip and/or the position of a control object. According to an embodiment, the operation of virtually dividing the region of the display 210 is for accuracy in distinguishing the position of a user's grip and/or the position of a control object, but the embodiment of the disclosure is not limited thereto. According to an embodiment, the processor 120 may perform an operation without region division of the display 210. For example, the processor 120 may perform an operation in a manner of identifying a gripping position and directly calculating the distance between the gripping position and each control object.

In operation 1203, the processor 120 may provide a floating action button to a corresponding division region, based on the gripping state. In an embodiment, the floating action button may indicate a call object (e.g., an icon and/or text) for calling a duplicate control object corresponding to a target control object. An example of this is shown in FIG. 14.

Referring to FIG. 14, in the example of FIG. 14, reference numeral 1400 may indicate an example of a floating action button, and reference numeral 1405 may indicate an optimization region. In the example of FIG. 14, reference numeral 1410 may indicate a first control object (e.g., bundled (or packaged) control objects), reference numeral 1420 may indicate a second control object (e.g., a uniform resource locator (URL) input object), and reference numeral 1430 may indicate a third control object (e.g., a screen movement object). In the example of FIG. 14, the first control object 1410 may indicate a target control object to be provided to the optimization region 1405, among a plurality of control objects (e.g., the first control object 1410, the second control object 1420, and the third control object 1430) associated with an application. In the example of FIG. 14, reference numeral 1440 may indicate an example of a visual cue for a visual effect indicating that the first control object 1410 is designated as a target control object. In the example of FIG. 14, reference numeral 1450 may indicate an example of a duplicate control object corresponding to the first control object 1410 designated as the target control object.

Referring to FIG. 14, a floating action button 1400 may be provided (e.g., displayed) in response to a gripping position (e.g., a point of the display 210 touched by the user's finger) according to a user's gripping state. According to an embodiment, the floating action button 1400 may be provided on the display 210 in a floating manner in a region corresponding to a gripping position. According to an embodiment, the floating action button 1400 may be disposed in an optimization region 1405 such that the same does not overlap with other touch regions. According to an embodiment, the processor 120 may omit an operation based on a floating action button and may also directly provide a duplicate control object. For example, the processor 120 may not perform operation 1203. For example, processor 120 may directly provide a duplicate control object 1450 as illustrated by reference numeral 1450 in FIG. 14, without displaying the floating action button 1400.

According to an embodiment, when the processor 120 provides a target control object 1410, the processor 120 may directly provide a duplicate control object 1450 corresponding to the target control object to the gripping position, or may provide the duplicate control object by associating the same with a user input using a floating action button 1400, as illustrated in FIGS. 12 and 14.

In operation 1205, the processor 120 may extract a control object (e.g., the first control object 1410, the second control object 1420, and the third control object 1430) associated with an application. According to an embodiment, the control object may include one or more control objects for controlling a function related to an application running in the foreground. According to an embodiment, the control object may indicate a control object (e.g., the first control object 1410, the second control object 1420, and the third control object 1430) provided on an execution screen currently displayed through the display 210, among various control objects related to an application. According to an embodiment, the processor 120 may extract a control object associated with an application, based on a division region.

According to an embodiment, the processor 120 may extract at least one control object (e.g., the first control object 1410, the second control object 1420, and the third control object 1430) displayed on an execution screen displayed through the display 210, among control objects related to an application. According to an embodiment, as illustrated in FIG. 12, when the region of the display 210 is virtually divided and an operation is performed using the division regions, the processor 120 may perform an operation such that a division region relatively far from the division region of the gripping position is identified based on the division regions, and a control object within the identified division region is extracted.

In operation 1207, the processor 120 may identify a target control object. According to an embodiment, the processor 120 may determine, as a target control object, a control object (e.g., the first control object 1410) corresponding to a designated condition, among the extracted control objects. According to an embodiment, the processor 120 may determine a target control object (e.g., the first control object 1410), based on the distance between the gripping position and the control object (e.g., the first control object 1410, the second control object 1420, and the third control object 1430). For example, the processor 120 may determine, as the target control object, the control object (e.g., the first control object 1410) located at the farthest distance from the gripping position, in the designated state (e.g., the first designated state or second designated state) of the electronic device 101.

According to an embodiment, the processor 120 may determine a target control object, based on a control object in the division region located at the farthest distance from the division region of the gripping position. According to an embodiment, the processor 120 may identify the farthest control object, based on calculation of the straight-line distance on the screen between the control object and the gripping position, in the first designated state of the electronic device 101. According to an embodiment, the processor 120 may identify the farthest control object, based on calculation of the 3D distance between the control object and the gripping position, in the second designated state of the electronic device 101. An example of this is illustrated in FIG. 14.

Referring to FIG. 14, a control object indicated by reference numeral 1410 (e.g., the first control object 1410) may be a control object located at the farthest distance from the user's gripping position (e.g., corresponding to a position at which the floating action button 1400 is provided in FIG. 14). According to an embodiment, the processor 120 may determine the first control object 1410 as a target control object. According to an embodiment, when the processor 120 determines a target control object, the target control object may be determined based on an additional point, in consideration of a designated condition (e.g., usage frequency, usage time, assigned priority, and/or number of bundles of functional objects) along with a distance. According to an embodiment, the processor 120 may assign an additional point to the control object located on the folding axis in the second designated state. According to an embodiment, an operation of determining a target control object will be described with reference to the following drawings.

In operation 1209, the processor 120 may provide a visual cue 1440. According to an embodiment, the processor 120 may provide the visual cue 1440 designated to the target control object 1410 such that a user is able to intuitively recognize the target control object 1410. An example of this is illustrated in FIG. 14.

Referring to FIG. 14, the visual cue 1440 having a visual effect applied thereto may be provided to the first control object 1410 determined as a target control object, among control objects (e.g., the first control object 1410, the second control object 1420, and the third control object 1430) displayed on the display 210. According to an embodiment, the visual cue 1440 may include a visual effect, such as a sign including highlighting, animation, color change, and/or indicating object (e.g., an arrow image or icon). For example, the visual cue 1440 may be provided with various elements capable of focusing a user's attention on a target control object.

In operation 1211, the processor 120 may map the floating action button 1400 and the first control object 1410 designated as the target control object. According to an embodiment, the processor 120 may form (e.g., duplicate) (or produce) the duplicate control object 1450 that is identical (e.g., having the corresponding function) to the target control object, and map a location at which the duplicate control object 1450 is to be provided (e.g., an optimization region 1405) with a location of the floating action button 1400. For example, the processor 120 may determine the optimization region 1405 for providing the duplicate control objects 1450.

According to an embodiment, in the case of an operation of directly providing the duplicate control object 1450 without using the floating action button 1400, the processor 120 may map the location at which the duplicate control object 1450 is to be provided, based on the user's gripping position (e.g., a touched point) rather than the floating action button 1400.

In operation 1213, the processor 120 may provide the duplicate control object 1450 corresponding to the target control object (e.g., the first control object 1410) to a region (e.g., the optimization region 1405) corresponding to the floating action button 1400. According to an embodiment, when the processor 120 provides the target control object, the processor 120 may provide the duplicate control object having the corresponding function to the floating action button 1400 (or the user's gripping position) while maintaining the first control object 1410 designated as the target control object at the original position thereof. According to an embodiment, the processor 120 may float and provide the duplicate control object 1450 identical to the first control object 1410 designated as the target control object to the optimization region. An example of this will be illustrated in FIG. 14.

Referring to FIG. 14, the target control object (e.g., the first control object 1410) and the visual cue 1440 related thereto may be maintained on the display 210. According to an embodiment, the duplicate control object 1450 may be displayed at a position (e.g., the optimization region 1405) corresponding to the user's gripping position. According to an embodiment, the duplicate control object 1450 may be disposed in the optimization region 1405 such that the same does not to overlap with other touch regions. According to an embodiment, in the case of a method using the floating action button 1400, for example, the duplicate control object 1450 may be displayed at the position of the floating action button 1400 in place thereof.

Figure 15A:
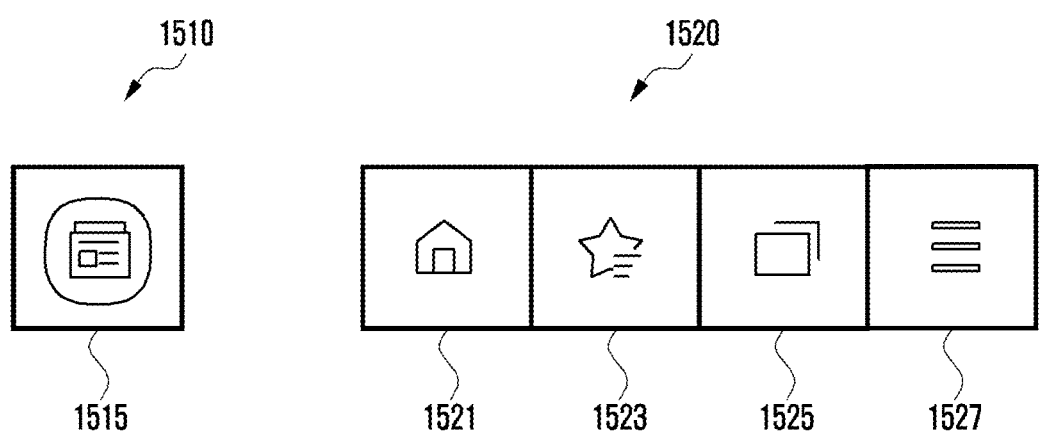
FIG. 15A illustrates a control object and an example in which the control object is provided according to an embodiment of the disclosure.
Figure 15B:
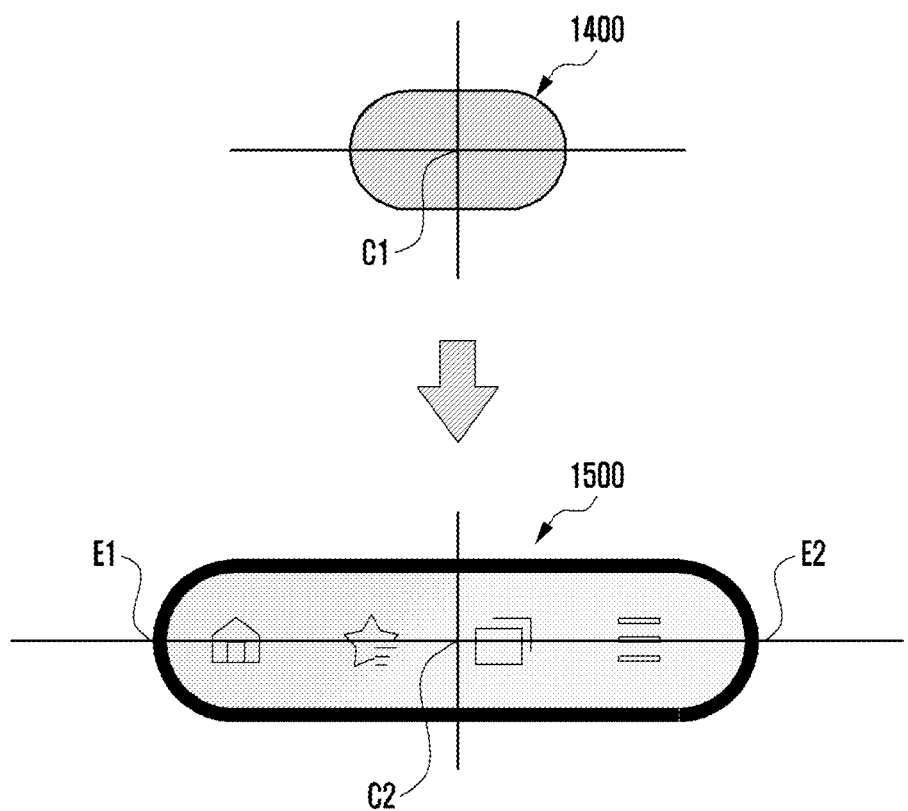
FIG. 15B illustrates a control object and an example in which the control object is provided according to an embodiment of the disclosure.

FIGS. 15A and 15B illustrate a control object and an example in which the control object is provided according to various embodiments of the disclosure.

Referring to FIG. 15A, FIG. 15A may show an example of a single control object 1510 or bundled (or packaged) control objects 1520. As illustrated in FIG. 15A, the control object provided by an application may be provided in the form of a single control object or in the form of a plurality of bundled control objects. According to an embodiment, the single control object 1510 may be provided as an icon and/or text having a touch region 1515 in a designated range. According to an embodiment, the bundled control objects 1520 may be provided as a plurality of subsequently arranged icons (e.g., home, bookmarks, tabs, tools) and/or text, based on the plurality of touch regions (1521, 1523, 1525, 1527) without a space therebetween. According to an embodiment, each control object constituting the bundled control object 1520 may be a control object supporting different functions. According to an embodiment, when determining a target control object, the bundled control objects 1520 may be recognized as one control object.

Referring to FIG. 15B, FIG. 15B illustrates a method for mapping a duplicate control object 1500 to a reference position 1400 (e.g., a floating action button or a gripping position (or a touched point)) for providing the duplicate control object 1500. As illustrated in FIG. 15B, the duplicate control object 1500 may be produced and provided based on the center point (C1) of the reference position 1400 and the center point (C2) of the duplicate control object 1500. For example, the center point (C2) of the duplicate control object 1500 may overlap the center point (C1) of the reference position 1400. According to an embodiment, when there is no space for the duplicate control object 1500 to be displayed according to the gripping position (e.g., when the gripping position is biased to an edge region) in case that the duplicate control object 1500 is provided based on the center point (C1) of the reference position 1400 and the center point (C2) of the duplicate control object 1500, for example, an edge point (E1 or E2) located inside the screen may be mapped with the center point (C1) of the reference position 1400 to face the edge region.

Figure 16:
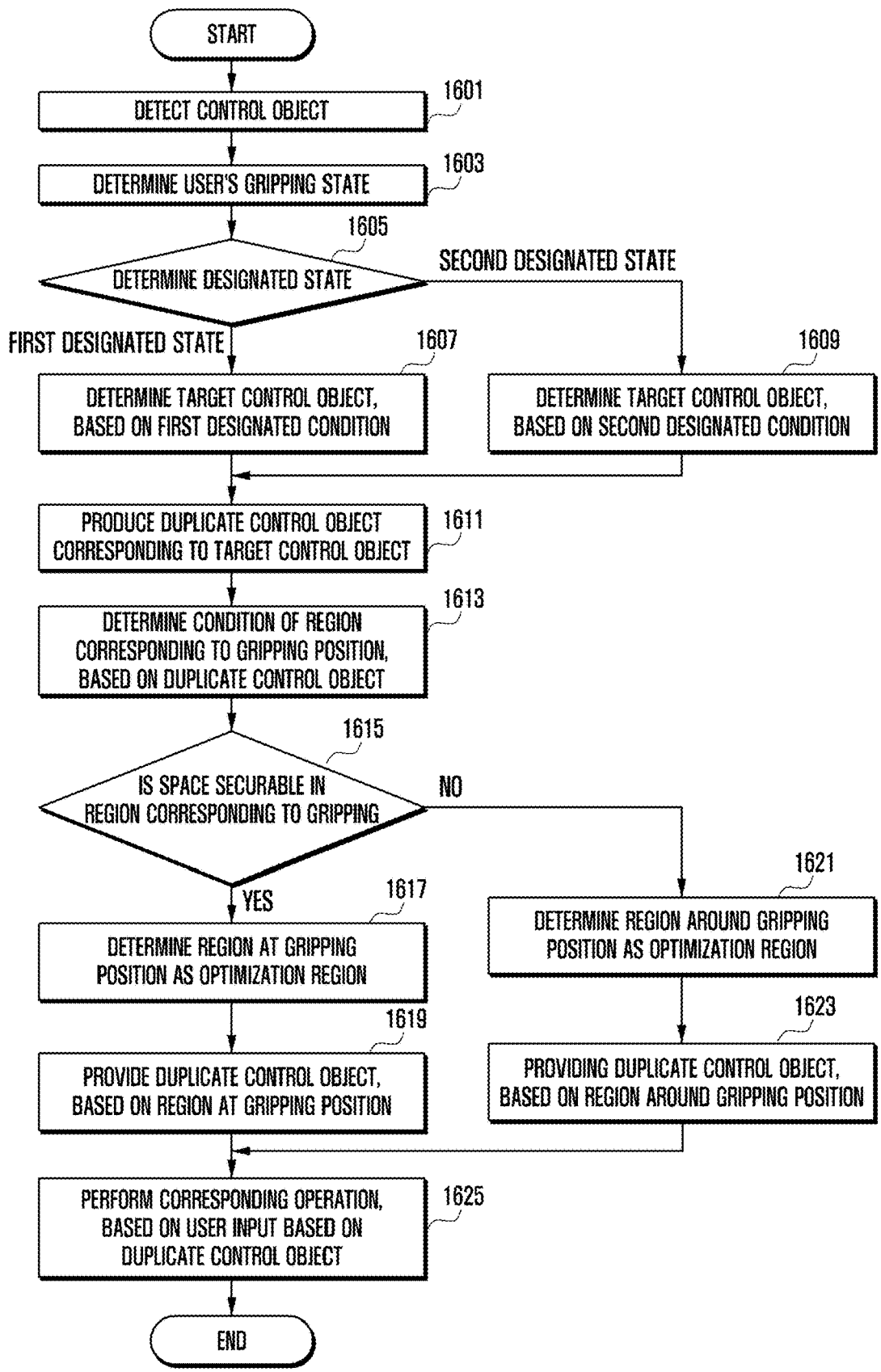
FIG. 16 is a flowchart illustrating a method for operating an electronic device according to an embodiment of the disclosure.

FIG. 16 is a flowchart illustrating a method for operating an electronic device according to an embodiment of the disclosure.

Referring to FIG. 16 illustrates an example in which the electronic device 101 supports an optimization service by which a control object in the most inaccessible region is duplicatively provided to the most optimized region while a user is gripping the electronic device 101. According to an embodiment, the operations described in FIG. 16 may be performed heuristically, for example, in combination with the operations described in FIGS. 10 and/or 12, or may be performed heuristically as detailed operations of at least some of the described operations.

A method for supporting an optimization service in the electronic device 101 according to an embodiment of the disclosure may be performed, for example, according to a flowchart illustrated in FIG. 16. The flowchart shown in FIG. 16 is only a flowchart according to an embodiment of a usability optimizing method according to a gripping state of the electronic device 101, and the order of at least some operations may be changed, performed in parallel, performed as an independent operation, or at least some other operations may be performed complementary to at least some operations. According to an embodiment of the disclosure, operations 1601 to 1625 may be performed by at least one processor 120 of the electronic device 101.

Referring to FIG. 16, an operating method performed by the electronic device 101 according to an embodiment (e.g., an operating method for optimizing usability according to a user's gripping state of the electronic device 101) may include an operation 1601 of detecting a control object, an operation 1603 of determining a user's gripping state, an operation 1605 of determining a designated state of the electronic device 101, an operation 1607 of, when the electronic device 101 operates in a first designated state, determining a target control object, based on the first designated condition, an operation 1609 of, when the electronic device 101 operates in a second designated state, determining a target control object, based on the second designated condition, an operation 1611 of producing a duplicate control object corresponding to the target control object determined based on the first designated condition or the second designated condition, an operation 1613 of determining a condition of a region corresponding to the gripping position, based on the duplicate control object, an operation 1615 of determining whether a space for the duplicate control object is securable in the region corresponding to the gripping position, an operation 1617 of determining the region of the gripping position as an optimization region (e.g., a first optimization region) when a space is securable in the region corresponding to the gripping position, an operation 1619 of providing a duplicate control object, based on the region of the gripping position (e.g., the optimization region), an operation 1621 of determining a region around the gripping position as an optimization region (e.g., a second optimization region) when a space is not securable in the region corresponding to the gripping position (or when a space is not secured), an operation 1623 of providing the duplicate control object, based on the region (e.g., an optimization region) around the gripping position, and an operation 1625 of performing a corresponding operation, based on a user input based on the duplicate control object.

Referring to FIG. 16, in operation 1601, the processor 120 of the electronic device 101 may detect a control object. According to an embodiment, the processor 120 may detect one or more control objects related to function control supportable by the application from the execution screen of the application which is being displayed through the display 210. According to an embodiment, the processor 120 may detect various control objects from an execution screen which is executable in the electronic device 101 and currently displayed through the display 210.

In operation 1603, the processor 120 may determine a user's gripping state. According to an embodiment, the processor 120 may identify a gripping position on the display 210, based on a touched point of the display 210. According to an embodiment, the processor 120 may identify a user's gripping state (e.g., left hand gripping, right hand gripping, or both hand gripping, and a region of the display 210 where the user's hand is positioned), based at least on the sensor module 176 (e.g., a grip sensor in a bezel region), the rear camera module 180, and/or the rear display (e.g., a touch sensor of a cover display), and identify a gripping position, based on the gripping state. According to an embodiment, an operation of determining a user's gripping state will be described with reference to the drawings to be described later.

According to an embodiment, operations 1601 and 1603 are not limited to the illustrated order and may be performed in parallel, sequentially, in reverse order, or heuristically.

In operation 1605, the processor 120 may determine a designated state of the electronic device 101. According to an embodiment, as illustrated in FIG. 11, a user may use the electronic device 101 in a first designated state (e.g., a fully unfolded state) or in a second designated state (e.g., a partially folded state). According to an embodiment, the processor 120 may measure an unfolding (or folding) angle of the electronic device 101, based on sensor data of a state detection sensor. In an embodiment, the unfolding angle may indicate an angle formed by a folding axis and two display surfaces (e.g., a first display surface and a second display surface) of the electronic device 101 divided by the folding axis.

According to an embodiment, the processor 120 may determine whether the electronic device 101 is fully unfolded (e.g., a first designated state) or folded at a predetermined angle (e.g., a second designated state), based on the unfolding angle of the electronic device 101.

According to an embodiment, when the unfolding angle (or folding angle) measured by the state detection sensor is about 180 degrees or an angle close thereto, the processor 120 may determine that the display 210 of the electronic device 101 is in a fully unfolded state (e.g., the first designated state).

According to an embodiment, when the unfolding angle measured by the state detection sensor is greater than or equal to a first designated angle (e.g., an angle at which the user's view is guaranteed, in a partially folded state (e.g., about 90 degrees)) and less than a second designated angle (e.g., about 180 degrees), the processor 120 may determine the folding angle as a partially folded state (e.g., the second designated state). For example, when the measured unfolding angle (or folding angle) is within a predetermined angle range (e.g., the first designated angle (e.g., about 90 degrees) <angle<the second designated angle (e.g., about 180 degrees)), the processor 120 may determine that the display 210 of the electronic device 101 is folded, bent, or unfolded to the predetermined degree, based on data obtained from at least one of the state detection sensor.

In operation 1605, when the electronic device 101 operates in the first designated state (e.g., performs in the "first designated state" of operation 1605), the processor 120 may determine a target control object, based on the first designated condition, in operation 1607.

According to an embodiment, the processor 120 may identify the farthest control object, based on calculation of the straight-line distance on the screen between the control object and the gripping position, in the first designated state of the electronic device 101. According to an embodiment, at the time of determining the target control object, the processor 120 may also determine the target control object, based on an additional point, considering a designated condition (e.g., usage frequency, usage time, assigned priority, and/or number of bundles of functional objects) along with the distance. According to an embodiment, an operation of determining a target control object according to the first designated condition and the first designated condition in the first designated state will be described with reference to the following drawings.

In operation 1605, when the electronic device 101 operates in a second specified state (e.g., performs in the "second designated state" in operation 1605), the processor 120 may determine a target control object, based on a second designated condition, in operation 1609. According to an embodiment, the processor 120 may determine, as a target control object, a control object located at the farthest distance, among control objects detected in the second designated state, based on calculation of the 3D-distance between the control object located on the folding axis and/or the gripping position and the control object. According to an embodiment, at the time of determining the target control object, the processor 120 may determine the target control object, based on an additional point, in consideration of a designated condition (e.g., usage frequency, usage time, assigned priority, and/or number of bundles of functional objects) along with the distance. According to an embodiment, the processor 120 may assign an additional point to the control object located on the folding axis in the second designated state. According to an embodiment, an operation of determining a target control object according to the second designated condition and the second designated condition in the second designated state will be described with reference to the following drawings.

In operation 1611, the processor 120 may produce a duplicate control object corresponding to the target control object. According to an embodiment, the processor 120 may produce the duplicate control object corresponding to the target control object determined according to the designated condition (e.g., the first designated condition in operation 1607 or the second designated condition in operation 1609). According to an embodiment, the control objects may be in the form of a single control object (e.g., the control object 1510 in FIG. 15A) and/or in the form of bundled (or packaged) control objects (e.g., the control object 1520 in FIG. 15A). According to an embodiment, the processor 120 may operate to recognize the bundled control objects as one control object.

According to an embodiment, when the target control object is in the form of a single control object, the processor 120 may produce a duplicate control object in the form of a single control object corresponding to the corresponding control object. According to an embodiment, when the target control object is in the form of bundled control objects, the processor 120 may produce a duplicate control object in the form of a bundled control object corresponding to the corresponding control object. According to an embodiment, the target control object may include one control object or a plurality of other control objects. According to an embodiment, the processor 120 may produce (e.g., copy) a control object (e.g., a duplicate control object) having the function of the corresponding target control object (or identical to the target control object), while displaying the target control object on the original location through a designated visual cue.

In operation 1613, the processor 120 may determine a condition of a region corresponding to the gripping position, based on the duplicate control object. According to an embodiment, the processor 120 may determine the designated condition, such as the size (or area) of duplicate control objects and/or overlapping with other objects (e.g., tabs, images, text, and/or toolbars related to an application) in the region corresponding to the gripping position.

In operation 1615, the processor 120 may determine whether a space for a duplicate control object is securable in a region corresponding to a gripping position. According to an embodiment, the processor 120 may determine whether a space for the duplicate control object is securable in a region (or a range) corresponding to a user's gripping position (e.g., a touched point on the display 210) (e.g., a front finger touch point)), based on a designated condition. According to an embodiment, the processor 120 may determine whether a space is securable, based on whether the region corresponding to the gripping position has a size (or area) allowing the duplicate control object to be displayed, and/or the presence or absence of other overlapping objects in the corresponding region.

According to an embodiment, the processor 120 may determine an optimization region (e.g., a first optimization region) based on a user's touch point on the display 210 or an optimization region based on the region around the touch point (e.g., a second optimization region), based on whether a space for a duplicate control object (or to which a duplicate control object is providable) is securable in the region corresponding to the gripping position.

In operation 1615, when a space is securable in the region corresponding to the gripping position (e.g., the touched point) (e.g., "Yes" in operation 1615), the processor 120 may determine the region of the gripping position as an optimization region (e.g., a first optimization region) in operation 1617. According to an embodiment, when determining the optimization region, the processor 120 may provide a duplicate control object such that other objects (e.g., tabs, images, text, and/or toolbars related to an application) do not overlap with the duplicate control object in the corresponding region. For example, the processor 120 may correct the optimization region, based on the presence or absence of other overlapping objects in the determined optimization region.

In operation 1619, the processor 120 may provide a duplicate control object, based on the region (e.g., an optimization region) of the gripping position. According to an embodiment, the processor 120 may float and provide the redundant control object having a function corresponding to the target control object to the determined optimization region. According to an embodiment, the processor 120 may duplicate a control object (e.g., a duplicate control object) having the function of the corresponding target control object (or identical to the target control object) to provide the duplicate control object to the optimization region, while displaying the target control object on the original location through a designated visual cue.

In operation 1615, when a space is not securable in the region corresponding to the gripping position (e.g., the touched point) (e.g., "No" in operation 1615) (e.g., when a space is not secured), the processor 120 may determine the region around the gripping position as an optimization region (e.g., a second optimization region) in operation 1621. According to an embodiment, when determining the optimization region, the processor 120 may provide a duplicate control object such that other objects (e.g., tabs, images, text, and/or toolbars related to an application) do not overlap with the duplicate control object in the corresponding region. For example, the processor 120 may correct the optimization region, based on the presence or absence of other overlapping objects in the determined optimization region.

In operation 1623, the processor 120 may provide a duplicate control object, based on the region (e.g., an optimization region) around the gripping position. According to an embodiment, the processor 120 may float and provide the redundant control object having a function corresponding to the target control object to the determined optimization region (e.g., the second optimization region). According to an embodiment, the processor 120 may duplicate a control object (e.g., a duplicate control object) having the function of the corresponding target control object (or identical to the target control object) to provide the duplicate control object to the optimization region, while displaying the target control object on the original location through a designated visual cue.

In operation 1625, the processor 120 may perform a corresponding operation, based on a user input based on the duplicate control object. According to an embodiment, the processor 120 may perform various operations, based on an interaction with a user. According to an embodiment, the processor 120 may move (e.g., position change), remove, or replace (e.g., produce and display another duplicate control object) a duplicate control object according to a user input. According to an embodiment, the processor 120 may control the operation of an application by using a function related to the duplicate control object according to a user input. According to an embodiment, various operations performed based on interaction with a user will be described with reference to the drawings to be described later.

According to an embodiment, although not shown in FIG. 16, in the operation illustrated in FIG. 16, an operation using a floating action button may be performed concurrently as given in the description with reference to FIG. 12 above. For example, in connection with providing a duplicate control object in FIG. 16, the floating action button may be provided first, and an operation of moving, removing, changing (e.g., changing the target control object) and/or replacing the floating action button (e.g., replacing a duplicate control object at the location of the floating action button) may be concurrently performed, based on the interaction with a user using by the floating action button. According to an embodiment, various operations performed based on interaction with a user by using a floating action button will be described with reference to the following drawings.

Figure 17:
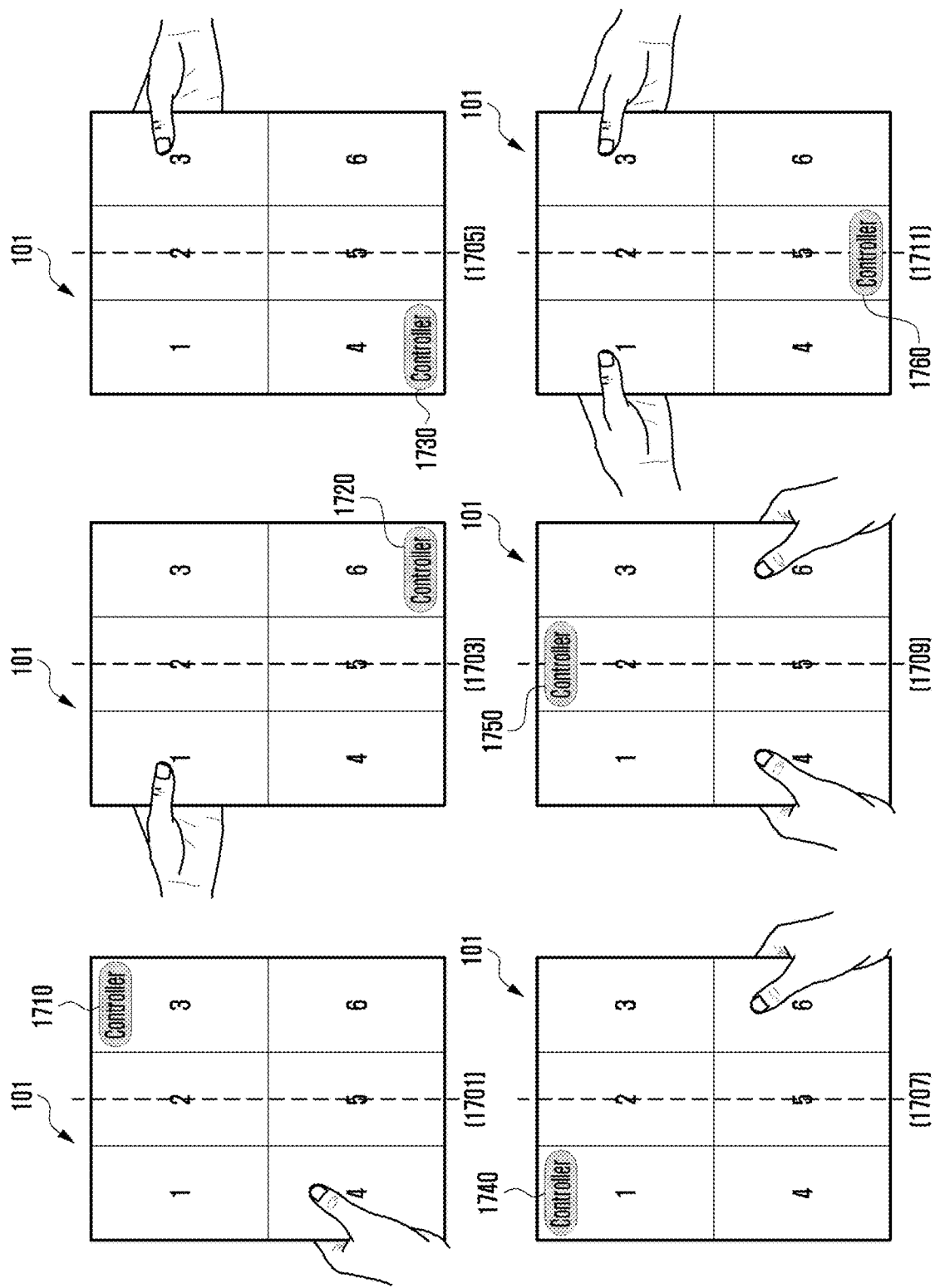
FIG. 17 illustrates an example of providing a target control object in an electronic device, based on a gripping position according to an embodiment of the disclosure.

FIG. 17 illustrates an example of providing a target control object, based on a gripping position in an electronic device according to an embodiment of the disclosure.

Referring to FIG. 17, FIG. 17 may illustrate an operation example of selecting a target control object in a portrait mode according to a user gripping state in a first designated state (e.g., a fully unfolded state) of the electronic device 101. According to an embodiment, FIG. 17 shows an example of providing, as a target control object, a control object (or a control object in the farthest located region) in the most difficult position for the user's manipulation (e.g., located at the farthest distance from the gripping position (or region) in the first designated state), among various control objects displayed on an execution screen to an optimization region. For example, a control object located in a region (e.g., a region in a diagonal direction) physically farthest from a point (or region) touched by the user's finger may be a target control object for the duplicate control object.

In an embodiment, the optimization region may represent the most suitable region within the maximum range in which a finger (e.g., thumb) is reachable while the user's current gripping state is maintained. According to an embodiment, a duplicate control object corresponding to a target control object may be disposed in the optimization region.

According to an embodiment, example <1701> may represent an example in which a user grips the left lower end (e.g., region 4) of the electronic device 101 with his/her left hand. According to an embodiment, the control object in the farthest region from the left-hand gripping position (e.g., region 4) may be a control object 1710 at a position (e.g., region 3) in the diagonal direction from the left-hand gripping position (e.g., region 4).

According to an embodiment, the electronic device 101 may select, as a target control object, the control object 1710 located farthest (e.g., a region untouchable by the user's finger (e.g., thumb) in the left-hand gripping state) based on the direction and/or distance between the user's gripping position and the control object 1710. For example, in a state in which the user grips the lower end of the electronic device 101 with his/her left hand, the touchable optimization region may be a 4th region, and the farthest region may be a 3rd region. According to an embodiment, the electronic device 101 may duplicatively provide the control object 1710 to the optimization region (e.g., region 4) corresponding to the user's gripping position through a duplicate control object corresponding to the control object 1710.

According to an embodiment, example <1703> may represent an example in which a user grips the left upper end (e.g., region 1) of the electronic device 101 with his/her left hand. According to an embodiment, the control object in the farthest region from the left-hand gripping position (e.g., region 1) may be a control object 1720 at a location (e.g., region 6) in the diagonal direction from the left-hand gripping position (e.g., region 1).

According to an embodiment, the electronic device 101 may select, as a target control object, the control object 1720 located farthest (e.g., a region untouchable by the user's finger (e.g., thumb) in the left-hand gripping state) based on the direction and/or distance between the user's gripping position and the control object 1720. For example, in a state in which the user grips the upper end of the electronic device 101 with his/her left hand, the touchable optimization region may be a 1st region, and the farthest region may be a 6th region. According to an embodiment, the electronic device 101 may duplicatively provide the control object 1720 to the optimization region (e.g., region 1) corresponding to the user's gripping position through a duplicate control object corresponding to the control object 1720.

According to an embodiment, example <1705> may represent an example in which a user grips the right upper end (e.g., region 3) of the electronic device 101 with his/her right hand. According to an embodiment, the control object in the farthest region from the right-hand gripping position (e.g., region 3) may be a control object 1730 at a location (e.g., region 4) in the diagonal direction from the right-hand gripping position (e.g., region 3).

According to an embodiment, the electronic device 101 may select, as a target control object, the control object 1730 located farthest (e.g., a region untouchable by the user's finger (e.g., thumb) in the right-hand gripping state) based on the direction and/or distance between the user's gripping position and the control object 1730. For example, in a state in which the user grips the upper end of the electronic device 101 with his/her right hand, the touchable optimization region may be a 3rd region, and the farthest region may be a 4th region. According to an embodiment, the electronic device 101 may duplicatively provide the control object 1730 to the optimization region (e.g., region 3) corresponding to the user's gripping position through a duplicate control object corresponding to the control object 1730.

According to an embodiment, example <1707> may represent an example in which a user grips the right lower end (e.g., region 6) of the electronic device 101 with his/her right hand. According to an embodiment, the control object in the farthest region from the right-hand gripping position (e.g., region 4) may be a control object 1740 at a location (e.g., region 1) in the diagonal direction from the right-hand gripping position (e.g., region 6).

According to an embodiment, the electronic device 101 may select, as a target control object, the control object 1740 located farthest (e.g., a region untouchable by the user's finger (e.g., thumb) in the right-hand gripping state) based on the direction and/or distance between the user's gripping position and the control object 1740. For example, in a state in which the user grips the lower end of the electronic device 101 with his/her right hand, the touchable optimization region may be a 6th region, and the farthest region may be a 1st region. According to an embodiment, the electronic device 101 may duplicatively provide the control object 1740 to the optimization region (e.g., region 6) corresponding to the user's gripping position through a duplicate control object corresponding to the control object 1740.

According to an embodiment, example <1709> may represent an example in which a user grips the opposite lower ends (e.g., region 4 and region 6) of the electronic device 101 with his/her two hands. According to an embodiment, the control object in the farthest region from the two-hand gripping position (e.g., region 4 and region 6) may be a control object 1750 at a location (e.g., region 2) in the diagonal direction from the two-hand gripping positions (e.g., region 4 and region 6). According to an embodiment, the electronic device 101 may select, as a target control object, the control object 1750 located farthest (e.g., a region untouchable by the user's fingers (e.g., respective thumbs) in the two-hand gripping state) based on the direction and/or distance between the user's gripping positions and the control object 1750. For example, in a state in which the user grips the lower end of the electronic device 101 with his/her two hands, the touchable optimization region may be a 4th or a 6th region, and the farthest region may be a 2nd region.

According to an embodiment, the electronic device 101 may duplicatively provide the control object 1750 to the optimization regions (e.g., region 4 and/or regions 6) corresponding to the user's gripping positions through a duplicate control object corresponding to the control object 1750. According to an embodiment, in the case of the two-hand gripping, the control object 1750 may be provided in any one of the optimization regions (e.g., region 4 and region 6), or the control object 1750 may be provided to each of the optimization regions corresponding to the both-gripping positions.

According to an embodiment, in the case of the two-hand gripping, a location (e.g., region 2) diagonally converging based on the two-hand gripping positions may be determined as the farthest region. Without being limited thereto, in the case of two-hand gripping, the location (e.g., region 3) in the diagonal direction based on the left-hand gripping position and the location (e.g., region 1) in the diagonal direction based on the right-hand gripping position may be as farthest regions, respectively. Based on each gripping position, different duplicate control objects each corresponding to the control objects in the corresponding regions (e.g., region 1 and region 3) may be placed in corresponding optimization regions (e.g., region 4 and region 6), respectively.

According to an embodiment, example <1711> may represent an example in which a user grips the opposite upper ends (e.g., region 1 and region 3) of the electronic device 101 with his/her two hands. According to an embodiment, the control object in the farthest region from the two-hand gripping position (e.g., region 1 and region 3) may be a control object 1760 at a location (e.g., region 5) in the diagonal direction from the two-hand gripping positions (e.g., region 1 and region 3).

According to an embodiment, the electronic device 101 may select, as a target control object, the control object 1760 located farthest (e.g., a region untouchable by the user's fingers (e.g., respective thumbs) in the two-hand gripping state) based on the direction and/or distance between the user's gripping positions and the control object 1760. For example, in a state in which the user grips the upper end of the electronic device 101 with his/her two hands, the touchable optimization region may be a 1st or a 3rd region, and the farthest region may be a 5th region.

According to an embodiment, the electronic device 101 may duplicatively provide the control object 1760 to the optimization regions (e.g., region 1 and/or regions 3) corresponding to the user's gripping positions through a duplicate control object corresponding to the control object 1760. According to an embodiment, in the case of two-hand gripping, the control object 1760 may be provided in any one of the optimization regions (e.g., region 1 and region 3), or the control object 1760 may be provided to each of the optimization regions corresponding to the both-gripping positions.

According to an embodiment, in the case of the two-hand gripping, a location (e.g., region 5) diagonally converging based on the two-hand gripping positions may be determined as the farthest region. Without being limited thereto, in the case of the two-hand gripping, the location (e.g., region 6) in the diagonal direction based on the left-hand gripping position and the location (e.g., region 1) in the diagonal direction based on the right-hand gripping position may be as farthest regions, respectively. Based on each gripping position, different duplicate control objects each corresponding to the control objects in the corresponding regions (e.g., region 4 and region 6) may be placed in corresponding optimization regions (e.g., region 1 and region 3), respectively.

Figure 18:
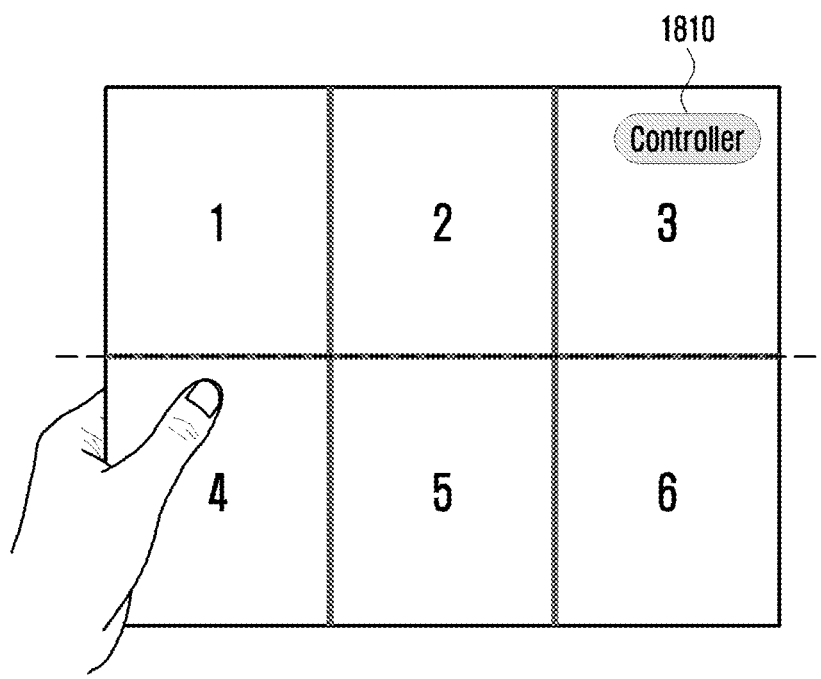
FIG. 18 illustrates an example of providing a target control object in an electronic device, based on a gripping position according to an embodiment of the disclosure.

FIG. 18 illustrates an example of providing a target control object, based on a gripping position in an electronic device according to an embodiment of the disclosure.

Referring to FIG. 18, FIG. 18 illustrates an operation example of selecting a target control object according to a user gripping state in the landscape mode of the electronic device 101. According to an embodiment, FIG. 18 shows an example of providing, as a target control object, a control object 1810 (or a control object 1810 in the farthest located region) located farthest from the user's grip position (or region), among various control objects displayed on the execution screen to an optimization region. For example, the control object 1810 located in a region (e.g., a region in a diagonal direction) physically farthest from a point (or region) touched by the user's finger may be a target control object for the duplicate control object.

In an embodiment, the optimization region may represent the most suitable region within the maximum range in which a finger (e.g., thumb) is reachable while the user's current gripping state is maintained. According to an embodiment, a duplicate control object corresponding to a target control object may be disposed in the optimization region.

According to an embodiment, FIG. 18 illustrates an example in which a user grips the left lower end (e.g., region 4) of the electronic device 101 with his/her left hand, but is not limited thereto. For example, an operation of providing a target control object according to a user's gripping state in the landscape mode may include various operations corresponding to the operation of providing a target control object according to user's various gripping states in a portrait mode, as given in the description with reference to FIG. 17 above.

Figure 19A:
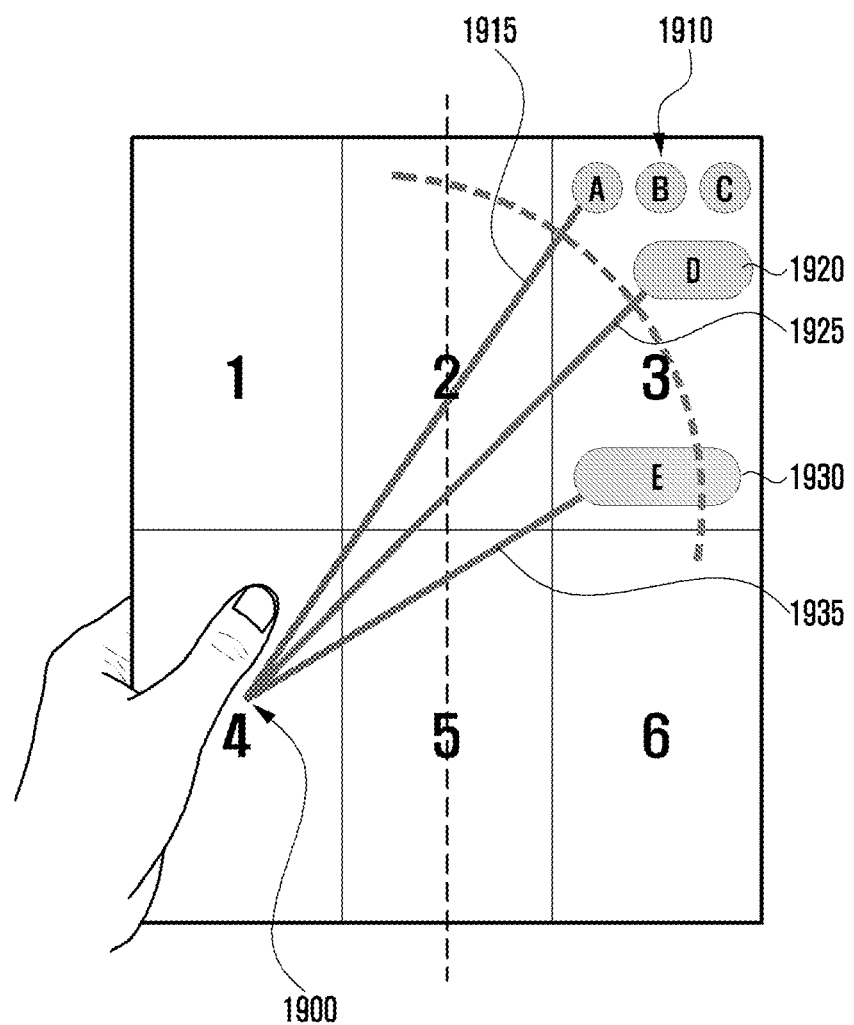
FIG. 19A illustrates an example of determining a target control object in an electronic device according to an embodiment of the disclosure.
Figure 19B:
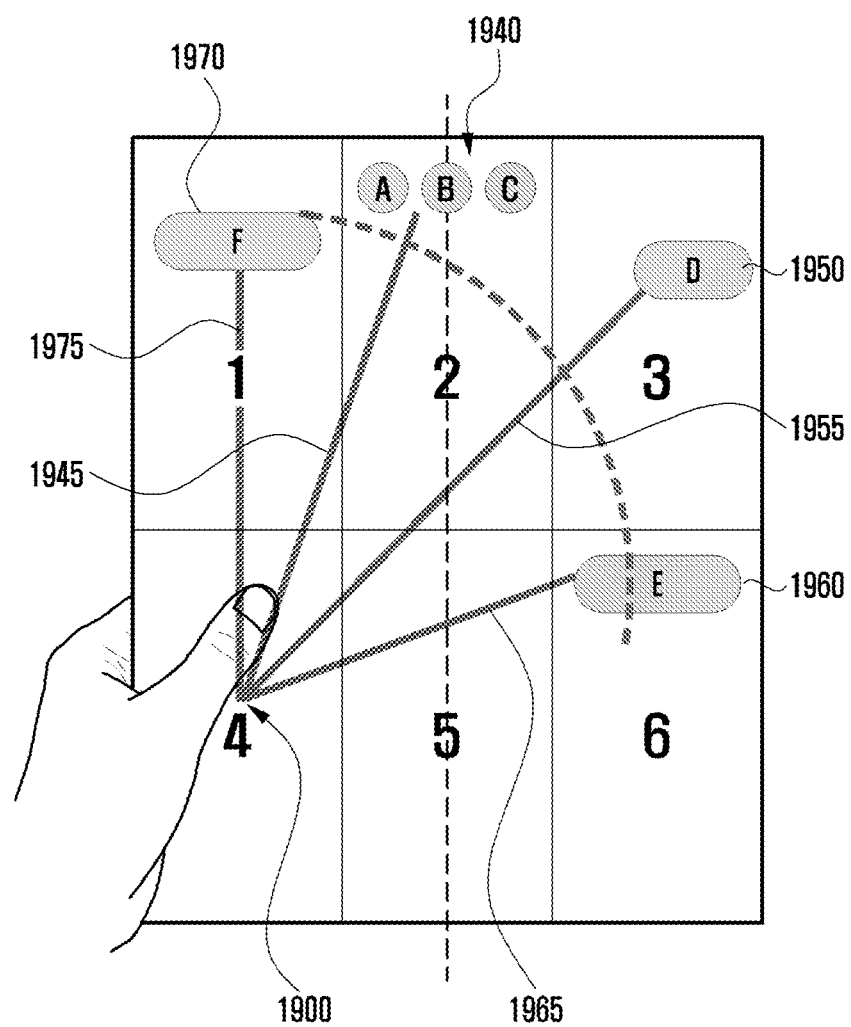
FIG. 19B illustrates an example of determining a target control object in an electronic device according to an embodiment of the disclosure.

FIGS. 19A and 19B illustrate an example of determining a target control object in an electronic device according to various embodiments of the disclosure.

According to an embodiment, FIGS. 19A and 19B illustrate an example of selecting a target control object, among a plurality of control objects being displayed on an execution screen, in the first designated state of the electronic device 101, based on the additional point and the distance between the user's gripping position 1900 and each of the control objects 1910 to 1960.

Referring to FIG. 19A, FIG. 19A illustrates an example of determining a target control object, based on the distance between the gripping position 1900 and each of the control objects 1910, 1920, and 1930, in a state in which a user grips the left lower end of the electronic device 101 with his/her left hand in the first designated state of the electronic device 101. According to an embodiment, FIG. 19A may represent an example in case that the plurality of control objects 1910, 1920, and 1930, such as a first control object 1910 (e.g., bundled control objects including object A, object B, and object C), a second control object 1920 (e.g., object D), and a third control object 1930 (e.g., object E), are present in the same region (e.g., region 3) on the currently displayed execution screen.

Referring to FIG. 19A, when, in the left-hand gripping state, a plurality of control objects including bundled control objects 1910 and single control objects 1920 and 1930 exist in a region farthest from the gripping position 1900 (e.g., region 3), the electronic device 101 may give priority to the control object that is physically distant from the user's gripping position 1900. For example, the electronic device 101 may calculate the distances 1915, 1925, and 1935 to the control object 1910, 1920, and 1930, respectively, with reference to the center (e.g., the gripping position 1900) of the optimization region, and determine the first control object 1910 having the longest distance (e.g., distance 1915) as a target control object.

According to an embodiment, when determining a target control object, the electronic device 101 may identify a user's usage condition for a control object in a region (e.g., region 3) farthest from the optimization region of the gripping position 1900, such as the usage frequency, the usage time, the assigned priority, and/or the number of bundles of functional objects for each control object 1910, 1920, or 1930. For example, the electronic device 101 may use a distance-additional point and a usage condition (e.g., usage frequency, usage time, assigned priority, and/or number of bundles of functional objects) as criteria for selecting a target control object. According to an embodiment, the electronic device 101 may prioritize a control object with higher usage condition, based on usage conditions of the control objects 1910, 1920, and 1930.

According to an embodiment, when the usage conditions (e.g., usage frequency, usage time, assigned priority, and/or number of bundles of functional objects) between the control objects 1910, 1920, and 1930 are the same, the electronic device 101 may configure a high priority, based on a representative (e.g., maximum, minimum, middle, most frequent, or average) value of each control object 1910, 1920, and 1930. According to an embodiment, it may be assumed that the frequencies of use of control objects (e.g., object A, object B, and object C) in the first control object 1910 are object A=10, object B=5, and object C=5, respectively, the usage frequency of the second control object 1920 (e.g., object D) is object D=15, and the usage frequency of the third control object 1930 (e.g., object E) is object E=0.

According to an embodiment, when, among a first distance 1915 between the gripping position 1900 and the first control object 1910, a second distance 1925 between the gripping position 1900 and the second control object 1920, and a third distances 1935 between the gripping position 1900 and the third control object 1930, the first distance 1915 is the longest distance (e.g., first distance 1915>second distance 1925>third distance 1935), the electronic device 101 may select the first control object 1910 as a target control object and duplicatively provide the first control object 1910 to the optimization region.

According to an embodiment, when the first distance 1915 between the gripping position 1900 and the first control object 1910 and the second distance 1925 between the gripping position 1900 and the second control object 1920 are the same (e.g., first distance 1915=second distance 1925), the electronic device 101 may select the second control object 1920 as a target control object and duplicatively provide the second control object 1920 to the optimization region.

According to an embodiment, when the first distance 1915 between the gripping position 1900 and the first control object 1910 is greater than the second distance 1925 between the gripping position 1900 and the second control object 1920 (e.g., first distance 1915>second distance 1925), additional points (e.g., N points) may be provided as much as the difference between the first distance 1915 and the second distance 1925. For example, when the additional point is 5 points, the additional points (e.g., N=5) may be added to the usage condition (e.g., usage frequency, object A=10) of the first control object 1910 (e.g., object A), the first control object 1910 may be selected as a target control object, and the first control object 1910 may be duplicatively provided to the optimization region.

According to an embodiment, it may be assumed that with respect to the first distance 1915 between the gripping position 1900 and the first control object 1910, the second distance 1925 between the gripping position 1900 and the second control object 1920, and the third distance 1935 between the gripping position 1900 and the third control object 1930, the distance-additional points are the first distance 1915=7 additional points, the second distance 1925=5 additional points, and the third distance 1935=0 additional point, and that the usage condition (e.g., usage frequency) of the third control object 1930 (e.g., object E) is the highest.

According to an embodiment, the total score of the first control object 1910 may be 17 points by the sum of 10 usage frequency (e.g., usage frequency of object A)+7 additional points of the first distance 1915. According to an embodiment, the total score of the second control object 1920 may be 20 points by the sum of 15 usage frequency (e.g., usage frequency of object D)+5 additional points of the distance 1925. According to an embodiment, the total score of the third control object 1930 may exceed about 20 points by the sum of usage frequency greater than about 20 (e.g., usage frequency of object E)+0 additional point of the third distance 1935. In this case, the electronic device 101 may select the third control object 1930 as a target control object and duplicatively provide the third control object 1930 to the optimization region.

Referring to FIG. 19B, FIG. 19B illustrates an example of determining a target control object, based on the distance between a gripping position 1900 and each of control objects 1940, 1950, 1960, and 1970 while a user grips the left lower end of the electronic device 101 with his/her left hand in the first designated state of the electronic device 101. According to an embodiment, FIG. 19B shows an example of the case in which a plurality of control objects 1940, 1950, 1960, and 1970 exist in different regions (e.g., region 1, region 2, region 3, and region 6) on the currently displayed execution screen, such as a fourth control object 1940 (e.g., bundled control objects including object A, object B, and object C), a fifth control object 1950 (e.g., object D), and a sixth control object 1960 (e.g., object E), and a seventh control object 1970 (e.g., object F).

Referring to FIG. 19B, when, in the left-hand gripping state, a single control object (e.g., the fifth control object 1950) exists in a region farthest from the gripping position 1900 (e.g., region 3), the electronic device 101 may give priority to the fifth control object 1950 that is physically distant from the user's gripping position 1900. For example, the electronic device 101 may calculate the distances 1945, 1955, 1965, and 1975 to the control object 1940, 1950, 1960, and 1970, respectively, with reference to the center (e.g., the gripping position 1900) of the optimization region, and determine the fifth control object 1950 having the longest distance (e.g., distance 1955) as a target control object.

Referring to FIG. 19B, in the gripping state of the left hand, there may be no control object being provided to the region farthest from the gripping position 1900 (e.g., region 3), or the usage condition (e.g., usage frequency) of the control object (e.g., the fifth control object 1950) may be lower than that of control objects in other regions. In this case, the electronic device 101 may determine, as a target control object, a control object in a region other than the control object (e.g., the fifth control object 1950) in the farthest region. For example, the electronic device 101 may employ a distance-additional point and a usage condition (e.g., usage frequency and/or usage time) as criteria for selecting a target control object.

According to an embodiment, it may be assumed that with respect to the fourth distance 1945 between the gripping position 1900 and the fourth control object 1940, the fifth distance 1955 between the gripping position 1900 and the fifth control object 1950, and the sixth distance 1965 between the gripping position 1900 and the sixth control object 1960, and the seventh distance 1975 between the gripping position 1900 and the seventh control object 1970, the distance-additional points are the fourth distance 1945=10 additional points, the fifth distance 1955=15 additional points, the sixth distance 1965=0 additional point, and the seventh distance 1975=6 additional points, and that the usage conditions (e.g., usage frequency) of the fourth control object 1940 to the seventh control object 1970 are the fourth control object 1940=10, the fifth control object 1950=1, the sixth control object 1960=10, and the seventh control object 1970=10.

According to an embodiment, the total score of the fourth control object 1940 may be 20 points by the sum of 10 additional points of the fourth distance 1945+10 usage frequency. According to an embodiment, the total score of the fifth control object 1950 may be 16 points by the sum of 15 additional points of the fifth distance 1955+1 usage frequency. According to an embodiment, the total score of the sixth control object 1960 may be 10 points by the sum of 0 additional point of the sixth distance 1965+10 usage frequency. According to an embodiment, the score of the seventh control object 1970 may be a total of 16 points by the sum of 6 additional points of the seventh distance 1975+10 usage frequency. In this case, the electronic device 101 may select the fourth control object 1940 as a target control object and duplicatively provide the fourth control object 1940 to the optimization region.

According to an embodiment, it may be assumed that with respect to the fourth distance 1945 between the gripping position 1900 and the fourth control object 1940, the fifth distance 1955 between the gripping position 1900 and the fifth control object 1950, the sixth distance 1965 between the gripping position 1900 and the sixth control object 1960, and the seventh distance 1975 between the gripping position 1900 and the seventh control object 1970, the distance-additional points are the fourth distance 1945=10 additional points, the fifth distance 1955=15 additional points, the sixth distance 1965=0 additional point, and the seventh distance 1975=6 additional points, and that the usage conditions (e.g., usage frequency) of the fourth control object 1940 to the seventh control object 1970 are the fourth control object 1940=10, the fifth control object 1950=1, the sixth control object 1960=30, and the seventh control object 1970=1.

According to an embodiment, the total score of the fourth control object 1940 may be 20 points by the sum of 10 additional points of the fourth distance 1945+10 usage frequency. According to an embodiment, the total score of the fifth control object 1950 may be 16 points by the sum of 15 additional points of the fifth distance 1955+1 usage frequency. According to an embodiment, the total score of the sixth control object 1960 may be 30 points by the sum of 0 additional point of the sixth distance 1965+30 usage frequency. According to an embodiment, the score of the seventh control object 1970 may be a total of 16 points by the sum of 6 additional points of the seventh distance 1975+10 usage frequency. In this case, the electronic device 101 may select the sixth control object 1960 as a target control object and duplicatively provide the sixth control object 1960 to the optimization region.

According to an embodiment, it may be assumed that with respect to the fourth distance 1945 between the gripping position 1900 and the fourth control object 1940, the fifth distance 1955 between the gripping position 1900 and the fifth control object 1950, the sixth distance 1965 between the gripping position 1900 and the sixth control object 1960, and the seventh distance 1975 between the gripping position 1900 and the seventh control object 1970, the distance-additional points are the fourth distance 1945=10 additional points, the fifth distance 1955=15 additional points, the sixth distance 1965=0 additional point, and the seventh distance 1975=6 additional points, and that the usage conditions (e.g., usage frequency) of the fourth control object 1940 to the seventh control object 1970 are the fourth control object 1940=10, the fifth control object 1950=1, the sixth control object 1960=10, and the seventh control object 1970=14.

According to an embodiment, the total score of the fourth control object 1940 may be 20 points by the sum of 10 additional points of the fourth distance 1945+10 usage frequency. According to an embodiment, the total score of the fifth control object 1950 may be 16 points by the sum of 15 additional points of the fifth distance 1955+1 usage frequency. According to an embodiment, the total score of the sixth control object 1960 may be 10 points by the sum of 0 additional point of the sixth distance 1965+10 usage frequency. According to an embodiment, the score of the seventh control object 1970 may be a total of 20 points by the sum of 6 additional points of the seventh distance 1975+14 usage frequency. Accordingly, the score (=10) of the fourth control object 1940 and the score (=10) of the seventh control object 1970 may be the same. For example, when the sum total of the distance-additional point and the usage frequency are the same, the electronic device 101 may apply priority according to each region.

According to an embodiment, the priority according to each region may be determined based on a user's gripping position. For example, as shown in the example of FIG. 19B, the priority may be defined as region 3>region 6>region 2>region 5>region 1, based on when the lower end is gripped with the left hand. According to an embodiment, the electronic device 101 may recognize a user's gipping type (e.g., the left-hand gripping, right-hand gripping, or two-hand gripping) and recognize the location at which the electronic device 101 is gripped (e.g., the upper end or lower end of the electronic device 101) to determine the priority according to each region. For example, the electronic device 101 may select, as a target control object, the fourth control object 1940 in region 3 with a region-specific high priority and duplicatively provide the fourth control object 1940 to the optimization region.

Figure 20:
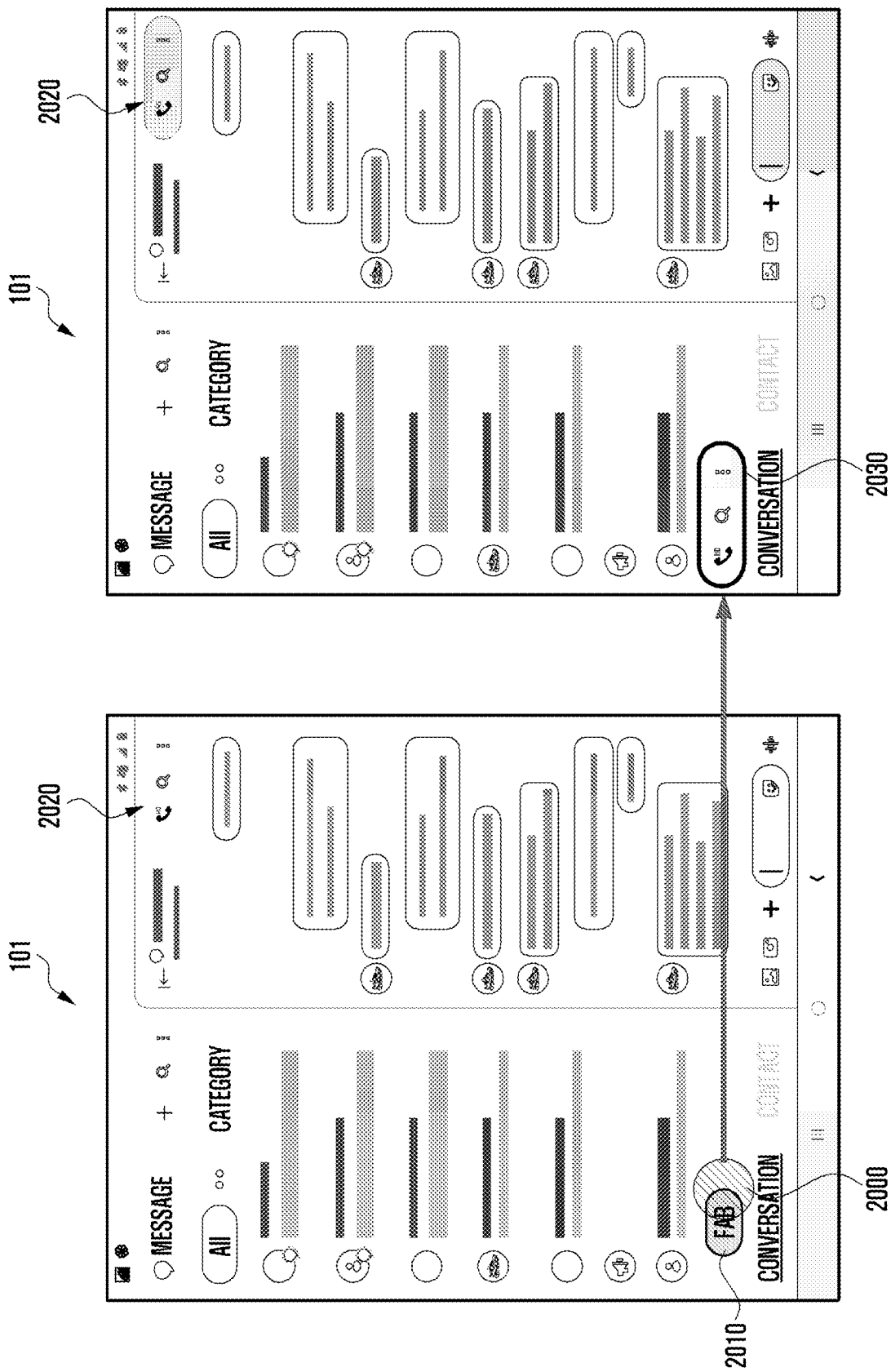
FIG. 20 illustrates an example of duplicatively providing a control object on an execution screen of an electronic device according to an embodiment of the disclosure.
Figure 21:
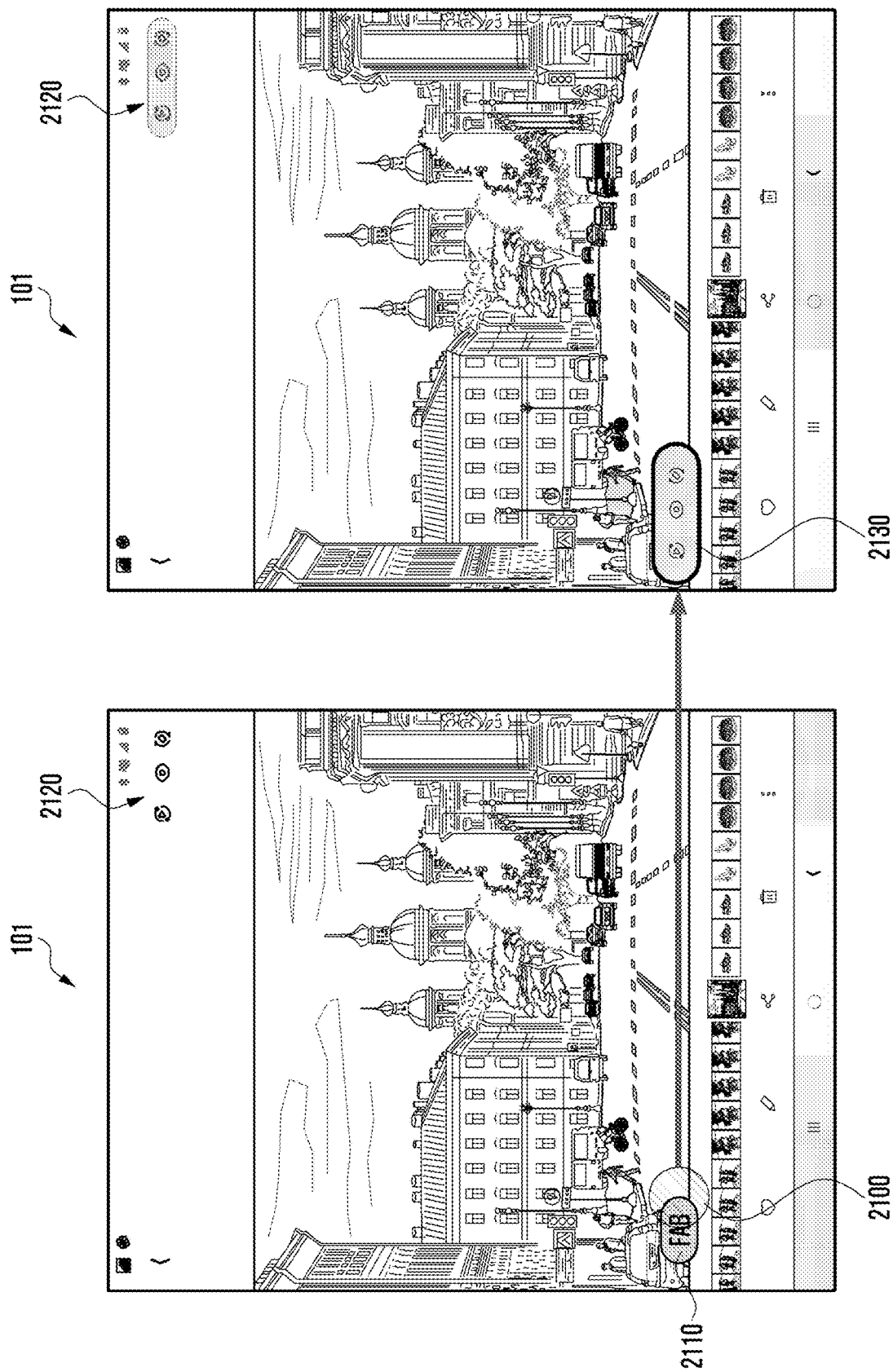
FIG. 21 illustrate an example of duplicatively providing a control object on an execution screen in an electronic device according to an embodiment of the disclosure.

FIGS. 20 and 21 illustrate an example of duplicatively providing a control object on an execution screen in an electronic device according to various embodiments of the disclosure.

According to an embodiment, FIG. 20 shows an example of displaying an execution screen including different depths (or layers) (e.g., upper depth and lower depth thereof) in a message (or messenger) application, based on screen division. According to an embodiment, the electronic device 101 may provide a duplicate control object, based on a user's grasp position, regardless of the depth (or layer) on the execution screen.

Referring to FIG. 20, the target control object 2020 may be a control object for operating a function of a lower depth (or mapped to a function control of a lower depth). According to an embodiment, in FIG. 20, the duplicate control object 2030 may be located in an upper depth. According to an embodiment, the electronic device 101 may enable operation of the function of a depth to which the target control object 2020 corresponding to the duplicate control object 2030 is mapped, regardless of the depth at which the duplicate control object 2030 is to be located. For example, when a function is executed by the duplicate control object 2030 located in the upper depth, the function of the lower depth to which the target control object 2020 is mapped may be operated.

Referring to FIG. 20, a floating action button 2010 may be provided based on a gripping position 2000 within an optimization region according to the lower end gripping by the user's left hand. In the example of FIG. 20, a control object 2020 farthest from the gripping position 2000, among various control objects on the execution screen, may be a target control object. According to an embodiment, based on a user input (e.g., a tap or touch of the floating action button 2010) based on the floating action button 2010, the electronic device 101 may determine an optimization region, based on the position of the floating action button 2010 (e.g., the user's gripping position 2000), and float and provide the duplicate control object 2030 corresponding to the control object 2020 to the optimization region. According to an embodiment, when providing the duplicate control object 2030, the electronic device 101 may emphatically provide the duplicate control object 2030 via a designated visual cue such that the control object 2020 indicated by the duplicate control object 2030 is recognized by a user, while maintaining the control object 2020 to be at the original position thereof.

According to an embodiment, FIG. 21 shows an example of displaying an execution screen in a gallery application, based on one full screen without screen division. According to an embodiment, the electronic device 101 may provide a duplicate control object, based on the user's gripping position regardless of the depth (or layer) of the execution screen.

Referring to FIG. 21, a floating action button 2110 may be provided based on a gripping position 2100 within an optimization region according to the lower end gripping by the user's left hand. In the example of FIG. 21, a control object 2120 farthest from the gripping position 2100, among various control objects on the execution screen, may be a target control object.

According to an embodiment, the electronic device 101 may determine an optimization region, based on the position of the floating action button 2110 (e.g., the user's gripping position 2100) and/or the user input to the floating action button 2110 (e.g., a tap or touch on the floating action button 2110), and float and provide the duplicate control object 2130 corresponding to the control object 2120 to the optimization region. According to an embodiment, when providing the duplicate control object 2130, the electronic device 101 may emphatically provide the duplicate control object 2130 via a designated visual cue such that the control object 2120 indicated by the duplicate control object 2130 is recognized by a user, while maintaining the control object 2120 to be at the original position thereof.

According to an embodiment, as illustrated in FIGS. 20 and 21, when other overlapping objects exist in the region to which duplicate control objects 2030 and 2130 are to be provided, at the time of providing the duplicate control objects 2030 and 2130, the electronic device 101 may move (e.g., correct the optimizing region) the positions of the duplicate control objects 2030 and 2130 such that the duplicate control objects 2030 and 2130 do not overlap with other objects.

According to an embodiment, FIGS. 20 and 21 show an example in which the floating action buttons 2010 and 2110 are provided at the user's gripping positions 2000 and 2100, respectively, during operation in the first designated state and the duplicate control objects 2030 and 2130 are provided based on a user input through the floating action buttons 2010 and 2110. Embodiments of the disclosure are not limited thereto, and as described above, the duplicate control objects 2030 and 2130 may also be directly provided based on the user's gripping position 2000 and 2100, respectively.

Figure 22:
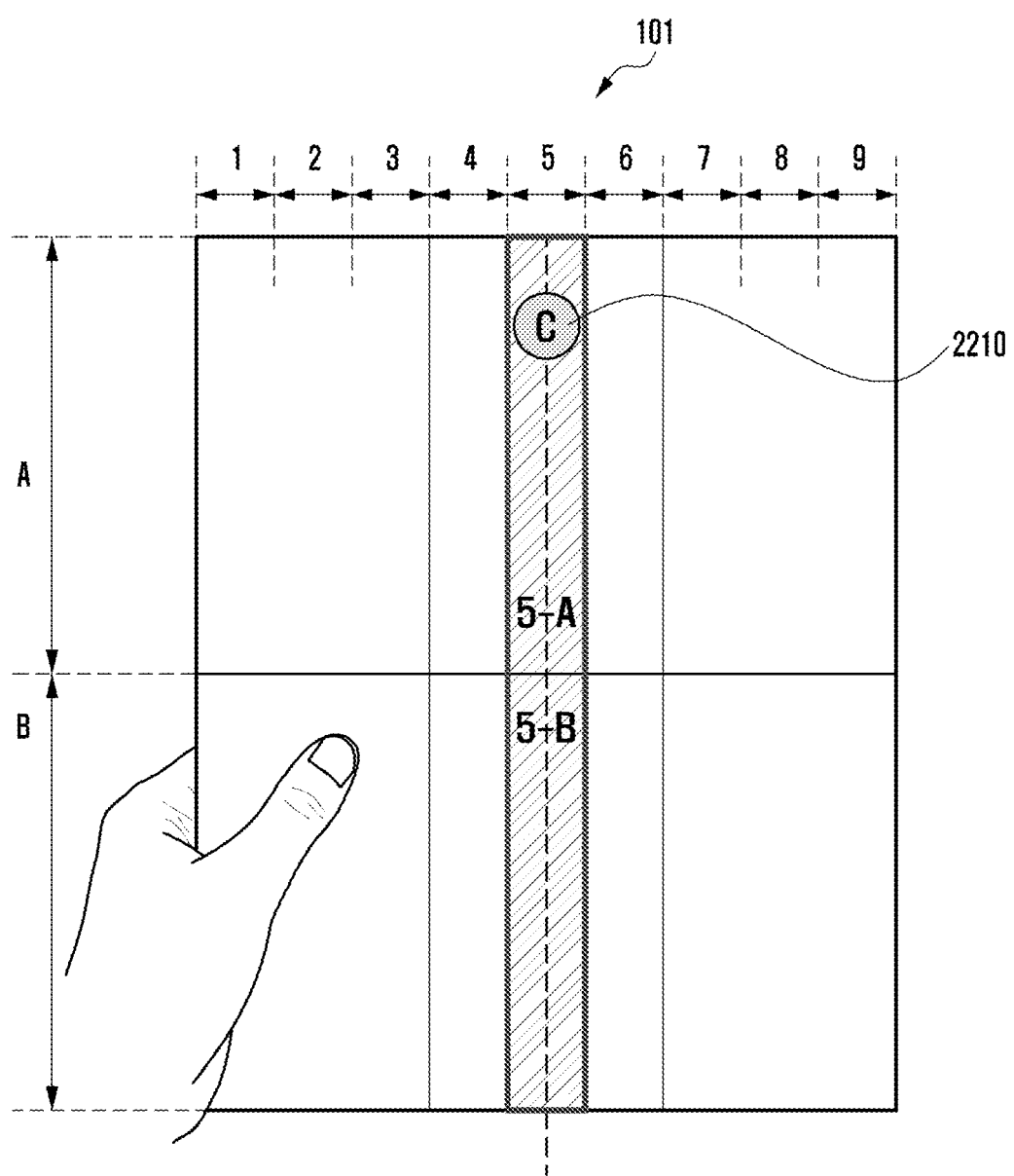
FIG. 22 illustrates an example of providing a target control object in an electronic device, based on a gripping position according to an embodiment of the disclosure.
Figure 23:
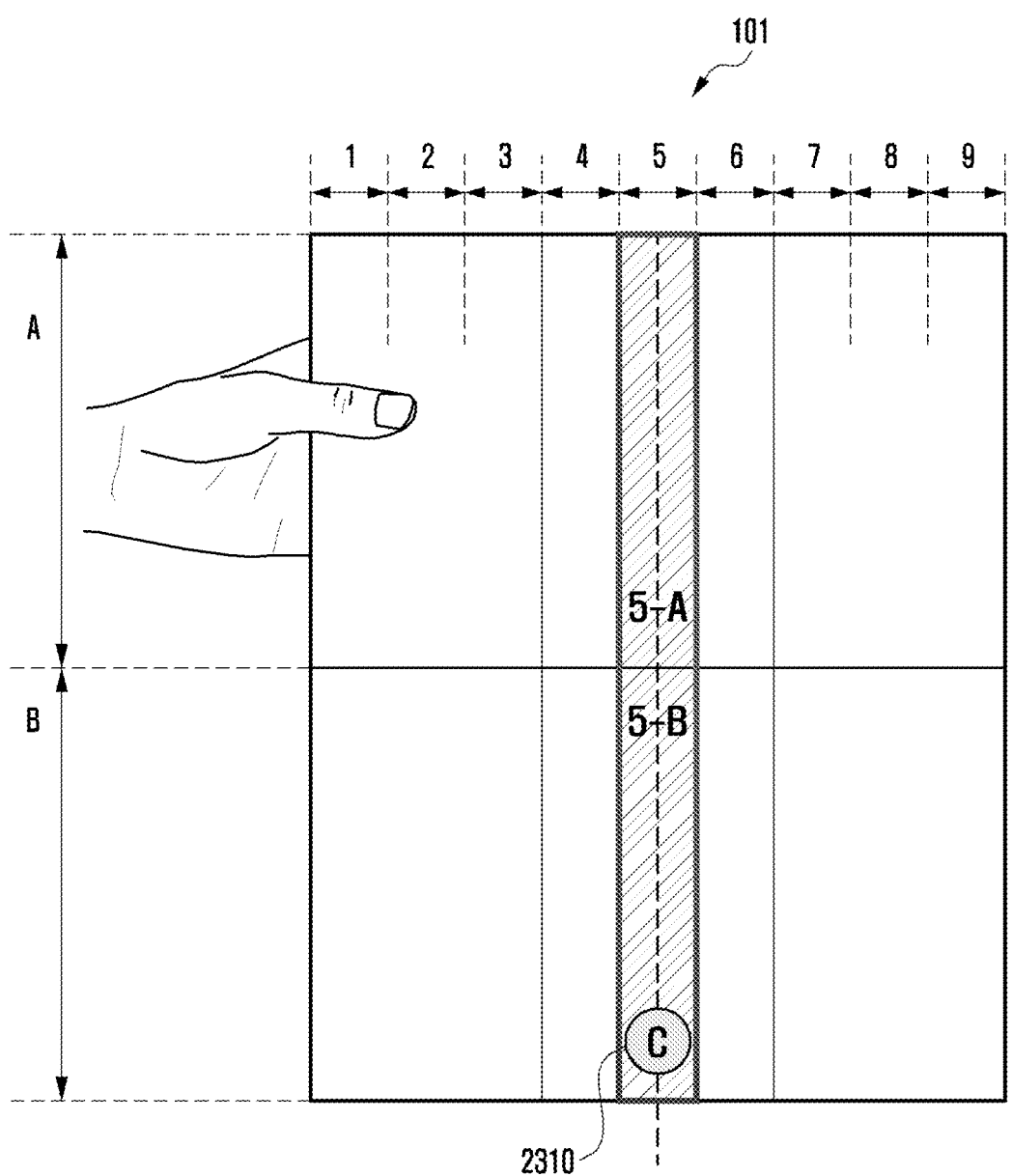
FIG. 23 illustrates an example of providing a target control object in an electronic device, based on a gripping position according to an embodiment of the disclosure.

FIGS. 22 and 23 illustrate an example of providing a target control object, based on a gripping position in an electronic device according to various embodiments of the disclosure.

Referring to FIGS. 22 and 23, FIGS. 22 and 23 may illustrate an example of selecting a target control object in the portrait mode by each user gripping state in the second designated state (e.g., partially folded state) of the electronic device 101. According to an embodiment, FIGS. 22 and 23 may show an example in which the region of display 210 is divided as a 9×2 grid such that nine regions (e.g., regions 1 to 9) are vertically distinguished in proportion to the size (e.g., width) of the hinge region (e.g., region 5) of the folding axis and two regions (e.g., region A and region B) are horizontally distinguished.

According to an embodiment, FIGS. 22 and 23 may show an example of providing, as a target control object, a control object in the most difficult position for a user's manipulation (e.g., the position (or hinge region) of the folding axis at the farthest distance from the gripping position (or region) in the second designated state), among various control objects displayed on an execution screen to an optimization region. For example, a control object located in a region where the user's manipulation is physically most difficult (e.g., a hinge region farthest from the gripping position) from the point (or region) touched by the user's finger may become a target control object for a duplicate control object.

In an embodiment, the optimization region may represent the most suitable region within the maximum range in which a finger (e.g., thumb) is reachable while the user's current gripping state is maintained. According to an embodiment, a duplicate control object corresponding to a target control object may be disposed in the optimization region.

According to an embodiment, FIG. 22 may show an example in which a user grips the left lower end of the electronic device 101 with the left hand in the second designated state (e.g., a partially folded state, for example, a state in which an in-folding state below a certain angle (e.g., about 100 degrees) is maintained for N seconds (e.g., 0.5 seconds) or longer) of the electronic device 101. According to an embodiment, the control object in the hinge region (e.g., region 5-A), which is the farthest from the left-hand gripping position, may be a control object 2210 at the location (e.g., region 5-A) in a diagonal direction from the left-hand gripping position.

According to an embodiment, the electronic device 101 may select, as a target control object, the control object 2210 located (e.g., a region untouchable by the user's finger (e.g., thumb) in the left-hand gripping state) in the farthest hinge region (e.g., region 5-A), based on the direction and/or distance between the user's gripping position and the control object 2210. For example, in a state in which the user grips the lower end of the electronic device 101 with his/her left hand, the touchable optimization region may be the left lower region (e.g., region 1-B, region 2-B, region 3-B), and the hinge region farthest from the user's manipulation in the second designated state may be region 5-A. According to an embodiment, the electronic device 101 may duplicatively provide the control object 2210 to the optimization region (e.g., region 1-B, region 2-B, region 3-B) corresponding to the user's gripping position through a duplicate control object corresponding to the control object 2210.

According to an embodiment, FIG. 23 may show an example in which a user grips the left upper end of the electronic device 101 with the left hand in the second designated state (e.g., a partially folded state, for example, a state in which an in-folding state below a certain angle (e.g., about 100 degrees) is maintained for N seconds (e.g., 0.5 seconds) or longer) of the electronic device 101. According to an embodiment, the control object in the hinge region (e.g., region 5-B), which is the farthest from the left-hand gripping position, may be a control object 2310 at the location (e.g., region 5-B) in a diagonal direction from the left-hand gripping position.

According to an embodiment, the electronic device 101 may select, as a target control object, the control object 2310 located (e.g., a region untouchable by the user's finger (e.g., thumb) in the left-hand gripping state) in the farthest hinge region (e.g., region 5-B), based on the direction and/or distance between the user's gripping position and the control object 2310. For example, in a state in which the user grips the upper end of the electronic device 101 with his/her left hand, the touchable optimization region may be the left upper region (e.g., region 1-A, region 2-A, region 3-A), and the hinge region farthest from the user's manipulation in the second designated state may be region 5-B. According to an embodiment, the electronic device 101 may duplicatively provide the control object 2210 to the optimization region (e.g., region 1-A, region 2-A, region 3-A) corresponding to the user's gripping position through a duplicate control object corresponding to the control object 2310.

According to an embodiment, when the electronic device 101 operates in the second designated state according to the left-handed lower end gripping, the right-handed lower end gripping, or the two-handed lower end gripping, a priority may be given such that the farthest hinge region is to be region 5-A>region 5-B, based on the user's gripping position (e.g., the left lower end region, the right lower region, or the opposite lower regions). According to an embodiment, when the electronic device 101 operates in the second designated state according to the left-handed upper end gripping, the right-handed upper end gripping, or the two-handed upper end gripping, a priority may be given such that the farthest hinge region is to be region 5-B>region 5-A, based on the user's gripping position (e.g., the left upper end region, the right upper region, or the opposite upper regions).

According to an embodiment, the electronic device 101 may select, as a target control object, a control object in a hinge region farthest from the user's gripping position, and duplicatively provide the control object to the optimization region.

According to an embodiment, when the electronic device 101 operates in the second designated state, the electronic device 101 may first provide a floating action object, as in the operation in the first designated state, and then provide a target control object, or may directly provide the target control object in the farthest hinge region without providing the floating action object. According to an embodiment, even in the second designated state, as in the operation in the first designated state, the electronic device 101 may include operations of providing a visual cue based on a control object corresponding to the target control object, and moving or deleting the floating action button or the duplicate control object, based on the interaction with a user.

FIGS. 22 and 23 show an example in which a user grips the left lower end or left upper end of the electronic device 101 with his/her left hand, but is not limited thereto. For example, an operation of providing a target control object for each user gripping state in the second designated state may include various operations corresponding to the operation of providing the target control object according to the user's various gripping states (e.g., the right-handed lower end gripping, the right-handed upper end gripping, the two-handed lower end gripping, and the two-handed upper end gripping) in the portrait mode or the landscape mode, as given in the description with reference to FIGS. 17 and 18 above.

Figure 24:
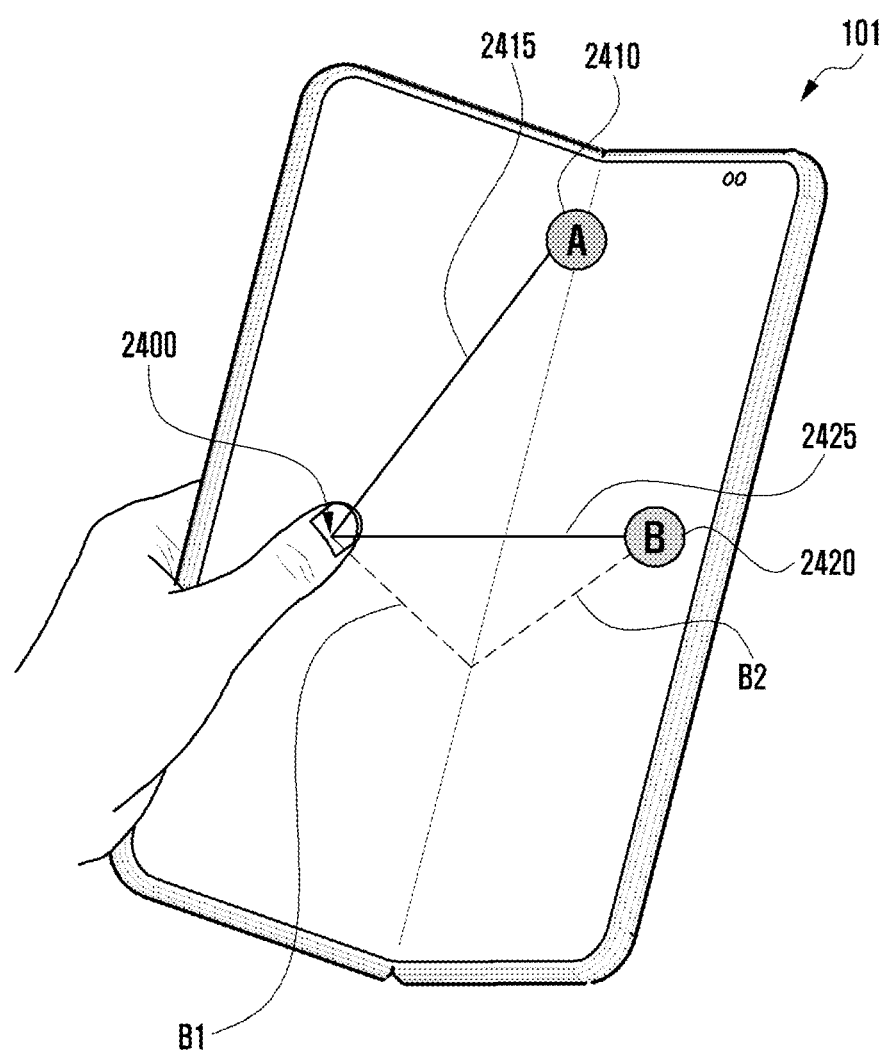
FIG. 24 illustrates an example of determining a target control object in an electronic device according to an embodiment of the disclosure.

FIG. 24 illustrates an example of determining a target control object in an electronic device according to an embodiment of the disclosure.

According to an embodiment, FIG. 24 may show an example of selecting a target control object, based on calculation of the 3D distance between the user's gripping position 2400 and each of the control objects 2410 and 2420 among a plurality of control objects displayed on the execution screen in the second designated state of the electronic device 101.

Referring to FIG. 24, FIG. 24 may illustrate an example of determining a target control object, based on the distance between a gripping position 2400 and each of the control objects 2410 and 2420 in a state in which a user grips the left lower end of the electronic device 101 with his/her left hand in the second designated state of the electronic device 101. According to an embodiment, FIG. 24 may represent an example in which a plurality of control objects 2410 and 2420, such as a first control object 2410 (e.g., object A in a hinge region) and a second control object 2420 (e.g., object B in a plane region) exist in different regions on the currently displayed execution screen).

According to an embodiment, the distance between the user's gripping position 2400 and the first control object 2410 may be the same as the distance 2415 on the screen. According to an embodiment, on the screen, the distance between the user's gripping position 2400 and the second control object 2420 may be the distance (e.g., B1+B2) corresponding to the first distance (e.g., B1) and the second distance (e.g., B2), but the actual distance between the gripping position 2400 and the second control object 2420 in the second designated state may be a straight line distance 2425 on the space.

According to an embodiment, when a control object is present on a display surface (e.g., the second display surface) opposite to the display surface (e.g., the first display surface) corresponding to the gripping position 2400 in the second designated state, the electronic device 101 may calculate a straight line distance on the space instead of a distance on the screen, for the distance to the corresponding control object. According to an embodiment, a straight-line distance on the space may employ various 3D distance calculation methods.

Referring to FIG. 24, the electronic device 101 may give priority to a control object far from the user's gripping position 2400 in the second designated state. For example, the electronic device 101 may calculate the distances 2415 and 2425 to the control object 2410 and 2420, respectively, with reference to the center (e.g., the gripping position 2400) of the optimization region, determine the first control object 2410 having the longest distance (e.g., distance 2415) as a target control object, and duplicatively provide the first control object 2410 to the optimization region.

According to an embodiment, when determining a target control object, the electronic device 101 may concurrently use a distance-additional point and a usage condition (e.g., usage frequency and/or usage time) as criteria for selecting a target control object. According to an embodiment, the electronic device 101 may assign priority, based on a control object having a high usage condition, based on the usage conditions of the control objects 2410 and 2420. According to an embodiment, when usage conditions (e.g., usage frequency and/or usage time) between the control objects 2410 and 2420 are the same, the electronic device 101 may configure a high priority, based on a representative (e.g., maximum, minimum, intermediate, most frequent, or average) value of each control object 2410 or 2420.

Figure 25:
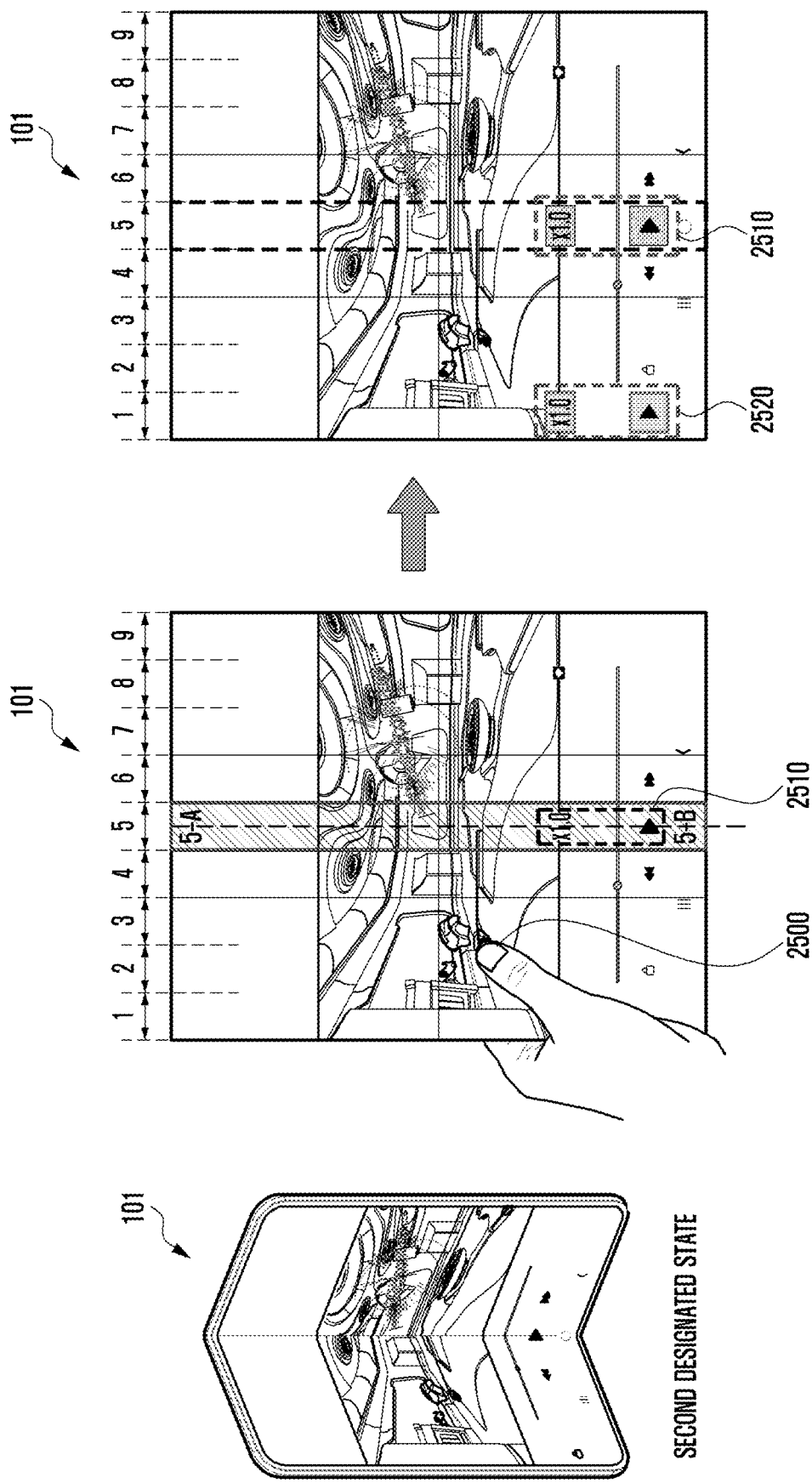
FIG. 25 illustrates an example of duplicatively providing a control object on an execution screen in an electronic device according to an embodiment of the disclosure.

FIGS. 25 and 26 illustrate an example of duplicatively providing a control object on an execution screen in an electronic device according to various embodiments of the disclosure.

According to an embodiment, FIGS. 25 and 26 may show an example of a state in which an execution screen including at least one control object is displayed based on entire single screen in the second designated state of the electronic device 101 without screen division.

Referring to FIG. 25, FIG. 25 may represent an example in which an execution screen (e.g., a video play screen) including multiple control objects is displayed in different regions in a player application.

According to an embodiment, according to the lower end gripping by the user's left hand, the electronic device 101 may provide the duplicate control object 2520, based on the gripping position 2500 within the optimization region. In the example of FIG. 25, the control object 2510 farthest from the gripping position 2500, among various control objects on the execution screen may be the target control object. According to an embodiment, in the example of FIG. 25, the farthest region (or hinge region) from the gripping position 2500 may be region 5-A, whereas the control object may not exist in region 5-A. According to an embodiment, the electronic device 101 may select, as the target control object, the control object 2510 in the farthest hinge region (e.g., region 5-B), based on the distance between the gripping position 2500 and each of various control objects on the execution screen.

According to an embodiment, the electronic device 101 may determine an optimization region, based on the user's gripping position 2500, and float and provide the duplicate control objects 2520 corresponding to the control object 2510 to the optimization region. According to an embodiment, when providing the duplicate control object 2520, the electronic device 101 may emphatically provide the duplicate control object 2520 via a designated visual cue such that the control object 2510 indicated by the duplicate control object 2520 is recognized by a user, while maintaining the control object 2510 to be at the original position thereof.

Referring to FIG. 26, FIG. 26 may show an example of executing a quick panel in the foreground and displaying an execution screen (e.g., a quick panel screen) including multiple control objects in different regions on the quick panel.

According to an embodiment, the electronic device 101 may provide the duplicate control objects 2620 according to the lower end gripping by the user's left hand, based on the gripping position 2600 within the optimization region. In the example of FIG. 26, the control object 2610 farthest from the gripping position 2600, among various control objects on the execution screen, may be the target control object. According to an embodiment, in the example of FIG. 26, the region (or hinge region) farthest from the gripping position 2600 may be region 5-A. According to an embodiment, the electronic device 101 may select, as the target control object, the control object 2610 in the farthest hinge region (e.g., region 5-A), based on the distance between the gripping position 2600 and each of various control objects on the execution screen.

According to an embodiment, the electronic device 101 may determine an optimization region, based on the user's gripping position 2600, and float and provide the duplicate control objects 2620 corresponding to the control object 2610 to the optimization region. According to an embodiment, when providing the duplicate control object 2620, the electronic device 101 may emphatically provide the duplicate control object 2620 via a designated visual cue such that the control object 2610 indicated by the duplicate control object 2620 is recognized by a user, while maintaining the control object 2610 to be at the original position thereof.

According to an embodiment, while the first application (e.g., play application) is operating as the foreground as illustrated in FIG. 25, the second application (e.g., a quick panel) may be switched to operate as the foreground, as illustrated in FIG. 26. In this case, the duplicate control object 2520 illustrated in FIG. 25 may be removed, and the duplicate control object 2620 illustrated in FIG. 26 may be floated and provided in the optimization region corresponding to the user's gripping position.

According to an embodiment, as illustrated in FIGS. 25 and 26, when other overlapping objects exist in the region to which duplicate control objects 2520 and 2620 are to be provided, at the time of providing the duplicate control objects 2520 and 2620, the electronic device 101 may move (e.g., correct the optimizing region) the positions of the duplicate control objects 2520 and 2620 such that the duplicate control objects 2520 and 2620 do not overlap with other objects.

According to an embodiment, FIGS. 25 and 26 may show an example of directly providing the duplicate control objects 2520 and 2620 to the user's gripping positions 2500 and 2600, respectively, during operation in the second designated state. The embodiments of the disclosure are not limited thereto, and as described above, a floating action button may be provided to the user's gripping position 2500 or 2600, and the duplicate control objects 2520 and 2620 may be floated and provided by a user input through the floating action button.

Figure 27B:
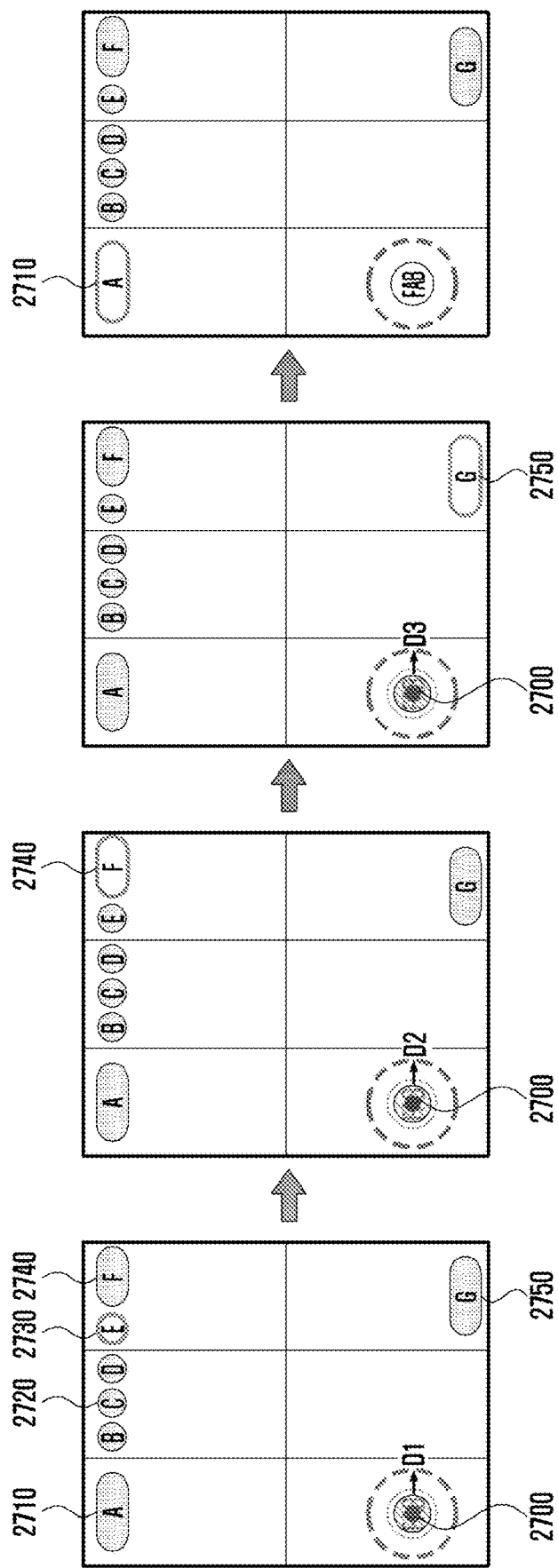
FIG. 27B illustrates an example of selecting a target control object, based on an interaction with a user in an electronic device according to an embodiment of the disclosure.

FIGS. 27A and 27B illustrate an example of selecting a target control object, based on an interaction with a user in an electronic device according to various embodiments of the disclosure.

According to an embodiment, FIGS. 27A and 27B may show an example of selecting a user-specified target control object through switching among a plurality of control objects 2710, 2720, 2730, 2740, and 2750, based on user input using the floating action button 2700 in case that the plurality of control objects 2710, 2720, 2730, 2740, and 2750 exist on an execution screen.

Referring to FIGS. 27A and 27B, an example in which a third control object 2730 (e.g., object E) is selected as a target control object may be shown. For example, the example may show a state in which a visual cue is displayed based on the third control object 2730. According to an embodiment, in a state in which the third control object 2730 is selected, the electronic device 101 may switch to another control object in the same region or another region according to a user input and designate the same as the target control object. According to an embodiment, the electronic device 101 may provide a control object corresponding to a visual cue, based on switching between control objects.

Referring to FIG. 27A, in a state in which the third control object 2730 is selected, a user may perform an input of selectively or sequentially moving (e.g., dragging) the floating action button 2700 in a first direction (direction ①) (e.g., downward direction), a second direction (direction ②) (e.g., upper_left diagonal direction), or a third direction (direction ③) (e.g., right direction). According to an embodiment, in response to the user input (e.g., dragging in a corresponding direction) indicating a designated direction, the electronic device 101 may selectively or sequentially switch from the third control object 2730 to the fifth control object 2750, the first control object 2710, or the second control object 2720.

According to an embodiment, the electronic device 101 may move the position of the current target control object (e.g., the third control object 2730) to an object therearound in response to a direction based on a user input. For example, as illustrated in FIG. 27A, when the current target control object is the third control object 2730 (e.g., object E), based on the third control object 2730, the second control object 2720 (e.g. the bundled control objects B, C, D) may be located on the left side, the fourth control object 2740 (e.g. object F) may be located on the right side, and the fifth control object 2750 (e.g., object G) may be located below. According to an embodiment, in the case of a first user input (e.g., a swipe input in a designated direction), the electronic device 101 may select an object by moving through objects around the current target control object (e.g., the third control object 2730) one by one in a designated direction. According to an embodiment, in the case of a second user input (e.g., long press after dragging in a designated direction (e.g., drag and hold)) different from the first user input, the electronic device 101 may enable continuous movement between objects around the current target control object (e.g., the third control object 2730) in a designated direction until the second user input is released.

According to an embodiment, during movement to select a target control object based on a user input, the electronic device 101 may select bundled control objects such as the second control object 2720 as one object (e.g., a group or bundle). According to an embodiment, during movement to select a target control object based on a user input, the electronic device 101 may skip a control object with a low usage condition (e.g., usage frequency) and immediately move (e.g., jump) the position of the target control object to the next object.

According to an embodiment, the electronic device 101 may switch a visual cue, based on a control object selected according to a transition between control objects and emphasize a corresponding control object.

Referring to FIG. 27B, in a state in which the third control object 2730 is selected, a user may perform an input of continuously or repeatedly moving (e.g., dragging) the floating action button 2700 in the same fourth direction (D1, D2, D3) (e.g., the right direction). According to an embodiment, the electronic device 101 may perform continuous switching from the third control object 2730 sequentially to the fourth control object 2740, the fifth control object 2750, and the first control object 2710 in response to each user input (e.g., dragging in the corresponding direction) indicating the specified direction. According to an embodiment, the electronic device 101 may switch a visual cue, based on a control object selected according to a transition between control objects and emphasize a corresponding control object.

According to an embodiment, in FIGS. 27A and 27B, the electronic device 101 may enter transition mode of a control object, based on a designated user input (or gesture) (e.g., long press or tap & hold) and support transition between control objects in the transition mode in response to the user input. For example, the electronic device 101 may enable the floating action button to operate like a jog dial.

Figure 28:
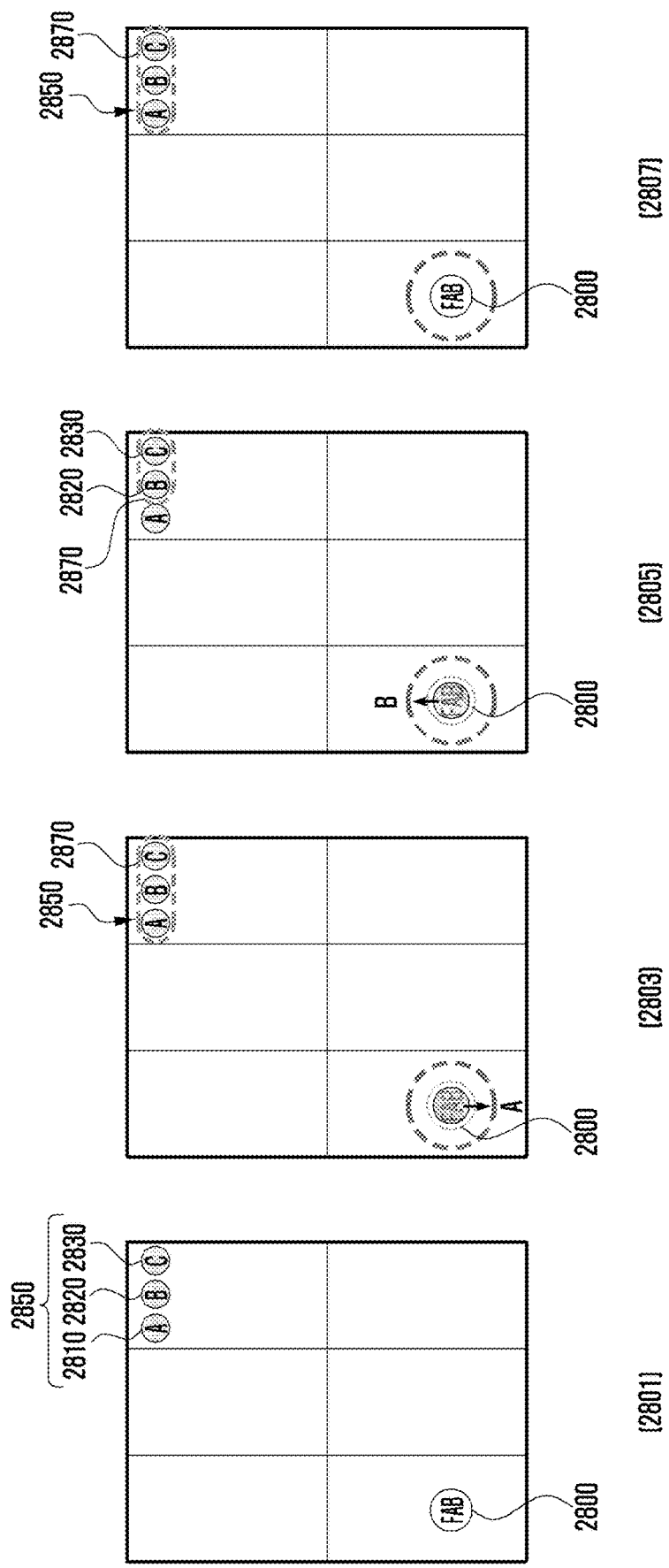
FIG. 28 illustrates an example of selecting a target control object, based on an interaction with a user in an electronic device according to an embodiment of the disclosure.

FIG. 28 illustrates an example of selecting a target control object, based on an interaction with a user in an electronic device according to an embodiment of the disclosure.

According to an embodiment, FIG. 28 may show an example of selecting a user-specified target control object by adjusting the number of bundled control objects, based on a user input using the floating action button 2800 for the bundled control objects 2850.

Referring to FIG. 28, example <2801> may represent an example in which bundled control objects 2850 (e.g., object A 2810, object B 2820, object C 2830) are selected as a target control object. According to an embodiment, in a state in which the bundled control objects 2850 are selected, the electronic device 101 may adjust the number of bundled control objects 2850 according to a user input and designate the same as a target control object.

According to an embodiment, in the state in which the bundled control objects 2850 are selected, a user may switch a mode to a number adjusting mode for the control objects, based on a specified user input (or gesture) (e.g., gesture of rotating after touching the floating action button 2800) using the floating action button 2800. According to an embodiment, the electronic device 101 may enter the number adjusting mode for the control objects and produce the visual cue 2870 (e.g., change a visual cue to blinking bundle line or to bundled dotted line) designated for the bundled control objects 2850 in response to entering the number adjusting mode, as in the example of <2803>.

According to an embodiment, in example <2803>, the user may perform an input of moving (e.g., dragging) the floating action button 2800 in the first direction (direction ①) (e.g., downward direction). According to an embodiment, in response to a user input indicating a designated direction (e.g., dragging in a corresponding direction), the electronic device 101 may decrease the number of bundled control objects as in example <2805>.

For example, according to an input of moving in the designated first direction (direction ①) using the floating action button 2800 in the number adjusting mode, the number of bundled (or selected) control objects in the bundled control objects 2850 may be sequentially decreased. For example, as illustrated in example <2805>, object A 2810 may be excluded from the visual cue 2870, and object B 2820 and object C 2830 may be provided as the bundled control objects. According to an embodiment, when an input for moving in the first direction (direction ①) is additionally performed in the state as in example <2805>, object A 2810 and object B 2820 may be excluded from the visual cue 2870 and object C 2830 may be provided as the bundled control object.

According to an embodiment, in example <2805>, the user may perform an input of moving (e.g., dragging) the floating action button 2800 in the second direction (direction ②) (e.g., upward direction). According to an embodiment, in response to a user input indicating a designated direction (e.g., dragging in a corresponding direction), the electronic device 101 may increase the number of bundled control objects as in example <2807>. For example, according to an input of moving in the designated second direction (direction ②) using the floating action button 2800 in the number adjusting mode, the number of bundled (or selected) control objects in the bundled control objects 2850 may be sequentially increased. For example, as illustrated in example <2807>, object A 2810 may be added to object B 2820 and object C 2830 in the visual cue 2870 to be provided as the bundled control objects.

According to an embodiment, in FIG. 28, the electronic device 101 may enter a number adjusting mode for the control objects, based on a specified user input and support adjusting the number of selected control objects in response to the user input in the number adjusting mode. For example, the electronic device 101 may support the bundled control objects having control objects selected in a bundle such that the number of individual control objects included in the bundled control objects are adjusted.

According to an embodiment, when individual control objects included in the group control object 2850 are changed, as in example <2805>, the electronic device 101 may record (or configure and store) the change made to the bundled control objects. For example, when selecting a target control object in a subsequent operation, the electronic device 101 may select the bundled control object (e.g., object B 2820, object C 2830) changed from the existing bundled control objects (e.g., object A 2810, object B 2820, object C 2830) as the target control object, and may float and provide a duplicate control object corresponding to the changed bundled control objects (e.g., object B 2820 and object C 2830).

Figure 29:
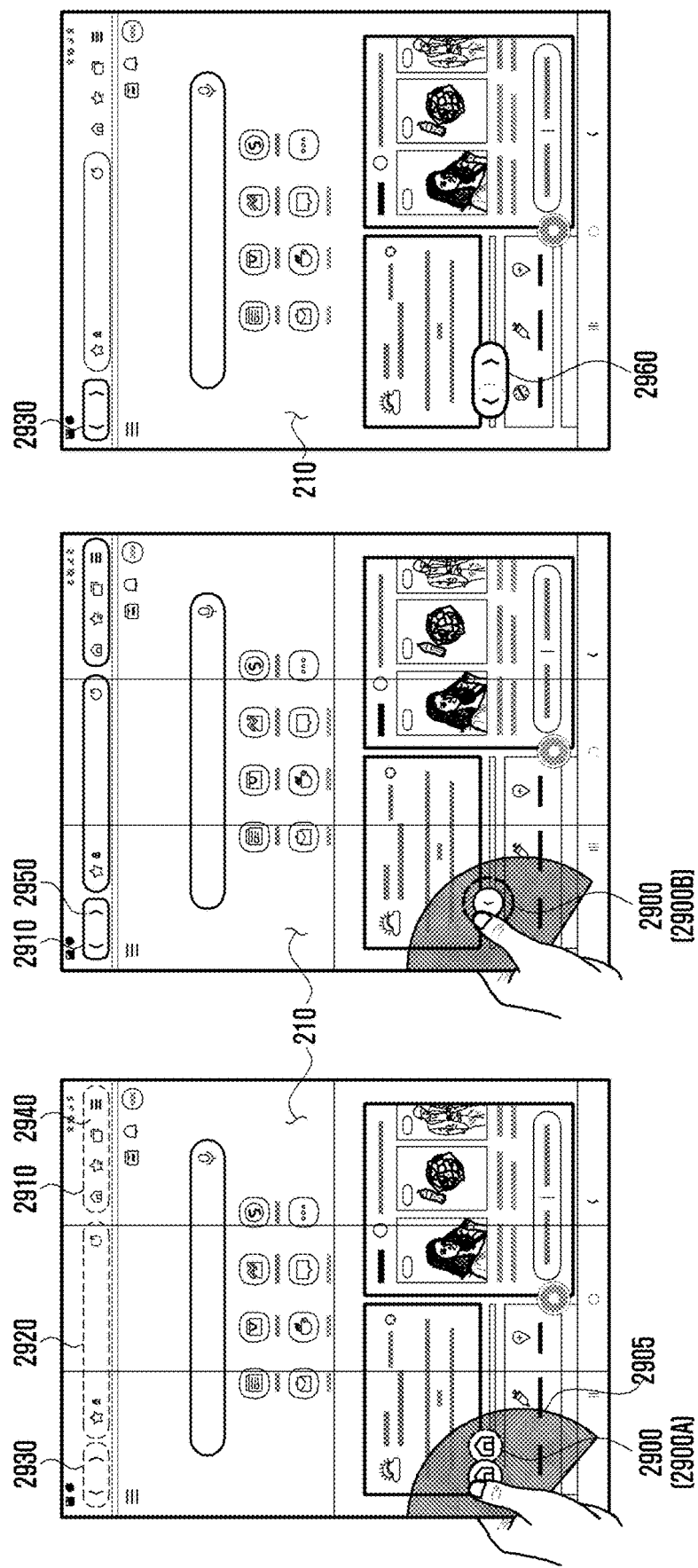
FIG. 29 is a diagram illustrating an example of selecting a target control object based on an interaction with a user in an electronic device according to an embodiment of the disclosure.

FIG. 29 illustrates an example of selecting a target control object, based on an interaction with a user in an electronic device according to an embodiment of the disclosure.

According to an embodiment, FIG. 29 may show an example of selecting a user-specified target control object through switching among a plurality of control objects 2910, 2920, and 2930, based on a user input using the floating action button 2900, when the plurality of control objects (e.g., a first control object 2910, a second control object 2920, and a third control object 2930) exist on the execution screen.

According to an embodiment, FIG. 29 may show an example of changing the floating action button 2900 into a representative object corresponding to a changed target control object and providing the representative object, based on the change of the target control object according to the transition between the plurality of control objects 2910, 2920, and 2930.

Referring to FIG. 29, in the example of FIG. 29, reference numeral 2900 may indicate an example of a floating action button, and reference numeral 2905 may indicate an optimization region. In the example of FIG. 29, reference numeral 2910 may indicate a first control object (e.g., bundled (or packaged) control objects), reference numeral 2920 may indicate a second control object (e.g., a URL input object), and reference numeral 2930 may indicate a third control object (e.g., a screen movement object). In the example of FIG. 29, the first control object 2910 may represent a target control object (e.g., a first target control object) to be provided to the optimization region 2905, among a plurality of control objects (e.g., the first control object 2910, the second control object 2920, and the third control object 2930) associated with an application. In the example of FIG. 29, reference numeral 2940 may indicate an example of a visual cue (e.g., a first visual cue) for a visual effect indicating that the first control object 2910 is designated as the target control object. In the example of FIG. 29, reference numeral 2950 may indicate an example of a visual cue (e.g., a second visual cue) for a visual effect indicating that the third control object 2930 is designated as the target control object, based on the change of the target control object from the first control object 2910 to the third control object 2930. In the example of FIG. 14, reference numeral 2960 may indicate an example of a duplicate control object corresponding to the third control object 2930 designated as the target control object.

As illustrated, FIG. 29 may be an example in which the target control object is changed from the first control object 2910 to the third control object 2930 according to a user input (e.g., corresponding to user input for changing the target control object in FIGS. 27A to 28), while the first control object 2910 is selected as the target control object.

Referring to FIG. 29, the floating action button 2900 (e.g., a first floating action button 2900A) may be provided (e.g., displayed) in response to a gripping position (e.g., the point on the display 210, touched by the user's finger) according to a user's gripping state. According to an embodiment, the floating action button 2900 may be provided in a region on the display 210, corresponding to the gripping position, in a floating manner. According to an embodiment, the floating action button 2900 may be disposed in the optimization region 2905 without being overlapped with other touch regions.

According to an embodiment, a first visual cue 2940 having a visual effect applied thereto may be provided to the first control object 2910 determined as the target control object, among the control objects (e.g., the first control object 2910, the second control object 2920, and the third control object 2930) displayed on the display 210. According to an embodiment, the first visual cue 2940 may include a visual effect, such as a sign including highlighting, animation, color change, and/or indicating object (e.g., an arrow image or icon).

According to an embodiment, in a state in which the first control object 2910 is selected as the target control object, a user may switch the target control object from the first control object 2910 to the third control object 2930 through sequential input of moving (e.g., dragging) the floating action button 2900 (e.g., the first floating action button 2900A) in one direction (e.g., in the left direction in FIG. 29). For example, in response to user input, the electronic device 101 may selectively or sequentially switch the target control object from the first control object 2910 to the second control object 2920 or to the third control object 2930.

According to an embodiment, the electronic device 101 may provide a second visual cue 2950 having a visual effect applied thereto, to a control object (for example, the third control object 2930) designated as the changed target control object according to the change of the target control object. For example, the electronic device 101 may remove the first visual cue 2940 from the first control object 2910 and provide the second visual cue 2950 to the third control object 2930.

According to an embodiment, a user may hold a user input on the floating action button 2900 while changing a target control object.

According to an embodiment, the floating action button 2900 may be provided as a representative object (or representative image) (e.g., icon) indicating a control object (e.g., the first control object 2910 or the third control object 2930 in FIG. 29) corresponding to a currently designated target control object. For example, when the first control object 2910 is designated as the target control object, the floating action button 2900 may be provided as the first floating action button 2900A, based on the first representative object (e.g., home icon) indicating the first control object 2910. For example, when the third control object 2930 is designated as the target control object, the floating action button 2900 may be provided as the second floating action button 2900B, based on the second representative object (e.g., screen movement icon) indicating the third control object 2930.

According to one embodiment, a representative object for the floating action button 2900 may be determined according to a designated condition. For example, in the case of bundled control objects, such as the first control object 2910 or the third control object 2930, a representative image corresponding to at least one control object (e.g., the leftmost control object among the bundled control objects) may be provided based on the designated condition (e.g., usage frequency, usage time, and/or assigned priority).

According to an embodiment, a plurality of floating action buttons 2900 may be provided. For example, one or a plurality of floating action buttons 2900 may be provided based on the configuration (e.g., configuration related to the method of providing a floating action button) of the electronic device 101.

According to an embodiment, one floating action button corresponding to a designated control object may be provided based on the first configuration for the floating action button 2900 (e.g., configuration for calling one floating action button). According to an embodiment, a plurality of floating action buttons corresponding to a plurality of designated control objects may be provided based on the second configuration for the floating action button 2900 (e.g., configuration for calling a plurality of floating action button). For example, in the case of the bundled control object such as the first control object 2910 or the third control object 2930, a plurality of floating action buttons may be provided for the control objects (e.g., corresponding to the number of control objects) included in the bundled control objects, respectively.

According to an embodiment, the floating action button 2900 may be changed from the first floating action button 2900A to the second floating action button 2900B, based on a user input for changing a target control object. For example, based on the change of the target control object from the first control object 2910 to the third control object 2930, the electronic device 101 may change the floating action button 2900 from the first floating action button 2900A including the first representative object (e.g., home icon) corresponding to the first control object 2910 to the second floating action button 2900B including the second representative object (e.g., screen movement icon) corresponding to the third control object 2930, and provide the changed floating action button.

According to an embodiment, the electronic device 101 may provide a duplicate control object 2960 corresponding to a target control object (e.g., the third control object 2930) to a region (e.g., the optimization region 2905) corresponding to the floating action button 2900. For example, the duplicate control object 2960 may be displayed at a position (or the optimization region 2905) corresponding to the user's gripping position.

According to an embodiment, in a state in which the third control object 2930 is selected as the target control object, the user may release the user input (e.g., touch) on the floating action button 2900 (e.g., the second floating action button 2900B). According to an embodiment, in response to the release of the user input, the electronic device 101 may provide the duplicate control object 2960 corresponding to the control object (e.g., the third control object 2930) designated as the current target control object to the optimization region 2905. For example, the electronic device 101 may float and provide the duplicate control object 2960 identical to the third control object 2930 designated as the target control object to the optimization region 2905. According to an embodiment, the duplicate control object 2960 may be disposed in the optimization region 2905 without being overlapped with the other touch regions.

According to an embodiment of the disclosure, the electronic device 101 may support various configuration in connection with duplicatively providing a control object related to a running application to the optimization region according to the user's gripping state of the electronic device 101. For example, the electronic device 101 may support various configurations for a method of providing a duplicate control object via a designated menu (e.g., a quick panel or a configuration menu) of the electronic device 101. For example, various configurations for a method of providing a duplicate control object may include various configurations, such as on/off configuration for whether to execute a duplicate control object on a quick panel, on/off configuration for whether to use a floating action button, and/or configuration for calling a floating action button (e.g., whether to call multiple floating action buttons). According to an embodiment, the electronic device 101 may support configuration for a corresponding function via a switch object (e.g., an on/off switch) for configuring function on/off option.

Figure 30:
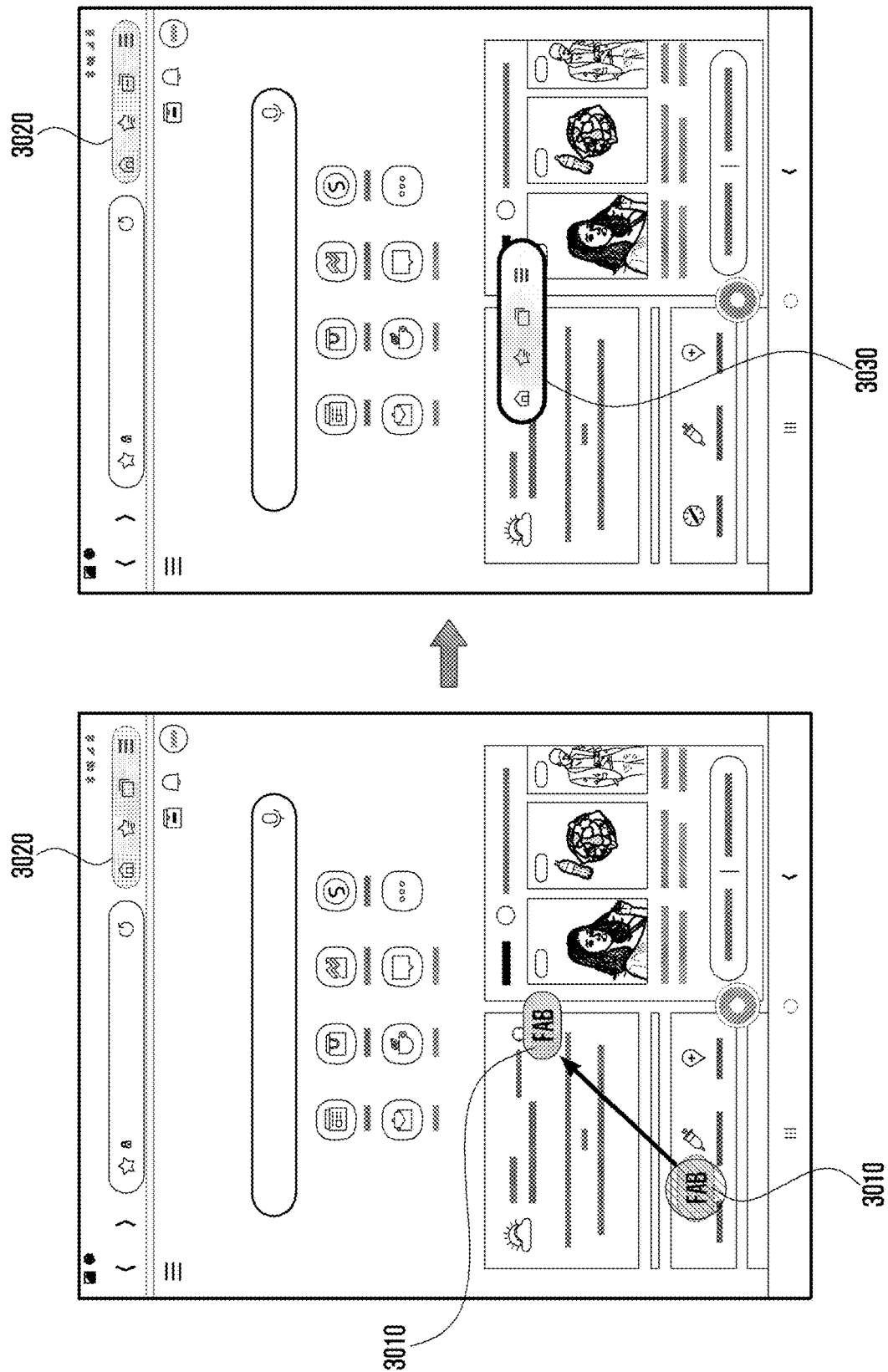
FIG. 30 illustrates an example of providing a duplicate control object, based on an interaction with a user in an electronic device according to an embodiment of the disclosure.

FIG. 30 illustrates an example of providing a duplicate control object, based on an interaction with a user in an electronic device according to an embodiment of the disclosure.

According to an embodiment, FIG. 30 illustrates an example of operating (e.g., moving) a floating action button 3010 and/or a duplicate control object 3030, based on an interaction with a user.

According to an embodiment, in a designated state according to the configured first method, the electronic device 101 may first provide a floating action button 3010 in response to detection of the user's gripping state, and then provide a duplicate control object 3030 according to a user input based on the floating action button 3010. According to an embodiment, in a designated state according to the configured second method, the electronic device 101 may directly provide the duplicate control object 3030 without providing the floating action button 3010, in response to the detection of the gripping state.

According to an embodiment, the detection of a gripping state may be performed based on, for example, detection of a touch (e.g., palm touch) in a region of a cover display, which is larger than or equal to a designated size and/or detection of an object corresponding to the user's hand based on a rear camera module, and detection of a touch (e.g., a finger touch) at a certain point on the display 210. According to an embodiment, an operation of detecting a gripping state will be described with reference to the following drawings.

According to an embodiment, FIG. 30 may show an example of providing a floating action button 3010, based on the first method, moving the floating action button 3010 through an interaction with a user based on the floating action button 3010, and providing a duplicate control object 3030 in a region corresponding to the floating action button 3010.

According to an embodiment, the electronic device 101 may detect a user's gripping state and provide the floating action button 3010, based on the gripping position corresponding to the gripping state. According to an embodiment, at the time of providing the floating action button 3010, the electronic device 101 may apply a designated visual cue to the control object 3020 (e.g., a target control object) to be duplicated to provide the visual cue to a user.

According to an embodiment, a user may call the duplicate control object 3030 corresponding to the control object 3020 to the region corresponding to the floating action button 3010, based on a user input (e.g., tap) designated on the floating action button 3010. According to an embodiment, based on the designated user input, the electronic device 101 may produce the duplicate control object 3030 to provide the same to the region of the floating action button 3010, while maintaining the visual cue for the control object 3020 being duplicatively provided.

According to an embodiment, the user may move the floating action button 3010 in response to a user input, based on the user input (e.g., moving (e.g., dragging) in a long-press state) designated on the floating action button 3010. According to an embodiment, the user may release the user input after moving the floating action button 3010. According to an embodiment, when the release of the user input is detected, the electronic device 101 may call the duplicate control object 3030 corresponding to the control object 3020 to the region to which the floating action button 3010 is moved. According to an embodiment, the electronic device 101 may maintain the visual cue for the control object 3020 while the duplicate control object 3030 is provided.

According to an embodiment, FIG. 30 illustrates an example of moving the floating action button 3010 according to a user input, but is not limited thereto. According to an embodiment, the duplicate control object 3030 may be moved and provided according to a user input for the duplicate control object 3030.

According to an embodiment, the electronic device 101 may enter a movement mode of the floating action button 3010 or the duplicate control object 3030, based on a designated user input (e.g., drag and drop for movement beyond the designated region within on an execution screen) and support movement of the position of the floating action button 3010 or the duplicate control object 3030 in the movement mode, in response to a user input.

According to an embodiment, the electronic device 101 may enter a removal mode of the floating action button 3010 or the duplicate control object 3030, based on the designated user input (e.g., drag and drop to move to a region outside (or edge) of the execution screen), and remove the floating action button 3010 or the duplicate control object 3030 from the screen according to the removal mode. According to an embodiment, when the floating action button 3010 or the duplicate control object 3030 is removed according to the removal mode, the electronic device 101 may stop displaying the visual cue for the control object 3020.

Figure 31:
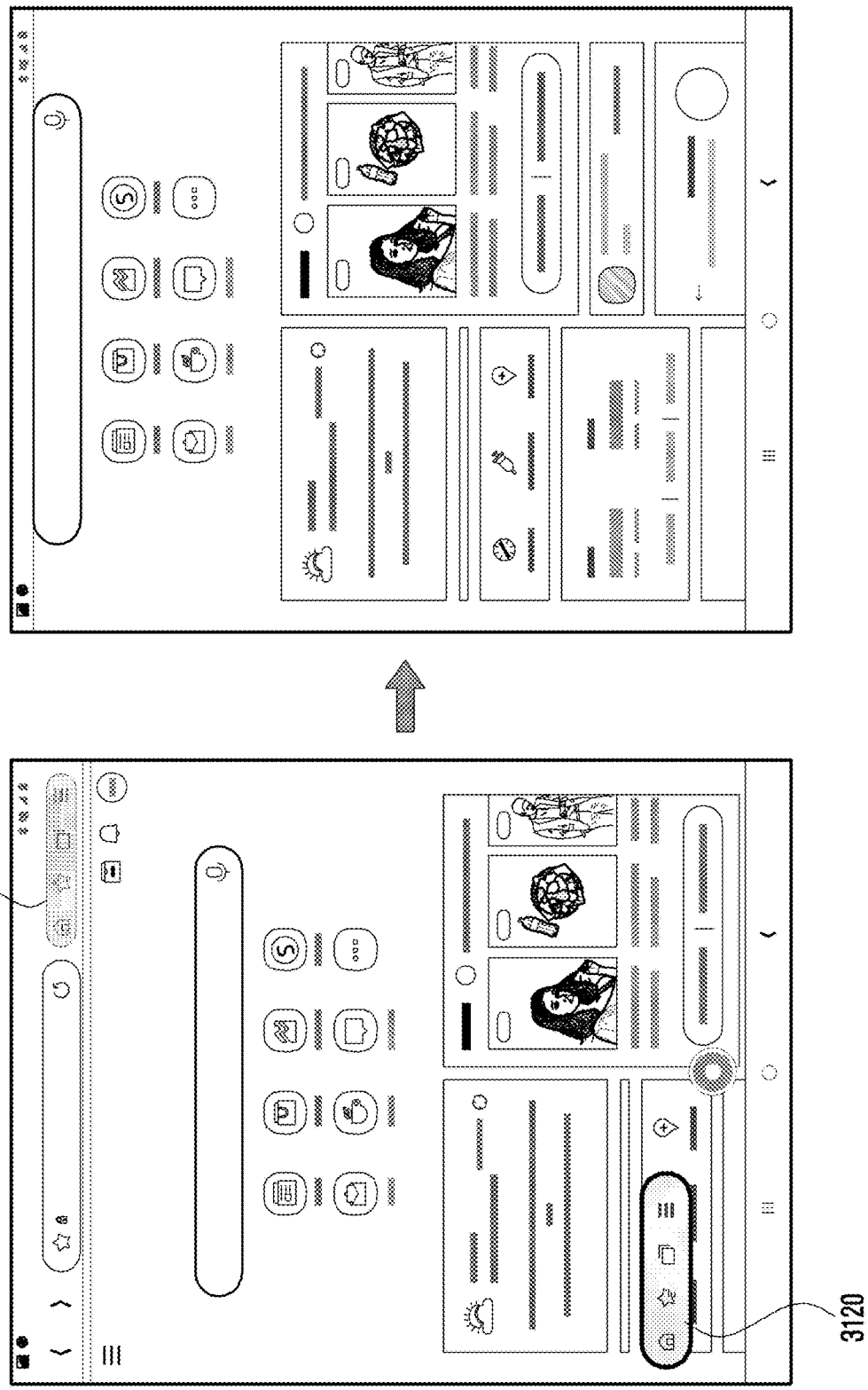
FIG. 31 illustrates an example in which a duplicate control object is provided in an electronic device according to an embodiment of the disclosure.

FIG. 31 illustrates an example in which a duplicate control object is provided in an electronic device according to an embodiment of the disclosure.

According to an embodiment, FIG. 31 illustrates an example of operating (e.g., removing) a visual cue for a control object 3110 being provided or a duplicate control object 3120, based on an interaction with a user.

According to an embodiment, FIG. 31 may show an example of removing the visual cue for the control object 3110 and the duplicate control object 3120 according to a designated condition, in a state in which the visual cue for the control object 3110 selected as a target control object and the duplicate control object 3120 corresponding to the control object 3110 are provided.

According to an embodiment, when the control object 3110 is removed from the execution screen, the electronic device 101 may remove the visual cue and duplicate control object 3120. According to an embodiment, as illustrated in FIG. 31, the control object 3110 may be removed from the execution screen according to a user input (e.g., scrolling screens, moving pages, and/or switching execution screens (e.g., home screen moving, foreground execution screen switching)). According to an embodiment, when the control object 3110, which is the target control object being displayed on the execution screen, is removed, the electronic device 101 may remove the duplicate control object 3120 being duplicatively provided as well and may not display the duplicated control object 3120.

According to an embodiment, even when a designated state of the electronic device 101 is changed (e.g., a mechanical state of the electronic device 101 is changed), the electronic device 101 may remove the duplicate control object 3120 being duplicatively provided and may not display the duplicate control object 3120. For example, while the duplicate control object 3120 is provided in a first designated state, the electronic device 101 may be transitioned from the first designated state to a second designated state. For example, while the duplicate control object 3120 is provided in the second designated state, the electronic device 101 may be transitioned from the second designated state to the first designated state. According to an embodiment, when a state change is detected while the duplicate control object 3120 is provided, the electronic device 101 may remove the duplicate control object 3120 and the visual cue for the control object 3110 corresponding thereto.

FIGS. 32, 33, 34, 35, 36, and 37 illustrate an example of detecting a gripping state in an electronic device according to various embodiments of the disclosure.

Figure 32:
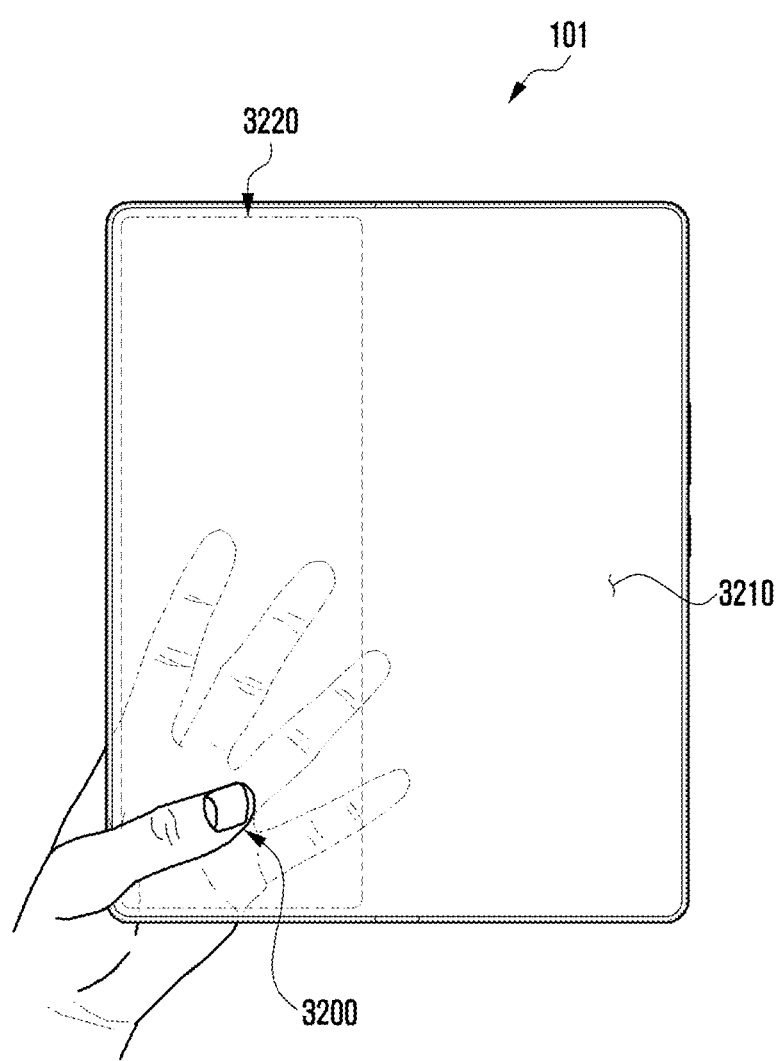
FIG. 32 illustrates an example of detecting a gripping state of an electronic device according to an embodiment of the disclosure.
Figure 36:
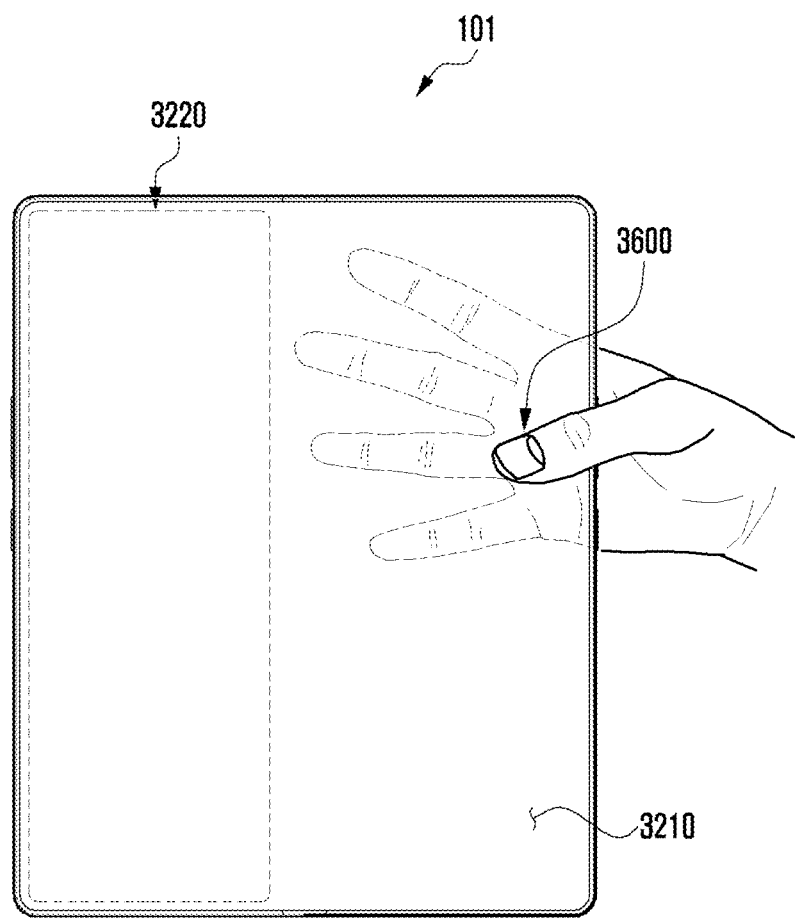
FIG. 36 illustrates an example of detecting a gripping state of an electronic device according to an embodiment of the disclosure.

FIGS. 32 and 36 illustrate an example of a front surface of the electronic device 101 according to an embodiment. FIGS. 32 and 36 may represent projection views of the electronic device 101 viewed from the front.

Figure 33:
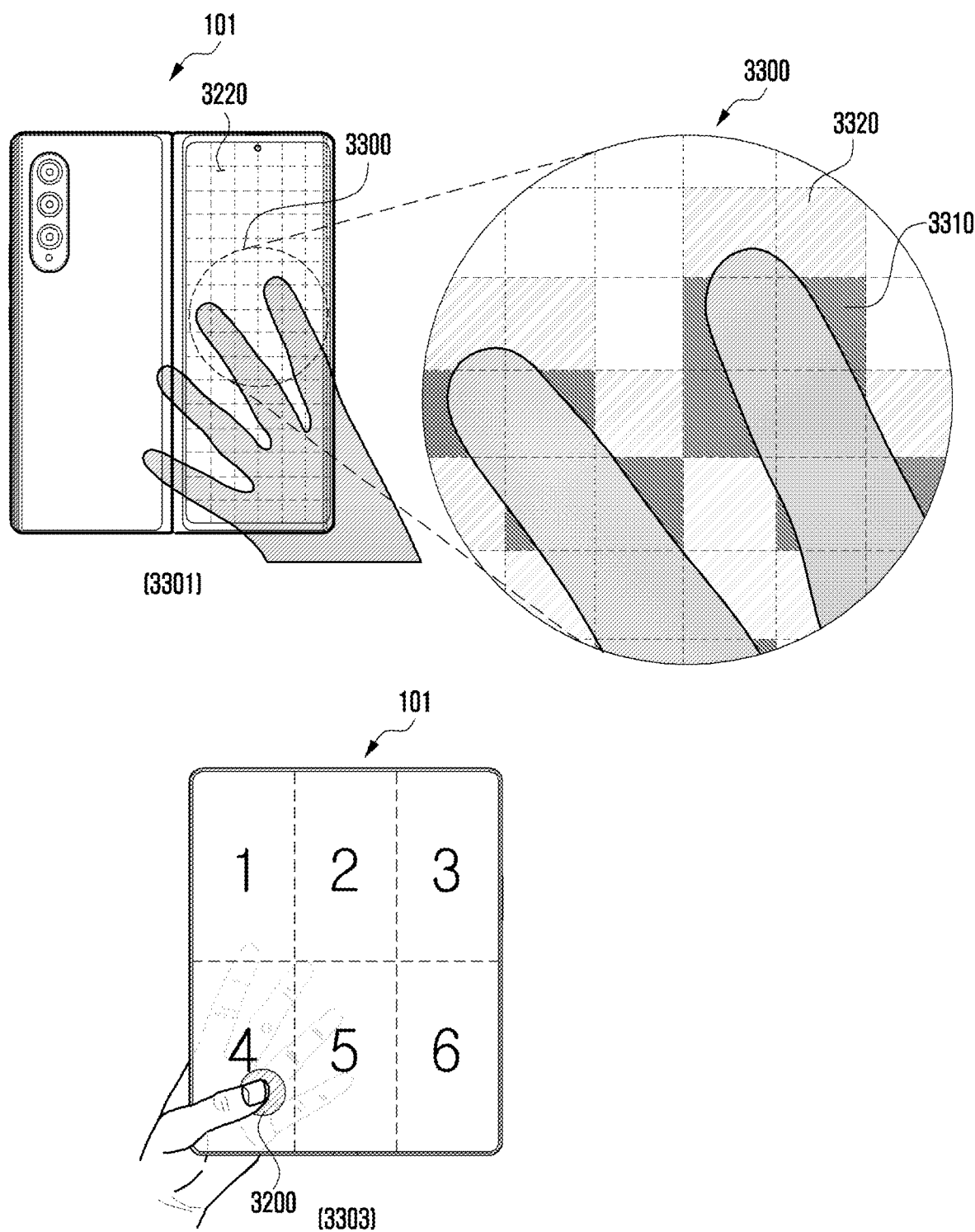
FIG. 33 illustrates an example of detecting a gripping state of an electronic device according to an embodiment of the disclosure.
Figure 34:
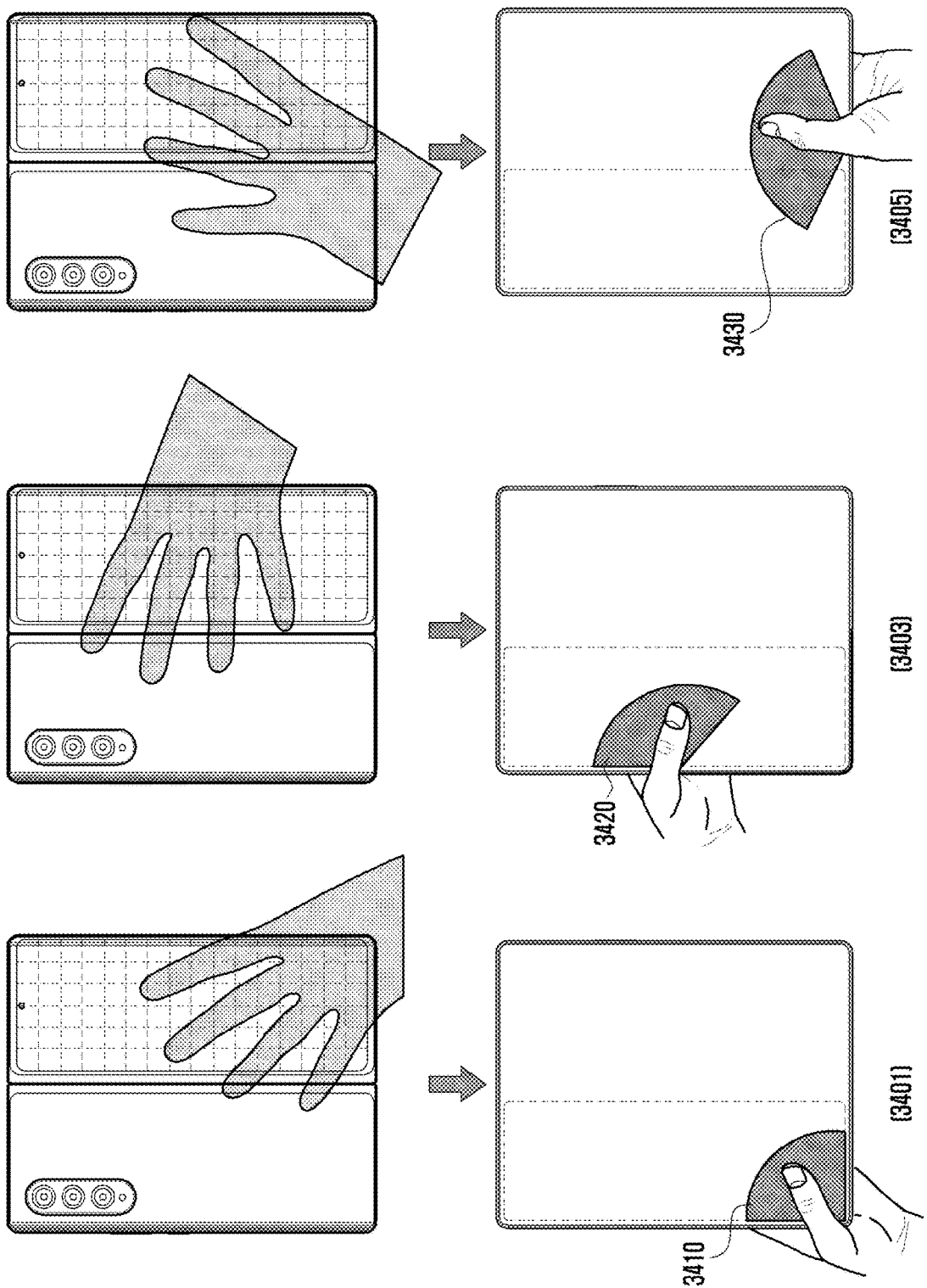
FIG. 34 illustrates an example of detecting a gripping state of an electronic device according to an embodiment of the disclosure.

According to an embodiment, FIGS. 33 and 34 may show examples of detecting an area of a rear cover display touched by the user's hand, based on a grid.

Figure 35:
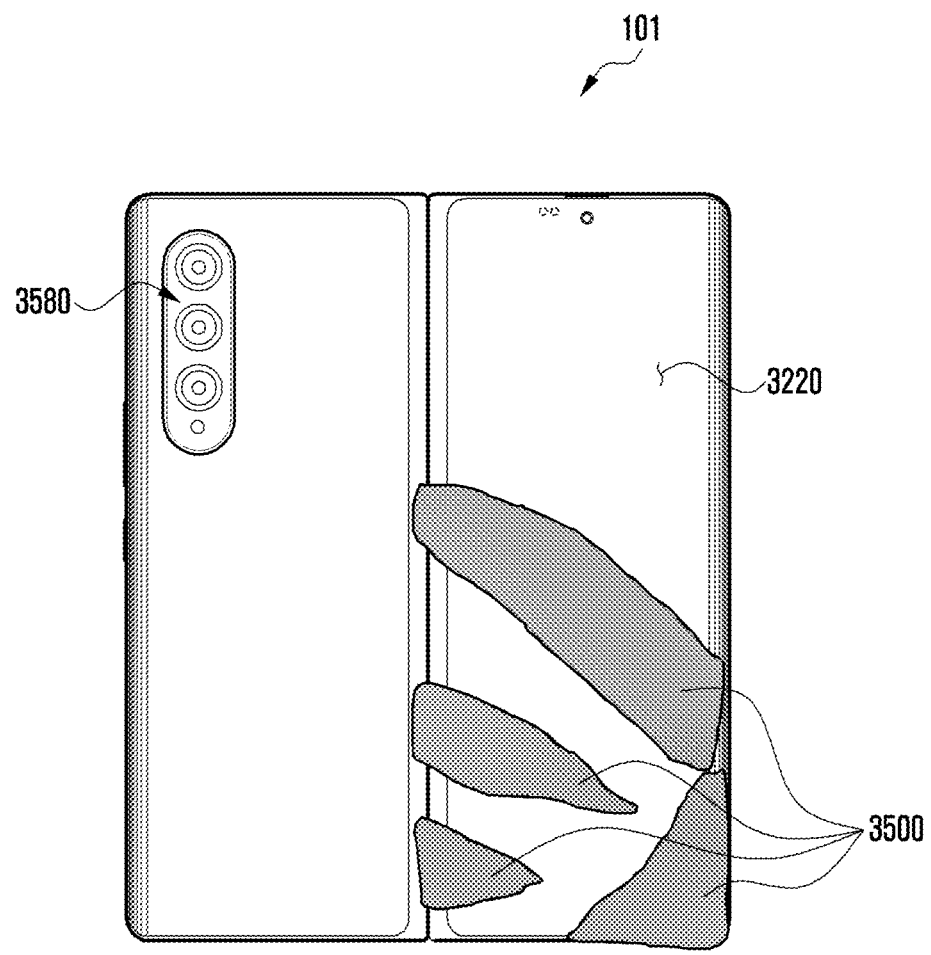
FIG. 35 illustrates an example of detecting a gripping state of an electronic device according to an embodiment of the disclosure.
Figure 37:
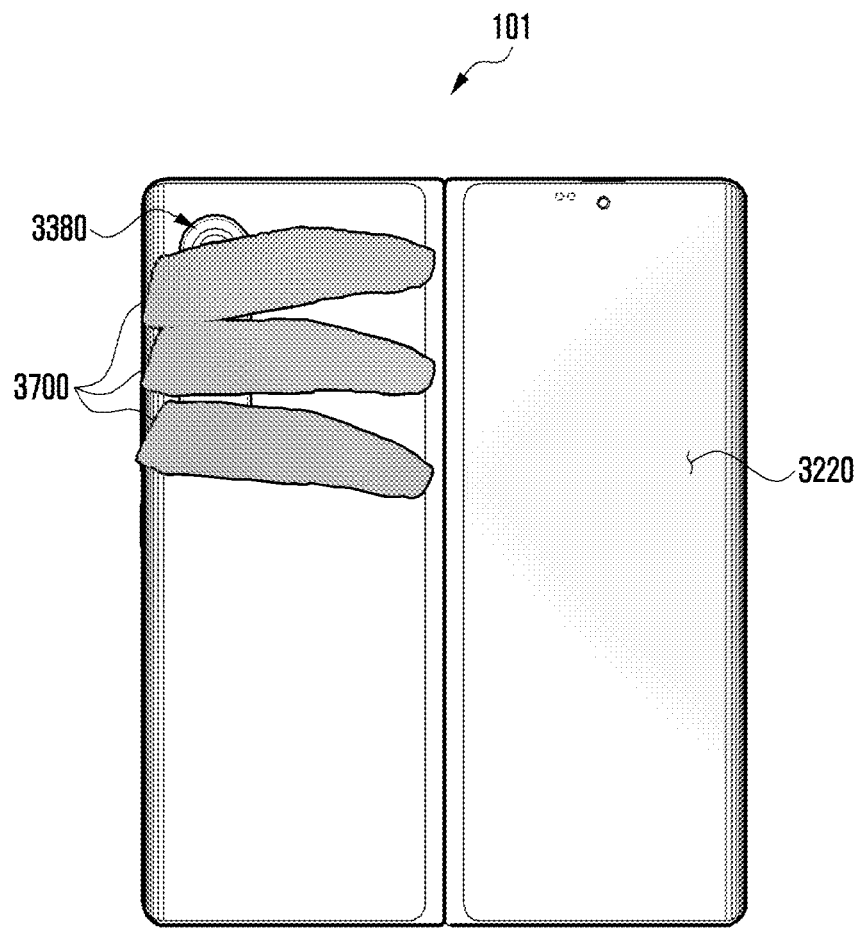
FIG. 37 illustrates an example of detecting a gripping state of an electronic device according to an embodiment of the disclosure.

According to an embodiment, FIGS. 35 and 37 illustrate examples of a rear surface of the electronic device 101. According to an embodiment, FIGS. 35 and 37 may show examples of a user's palm touch region and/or an image obtainable by the rear camera module 3580, when viewed from the rear of the electronic device 101.

According to an embodiment, FIGS. 32, 33, 34, 35, 36, and 37 may represent examples in which the form factor of the electronic device 101 is a foldable device having asymmetrical front and rear displays.

According to an embodiment, the electronic device 101 may include a touch circuit (e.g., a touch sensor), and may identify the user's gripping state, based on at least one touch region detected through the touch circuit of the first display 3210 (or a main display or a front display). According to an embodiment, the electronic device 101 may include a second display 3220 (or a cover display or a rear display), and may identify the user's gripping state, based on at least one touch region (e.g., palm touch region) detected through the touch circuit of the second display 3220 and a touch region (e.g., a finger touch region) detected through the touch circuit of the first display 3210. According to an embodiment, the electronic device 101 may include a rear camera module 3580, and may identify the user's gripping state, based on the presence or absence of an object (e.g., the user's finger) based on the image acquired by the rear camera module, at least one touch region (e.g., a palm touch region) detected through the touch circuit of the second display 3220, and a touch region (e.g., a finger touch region) detected through the touch circuit of the first display 3210.

According to an embodiment, FIGS. 32 and 35 may show examples in which the electronic device 101 detects a user's gripping state (e.g., the left-handed lower end gripping state) when the user grips the lower end of the electronic device 101 with his/her left hand.

According to an embodiment, when the user's finger touch 3200 is detected on the front first display 3210 (e.g., the front display), the electronic device 101 may activate (e.g., drive the touch circuit while the screen is off) the touch circuit of the rear second display 3220 (e.g., the rear cover display). According to an embodiment, the electronic device 101 may determine the gripping position (e.g., an optimization region within a screen region where a touch operation is possible), based on the finger touch of the first display 3210, and determine the gripping state, based on the palm touch 3500.

According to an embodiment, the front first display 3210 (e.g., the front display) and the rear second display 3220 (e.g., the cover display) may be distinguished by a designated multi-division for determining a gripping state. For example, the first display 3210 may be classified as a first division in units of blocks (or groups) of a plurality of pixels of the first display 3210. For example, the second display 3220 may be classified as a second division by units of blocks (or groups) of a plurality of pixels of the second display 3220. According to an embodiment, the electronic device 101 may determine a gripping state (e.g., a gripping posture, a gripping direction, a gripping type, and/or a manipulatable range) by combining a division number according to the first division of the first display 3210 and a division number according to the second division of the second display 3220. Examples of this are shown in FIGS. 33 and 34.

According to an embodiment, the electronic device 101 may divide the second display 3220 by using a grid and identify the gripping form according to the touched grid region on the second display 3220. For example, when the user grips the electronic device 101 as in the examples of FIGS. 32 and 35, the electronic device 101 may detect at least one touch region 3300 (e.g., the palm touch region 3300) through the touch circuit of the second display 3220 in the example <3301> of FIG. 33, and detect the touch region 3200 (e.g., the finger touch region 3200) through the touch circuit of the first display 3210 in the example <3303> of FIG. 33.

In an embodiment, as shown in a partially enlarged view of the palm touch region 3300 in example <3301>, the second display 3220 may be divided into a plurality of grids (e.g., pixel units or block units of a pixel set). According to an embodiment, the palm touch region 3300 may include a first palm touch point 3310 having a relatively large contact area (e.g., complete palm touch point) and a second palm touch point 3320 having a relatively small contact area (e.g., incomplete palm touch point). According to an embodiment, the electronic device 101 may determine the palm touch region 3300 on the second display 3220, based on the first palm touch point 3310 and the second palm touch point 3320.

According to an embodiment, the electronic device 101 may identify the form (or a touch posture) (e.g., gripping direction and/or the size of one hand) of the palm touch region 3300 of the second display 3220 and the form of the finger touch region 3200 of the first display 3210 to determine a gripping state. According to an embodiment, the gripping state may include a one-handed gripping state and a two-handed gripping state. In an embodiment, the one-handed gripping state may include states, such as left-handed lower end gripping, left-handed middle gripping, left-handed upper end gripping, left-handed lowermost gripping (e.g., the lower part of the electronic device 101), left-handed uppermost gripping (e.g., the upper part of the electronic device 101), right-handed lower end gripping, right-handed middle gripping, right-handed upper end gripping, right-handed lowermost gripping, and right-handed uppermost gripping. In an embodiment, the two-handed gripping state may include states, such as two-handed lower end gripping, two-handed middle gripping, and two-handed upper end gripping.

According to an embodiment, the electronic device 101 may determine an optimization region (e.g., a manipulatable region) according to a gripping state. For example, as illustrated in FIG. 34, when a user performs one handed gripping (e.g., left hand gripping), the gripping type may be determined based on the palm touch region 3300 of the second display 3220 and the finger touch region 3200 of the first display 3210. According to an embodiment, the electronic device 101 may determine an optimization region on the first display 3210, based on the determined gripping type. For example, the electronic device 101 may determine the optimization region, based on the fan-shaped regions 3410, 3420, and 3430 (e.g., one-handed manipulation region) including the finger touch region 3200 of the first display 3210. According to an embodiment, the electronic device 101 may predict the touch itself (e.g., the gripping direction and/or the size of one hand), based on the palm touch region 3300 of the second display 3220, and determine the optimization region, based on the finger touch region 3200 of the first display 3210 and a one-handed manipulation region matched to the posture of the predicted touch.

Referring to FIG. 34, example <3401> may show an example of determining the optimization region 3410 (e.g., a one-handed manipulation region) around the left lower end of the first display 3210 including the finger touch region 3200, according to the first type of one hand gripping (e.g., the left-handed lower end gripping). According to an embodiment, example <3403> may represent an example of determining the optimization region 3420 around the left middle of the first display 3210 including the finger touch region 3200, according to the second type of one hand gripping (e.g., the left-handed middle gripping). According to an embodiment, example <3405> may represent an example of determining the optimization region 3430 around the lower-middle part of the first display 3210 including the finger touch region 3200, according to the third type of one hand gripping (e.g., the left-handed lowermost gripping (e.g., gripping the lower part of the electronic device 101).

According to an embodiment, a method for determining the gripping state is not limited to determining through a combination of a finger touch on the front surface and a palm touch on the rear surface. According to an embodiment, the method for determining the gripping state may improve the accuracy on detection of the gripping state through a combination of additional sensing elements, such as a finger touch on the front surface, sensor data from a grip sensor, a palm touch on the rear surface, and/or an acquired image by a camera module.

According to an embodiment, FIGS. 36 and 37 may show an example in which the electronic device 101 detects a user's gripping state (e.g., the right-handed gripping state) when the user grips the upper end of the electronic device 101 with his/her right hand.

According to an embodiment, when a user's finger touch 3600 is detected on the front first display 3210 (e.g., the front display), the electronic device 101 may activate the touch circuit of the rear second display 3220 (e.g., the rear cover display) and the rear camera module 3580. According to an embodiment, the electronic device 101 may determine a gripping position (e.g., an optimization region allowing touch manipulation within a screen region), based on a finger touch of the first display 3210, and determine the gripping state, based on a palm touch and/or the image 3700 acquired through the camera module 3580.

According to an embodiment, the front first display 3210 (e.g., the front display) and the rear second display 3220 (e.g., the cover display) may be distinguished by a designated division for determining a gripping state. For example, the first display 3210 may be classified as a first division in units of blocks (or groups) of a plurality of pixels of the first display 3210. For example, the second display 3220 may be classified as a second division in units of blocks (or groups) of a plurality of pixels of the second display 3220. According to an embodiment, the electronic device 101 may determine a gripping state (e.g., a gripping posture, a gripping direction, a gripping type, and/or a manipulatable range) by combining a division number according to the first division of the first display 3210 and a division number according to the second division of the second display 3220.

According to an embodiment, a method for determining the gripping state is not limited to determining through a combination of a finger touch on the front surface and a palm touch on the rear surface. According to an embodiment, the method for determining the gripping state may improve the accuracy on detection of the gripping state through a combination of additional sensing elements, such as a finger touch on the front surface, sensor data from a grip sensor, a palm touch on the rear surface, and/or an acquired image by a camera module.

An operating method performed by the electronic device 101 according to an embodiment of the disclosure may include displaying an execution screen of an application in a designated state of the electronic device 101. The operating method according to an embodiment may include detecting at least one control object from the execution screen. The operating method according to an embodiment may include determining a user's gripping state. The operating method according to an embodiment may include identifying a target control object from the at least one control object, based on the designated state and the gripping state. The operating method according to an embodiment may include providing a duplicate control object corresponding to the target control object to an optimization region corresponding to the gripping state.

The operating method according to an embodiment may include determining a gripping position for the optimization region, based on the gripping state. The operating method according to an embodiment may include determining, as the target control object, a control object located at the farthest distance, based on the distance between the gripping position and the control object in the designated state. The operating method according to an embodiment may include generating a duplicate control object, based on the control object corresponding to the target control object. The operating method according to an embodiment may include floating and providing the duplicate control object at the gripping position.

According to an embodiment, the designated state may include a first designated state and a second designated state. According to an embodiment, the first designated state may include a state in which the electronic device is fully unfolded. According to an embodiment, the second designated state may include a state in which the electronic device is partially folded. According to an embodiment, the control object may include a control element for controlling a function related to the application when the application is running in the foreground. According to an embodiment, the at least one control object may be detected from the execution screen when the execution screen is displayed in the display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
at least one sensor;
memory storing one or more computer programs; and
one or more processors communicatively coupled to the display and the memory, wherein the one or more computer programs include computer-executable instructions that, when executed by the one or more processors individually or collectively, cause the electronic device to:
obtain a state related to folding of the electronic device from the at least one sensor,
control the display to display an execution screen of an application based on the obtained state, the obtained state is one of a first designated state or a second designated state, the first designated state comprises a state in which the electronic device is fully unfolded, and the second designated state comprises a state in which the electronic device is partially folded,
detect at least one control object from the execution screen,
determine a gripping position based on sensor data obtained from a touch sensor of the display,
identify a target control object from the at least one control object, based on the obtained state and the gripping position,
generate a duplicate control object having a function corresponding to the target control object, and
display the duplicate control object at an optimization region corresponding to the gripping position while maintaining the target control object at an original position of the target control object, and
wherein, to identify the target control object, the one or more computer programs further include computer-executable instructions that, when executed by the one or more processors individually or collectively, cause the electronic device to:
in case that the obtained state is the first designated state, measure a straight-line distance between the gripping position and each of the at least one control object, and determine a farthest control object from the at least one control object, and
in case the obtained state is the second designated state, determine a control object from the at least one control object that is located in a hinge region, based on calculation of a three-dimensional (3D) distance between the at least one control object and the gripping position.

2. The electronic device of claim 1,
wherein the each of the at least one control object comprises a control element for controlling a function related to the application when the application is executing in a foreground, and
wherein the at least one control object is detected from the execution screen when the execution screen is displayed in the display.

3. The electronic device of claim 1,
wherein the one or more computer programs further include computer-executable instructions that, when executed by the one or more processors individually or collectively, cause the electronic device to determine the gripping position, and
wherein the identifying of the target control object is based on a distance between the gripping position and the at least one control object.

4. The electronic device of claim 3, wherein the one or more computer programs further include computer-executable instructions that, when executed by the one or more processors individually or collectively, cause the electronic device to:
identify, as the target control object, a control object from at least one control object located at a farthest distance from the gripping position in the obtained state,
produce the duplicate control object, based on the at least one control object determined as the target control object, and
display the duplicate control object in a floating manner at the optimization region, based on the gripping position.

5. The electronic device of claim 3, wherein the one or more computer programs further include computer-executable instructions that, when executed by the one or more processors individually or collectively, cause the electronic device to:
distinguish the display as a plurality of virtual division regions in a background, based on designated division information, and
identify the target control object as a control object from the at least one control object in a virtual division region from the plurality of virtual division regions that is located at a farthest distance from a virtual division region from the plurality of virtual division regions that is located at a closest distance from the gripping position.

6. The electronic device of claim 3, wherein the identifying of the target control object is further based on an additional point, considering a designated condition along with the distance between the gripping position and the at least one control object.

7. The electronic device of claim 3,
wherein the one or more computer programs further include computer-executable instructions that, when executed by the one or more processors individually or collectively, cause the electronic device to determine the optimization region, based on the gripping position or a region around the gripping position, and
wherein the optimization region is a region corresponding to the gripping position or comprises a region that does not overlap with other objects, based on the gripping position.

8. The electronic device of claim 3, wherein the one or more computer programs further include computer-executable instructions that, when executed by the one or more processors individually or collectively, cause the electronic device to provide the duplicate control object as a floating control object having a corresponding function while maintaining the target control object at an original position of the target control object.

9. The electronic device of claim 3,
wherein the one or more computer programs further include computer-executable instructions that, when executed by the one or more processors individually or collectively, cause the electronic device to provide a floating action button, based on the gripping position, and
wherein the floating action button comprises a call object for calling the duplicate control object corresponding to the target control object.

10. The electronic device of claim 9, wherein the one or more computer programs further include computer-executable instructions that, when executed by the one or more processors individually or collectively, cause the electronic device to:
provide the floating action button to the gripping position; and
provide the duplicate control object in response to a user input based on the floating action button.

11. The electronic device of claim 1,
wherein the one or more computer programs further include computer-executable instructions that, when executed by the one or more processors individually or collectively, cause the electronic device to provide a visual effect applied to the target control object, and
wherein the visual effect is maintained while a floating action button or the duplicate control object is provided.

12. The electronic device of claim 1, wherein the one or more computer programs further include computer-executable instructions that, when executed by the one or more processors individually or collectively, cause the electronic device to map a location at which the duplicate control object is to be provided to a location of a floating action button.

13. The electronic device of claim 1,
wherein the one or more computer programs further include computer-executable instructions that, when executed by the one or more processors individually or collectively, cause the electronic device to:
in case that the obtained state is the first designated state, determine the target control object, based on a first designated condition between a gripping position and the target control object; and
in case that the obtained state is the second designated state, determine a target control object, based on a second designated condition between the gripping position and the target control object in the second designated state.

14. The electronic device of claim 1,
wherein the at least one control object is a single control object or bundled control objects, and
wherein the one or more computer programs further include computer-executable instructions that, when executed by the one or more processors individually or collectively, cause the electronic device to:
produce the duplicate control object as a single control object in case that a target control object is a single control object, and
produce the duplicate control object as a bundled control objects in case that the target control object is bundled control objects.

15. The electronic device of claim 1, wherein the one or more computer programs further include computer-executable instructions that, when executed by the one or more processors individually or collectively, cause the electronic device to:
determine whether a space for the duplicate control object is securable in a region corresponding to a gripping position, based on a designated condition of a region corresponding to the gripping position and the duplicate control object; and
determine the optimization region to which the duplicate control object is to be provided, based on whether the space for the duplicate control object is securable.

16. The electronic device of claim 15, wherein the one or more computer programs further include computer-executable instructions that, when executed by the one or more processors individually or collectively, cause the electronic device to:
determine a region of the gripping position as the optimization region in case that the space is securable;
determine a region around the gripping position as the optimization region in case that the space is not securable; and
in the determining of the optimization region, correct the optimization region, based on presence or absence of other objects overlapping the optimization region.

17. The electronic device of claim 1, wherein the one or more computer programs further include computer-executable instructions that, when executed by the one or more processors individually or collectively, cause the electronic device to move or remove a floating action button or the duplicate control object or change the target control object, based on an interaction with a user based on the floating action button or the duplicate control object.

18. An operating method performed by an electronic device, the operating method comprising:
obtaining a state related to folding of the electronic device from at least one sensor of the electronic device;
displaying an execution screen of an application based on the obtained state, the obtained state is one of a first designated state or a second designated state, the first designated state comprises a state in which the electronic device is fully unfolded, and the second designated state comprises a state in which the electronic device is partially folded;
detecting at least one control object from the execution screen;
determining a gripping position, based on sensor data obtained from a touch sensor of a display of the electronic device;
identifying a target control object from the at least one control object, based on the obtained state and the gripping position;
generating a duplicate control object having a function corresponding to the target control object; and
displaying the duplicate control object at an optimization region corresponding to the gripping position while maintaining the target control object at an original position of the target control object,
wherein the identifying of the target control object comprises:
in case that the obtained state is the first designated state, measuring a straight-line distance between the gripping position and each of the at least one control object, and determining a farthest control object from the at least one control object, and
in case the obtained state is the second designated state, determining a control object from the at least one control object that is located in a hinge region, based on calculation of a three-dimensional (3D) distance between the at least one control object and the gripping position.

* * * * *